(12) United States Patent
Shin et al.

(10) Patent No.: US 10,399,655 B2
(45) Date of Patent: Sep. 3, 2019

(54) SHIP

(71) Applicant: DAEWOO SHIPBUILDING & MARINE ENGINEERING CO., LTD., Seoul (KR)

(72) Inventors: Hyun Jun Shin, Seoul (KR); Dong Kyu Choi, Seongnam-si (KR); Young Sik Moon, Gwangmyeong-si (KR); Su Kyung An, Gwangmyeong-si (KR); Hyun Min Jang, Seoul (KR); Jae Wook Son, Seoul (KR); Joon Chae Lee, Seoul (KR)

(73) Assignee: DAEWOO SHIPBUILDING & MARINE ENGINEERING CO., LTD., Seoul (KR)

( * ) Notice: Subject to any disclaimer, the term of this patent is extended or adjusted under 35 U.S.C. 154(b) by 0 days.

(21) Appl. No.: 15/579,582

(22) PCT Filed: Apr. 5, 2016

(86) PCT No.: PCT/KR2016/003542
§ 371 (c)(1),
(2) Date: Dec. 4, 2017

(87) PCT Pub. No.: WO2016/195230
PCT Pub. Date: Dec. 8, 2016

(65) Prior Publication Data
US 2018/0170507 A1    Jun. 21, 2018

(30) Foreign Application Priority Data

Sep. 25, 2015  (KR) .................. 10-2015-0135998
Sep. 25, 2015  (KR) .................. 10-2015-0136257
Apr. 5, 2016   (KR) .................. 10-2015-0078142

(51) Int. Cl.
*F17C 9/02* (2006.01)
*B63H 21/38* (2006.01)
(Continued)

(52) U.S. Cl.
CPC ............. *B63H 21/38* (2013.01); *B63B 25/16* (2013.01); *F02M 21/0287* (2013.01); *F17C 6/00* (2013.01);
(Continued)

(58) Field of Classification Search
CPC .. F17C 9/02; F17C 2265/03; F17C 2265/031; F17C 2265/032; F17C 2265/033;
(Continued)

(56) References Cited

U.S. PATENT DOCUMENTS 6,220,053 B1 *  4/2001  Hass, Jr. ................ F25J 1/0015
                                                  62/613
6,901,762 B2 *  6/2005  Irie ........................ F17C 1/002
                                                  62/48.2
(Continued)

FOREIGN PATENT DOCUMENTS

CN        1820163 A      8/2006
CN      101915494 A     12/2010
(Continued)

OTHER PUBLICATIONS

KR-101242949-B1 Translation (Year: 2013).*
(Continued)

*Primary Examiner* — Brian M King
(74) *Attorney, Agent, or Firm* — Knobbe Martens Olson & Bear LLP

(57) ABSTRACT

A ship includes: a boil-off gas heat exchanger which heat-exchanges a compressed boil-off gas ("a first fluid") by means of a boil-off gas discharged from the storage tank as a refrigerant; a compressor installed on the downstream of (Continued)

the boil-off gas heat exchanger and compressing a part of the boil-off gas discharged from the storage tank; first and second extra compressors provided in parallel with the compressor on the downstream of the boil-off gas heat exchanger and compressing the other part of the boil-off gas discharged from the storage tank; a refrigerant heat exchanger which additionally cools the first fluid cooled by means of the boil-off gas heat exchanger; a refrigerant decompressing device which expands a second fluid, which has been sent to the refrigerant heat exchanger and cooled by means of the refrigerant heat exchanger, and then sending the expanded second fluid back to the refrigerant heat exchanger.

6 Claims, 10 Drawing Sheets

(51) Int. Cl.
    *B63B 25/16*     (2006.01)
    *F17C 6/00*     (2006.01)
    *F02M 21/02*     (2006.01)
    *F25J 1/00*     (2006.01)
    *F25J 1/02*     (2006.01)
    *B63J 99/00*     (2009.01)

(52) U.S. Cl.
    CPC ............ *F17C 9/02* (2013.01); *F25J 1/004* (2013.01); *F25J 1/0025* (2013.01); *F25J 1/0037* (2013.01); *F25J 1/0045* (2013.01); *F25J 1/0202* (2013.01); *F25J 1/023* (2013.01); *F25J 1/0249* (2013.01); *F25J 1/0277* (2013.01); *F25J 1/0288* (2013.01); *F25J 1/0294* (2013.01); *B63J 2099/003* (2013.01); *F02M 21/0215* (2013.01); *F17C 2221/033* (2013.01); *F17C 2227/0185* (2013.01); *F17C 2227/0339* (2013.01); *F17C 2227/0358* (2013.01); *F17C 2265/03* (2013.01); *F17C 2265/066* (2013.01); *F17C 2270/0105* (2013.01); *F25J 2290/72* (2013.01); *Y02T 10/32* (2013.01)

(58) Field of Classification Search
    CPC .. F17C 2265/034; F25J 1/0025; F25J 1/0201; F25J 1/0202; F25J 1/0035; F25J 1/0037; F25J 2210/90; F25J 2245/90
    See application file for complete search history.

(56) References Cited

U.S. PATENT DOCUMENTS

| | | |
|---|---|---|
| 2004/0068993 A1 | 4/2004 | Irie et al. |
| 2011/0056238 A1 | 3/2011 | Mak |
| 2011/0056328 A1* | 3/2011 | Ko .................. A63B 22/0023 74/606 R |
| 2011/0094262 A1 | 4/2011 | Turner et al. |
| 2012/0036888 A1 | 2/2012 | Vandor |
| 2014/0202585 A1* | 7/2014 | Barker ............... F17C 5/06 141/4 |
| 2015/0330574 A1 | 11/2015 | Fuchs et al. |
| 2016/0114876 A1 | 4/2016 | Lee et al. |
| 2018/0148138 A1 | 5/2018 | Shin et al. |
| 2018/0162492 A1 | 6/2018 | An et al. |
| 2018/0170503 A1 | 6/2018 | Shin et al. |
| 2018/0170504 A1 | 6/2018 | Shin et al. |
| 2018/0170505 A1 | 6/2018 | Shin et al. |
| 2018/0170506 A1 | 6/2018 | Shin et al. |

FOREIGN PATENT DOCUMENTS

| | | | |
|---|---|---|---|
| CN | 102084114 A | 6/2011 | |
| CN | 102084171 A | 6/2011 | |
| CN | 103097237 A | 5/2013 | |
| CN | 103562536 A | 2/2014 | |
| EP | 2623414 A1 | 8/2013 | |
| JP | H11-210993 A | 8/1999 | |
| JP | 2001-132898 A | 5/2001 | |
| JP | 3213846 B2 | 10/2001 | |
| JP | 56-65092 A | 4/2009 | |
| JP | 2009-079665 A | 4/2009 | |
| JP | 2010025152 A | 2/2010 | |
| KR | 10-2006-0123675 A | 12/2006 | |
| KR | 10-2008-0113046 A | 12/2008 | |
| KR | 10-2010-0108932 A | 10/2010 | |
| KR | 10-1153080 B1 | 6/2012 | |
| KR | 10-2012-0107886 A | 10/2012 | |
| KR | 10-1194474 B1 | 10/2012 | |
| KR | 10-1242949 B1 | 3/2013 | |
| KR | 101242949 B1 * | 3/2013 | ............ F25J 1/0027 |
| KR | 10-2013-0062006 A | 6/2013 | |
| KR | 10-1290032 B1 | 7/2013 | |
| KR | 10-1298623 B1 | 8/2013 | |
| KR | 10-1310025 B1 | 9/2013 | |
| KR | 10-2014-0075582 A | 6/2014 | |
| KR | 10-2014-0107504 A | 9/2014 | |
| KR | 10-2014-0130092 A | 11/2014 | |
| KR | 10-2015-0001600 A | 1/2015 | |
| KR | 10-1488100 B1 | 1/2015 | |
| KR | 10-1490717 B1 | 2/2015 | |
| KR | 10-1511214 B1 | 4/2015 | |
| KR | 10-2015-0049748 A | 5/2015 | |
| KR | 10-2015-0050113 A | 5/2015 | |
| WO | 2004/109206 A1 | 12/2004 | |
| WO | 2009/126604 A1 | 10/2009 | |
| WO | 2009/136793 A1 | 11/2009 | |
| WO | 2012/043274 A1 | 4/2012 | |
| WO | 2012/128448 A1 | 9/2012 | |
| WO | 2016126025 A1 | 8/2016 | |
| WO | 2016/195229 A1 | 12/2016 | |
| WO | 2016/195230 A1 | 12/2016 | |
| WO | 2016/195231 A1 | 12/2016 | |
| WO | 2016/195232 A1 | 12/2016 | |
| WO | 2016/195233 A1 | 12/2016 | |
| WO | 2016/195237 A1 | 12/2016 | |
| WO | 2016/195279 A1 | 12/2016 | |

OTHER PUBLICATIONS

Search Report & Written Opinion of corresponding Singaporean Patent Application No. 11201710005R—10 pages (dated Jul. 5, 2018).
Notice of Allowance in corresponding Korean Patent Application No. 10-2015-0135998—6 pages (dated Feb. 23, 2016).
International Search Report dated Jul. 5, 2016 of PCT/KR2016/003542 which is the parent application and its English translation—4 pages.
International Preliminary Report on Patentability dated Dec. 5, 2017 of PCT/KR2016/003542 which is the parent application—9 pages.
Office Action of corresponding Chinese Patent Application No. 201680045491.9—11 pages (dated Feb. 2, 2019).
Extended European Search Report of Patent Application No. 16803585.5—18 pages (dated Feb. 19, 2019).
Office Action in corresponding Chinese Patent Application No. 201680045324.4 in 7 pages, (dated Feb. 1, 2019).
Office Action in corresponding Chinese Patent Application No. 201680045478.3—in 9 pages, (dated Feb. 1, 2019).
Office Action in corresponding Chinese Patent Application No. 201680045502.3—in 11 pages, (dated Feb. 2, 2019).
Partial Supplemental European Search Report in corresponding European Patent Application No. 16803584.8—21 pages (dated Feb. 19, 2019).
Extended European Search Report in corresponding European Patent Application No. 16803586.3—in 16 pages (dated Feb. 19, 2019).

(56) References Cited

OTHER PUBLICATIONS

Extended European Search Report in corresponding European Patent Application No. 16803587.1—in 17 pages (dated Feb. 19, 2019).
Extended European Search Report in corresponding European Patent Application No. 16803592.1—in 10 pages (dated Feb. 19, 2019).

* cited by examiner

[FIG 1]
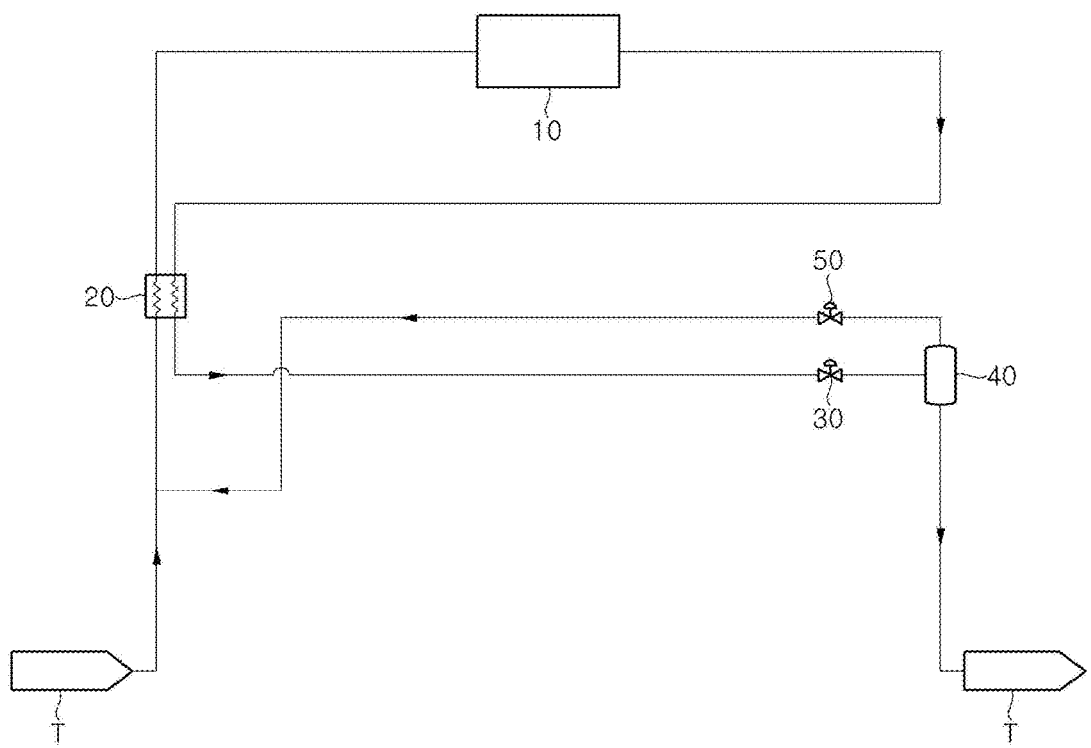

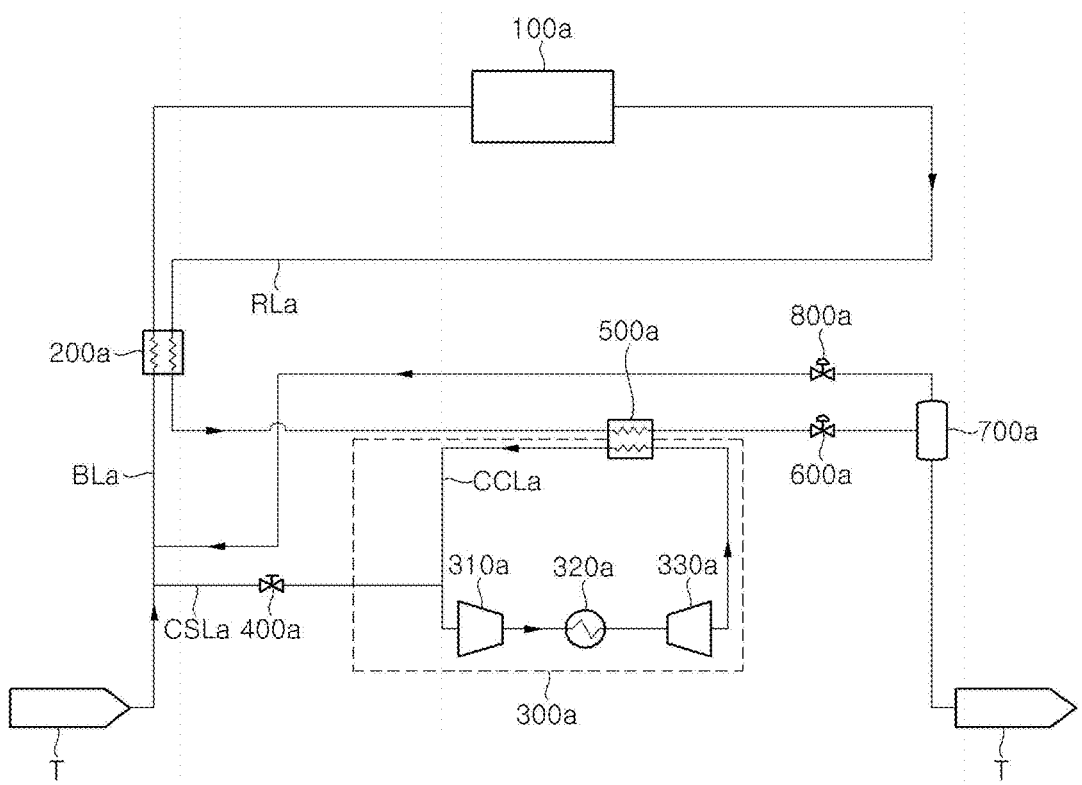
[FIG 2]

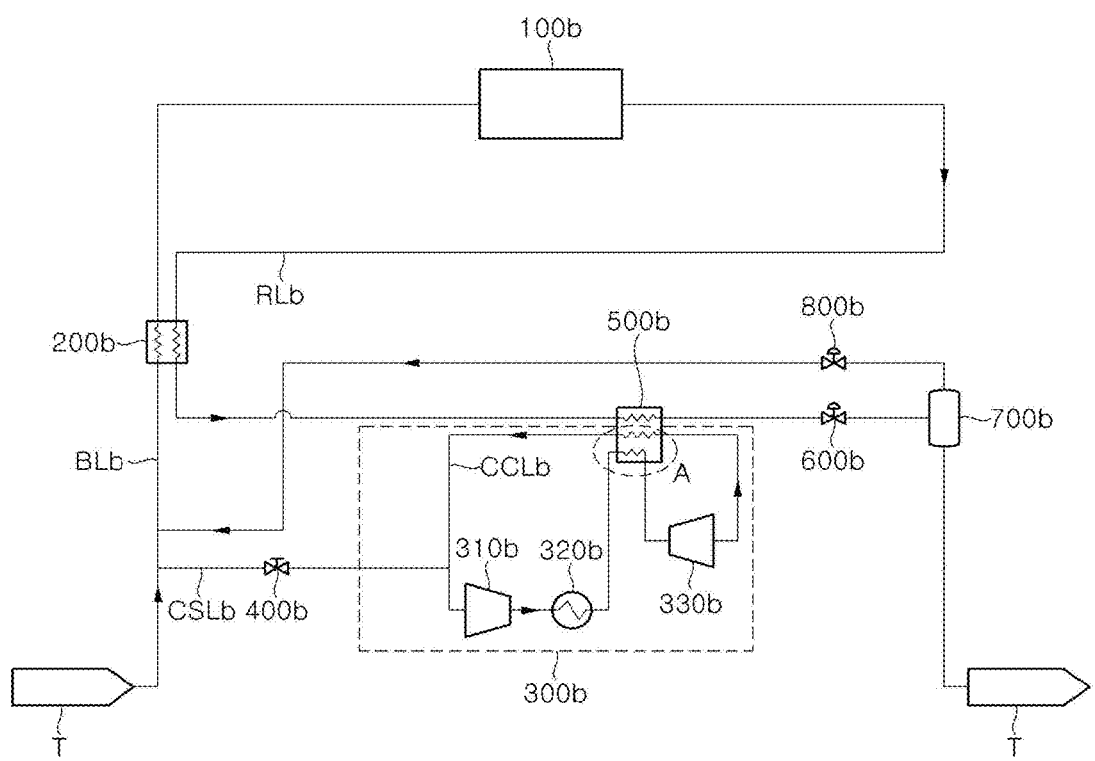

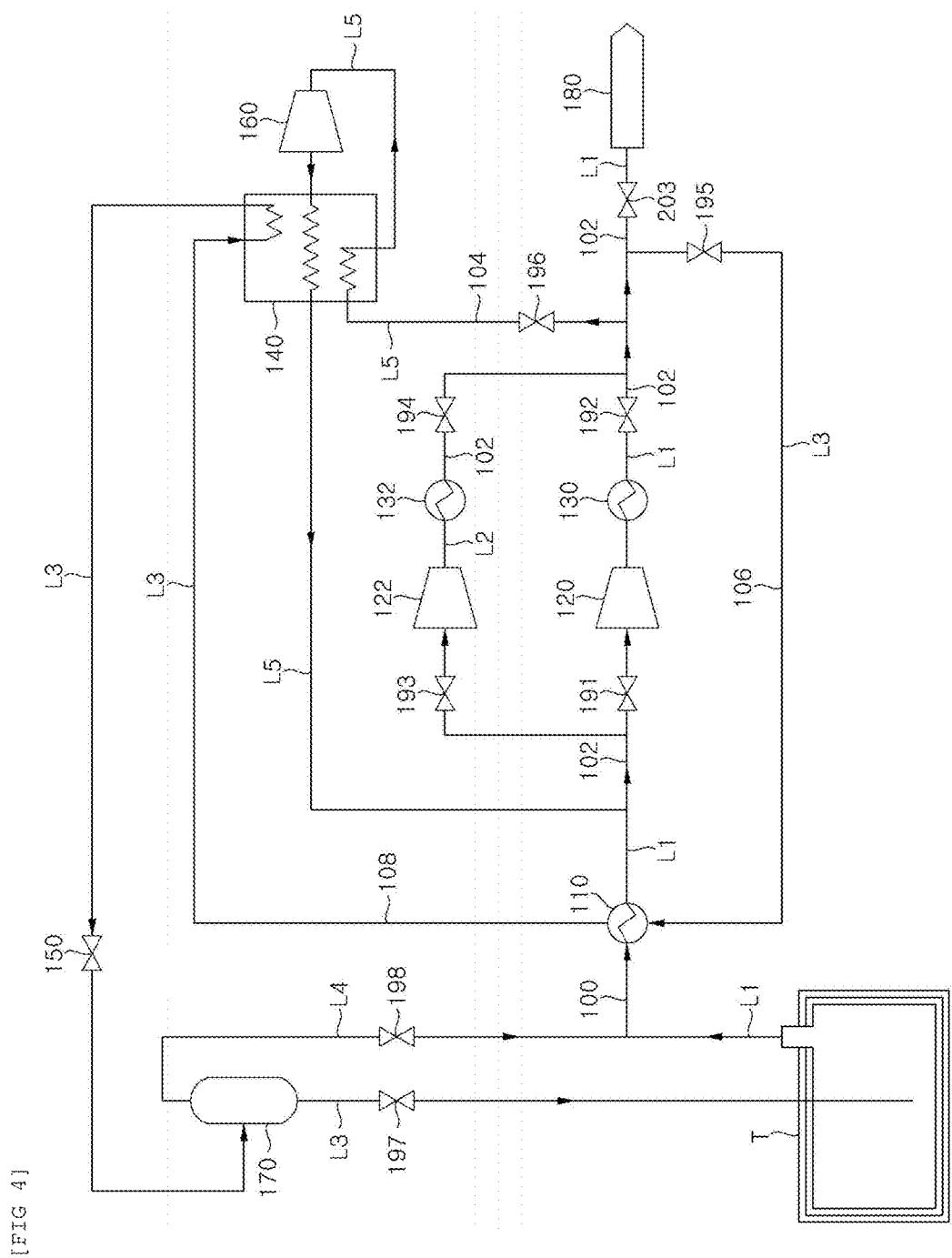
[FIG 4]

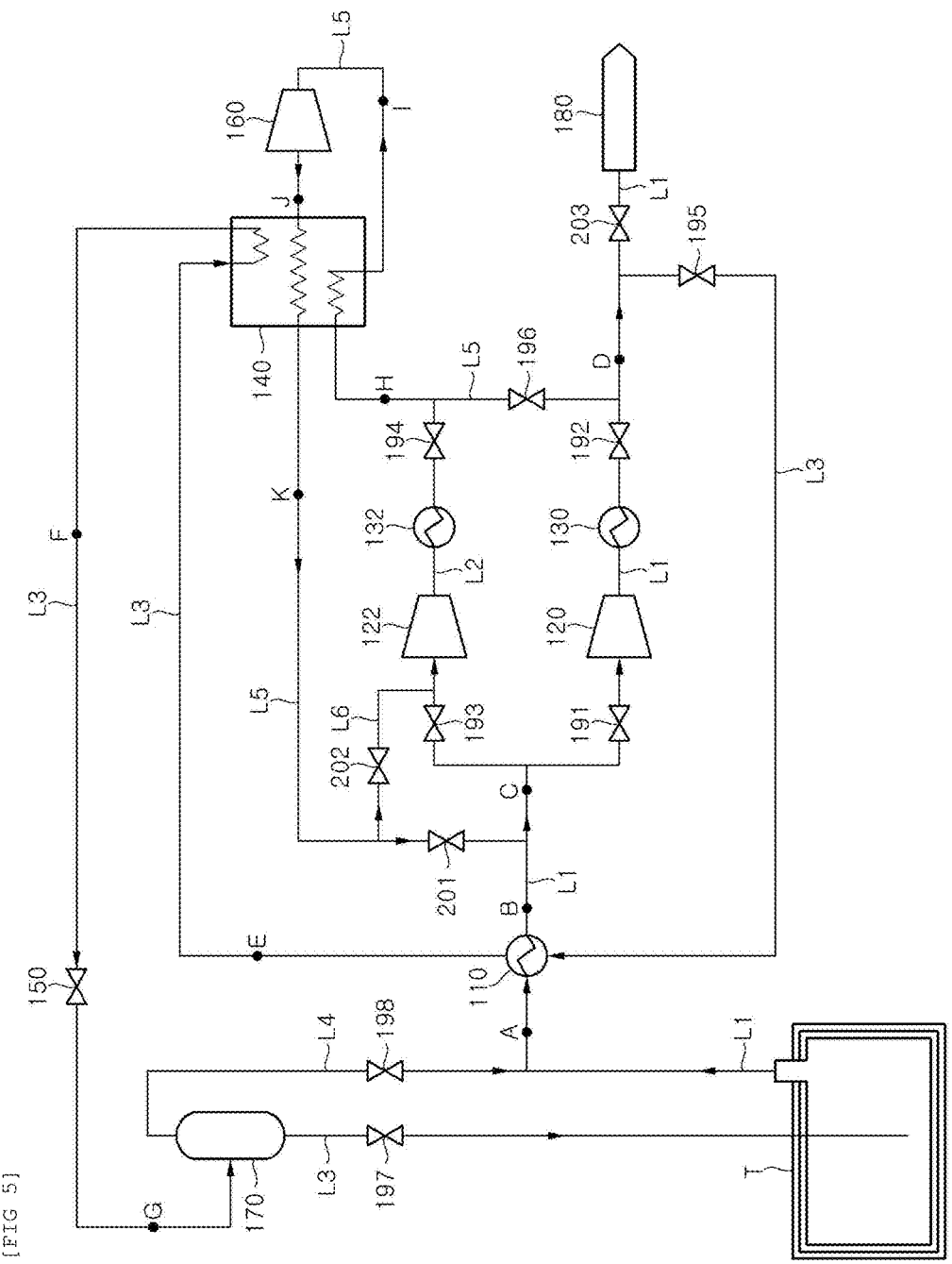
[FIG 5]

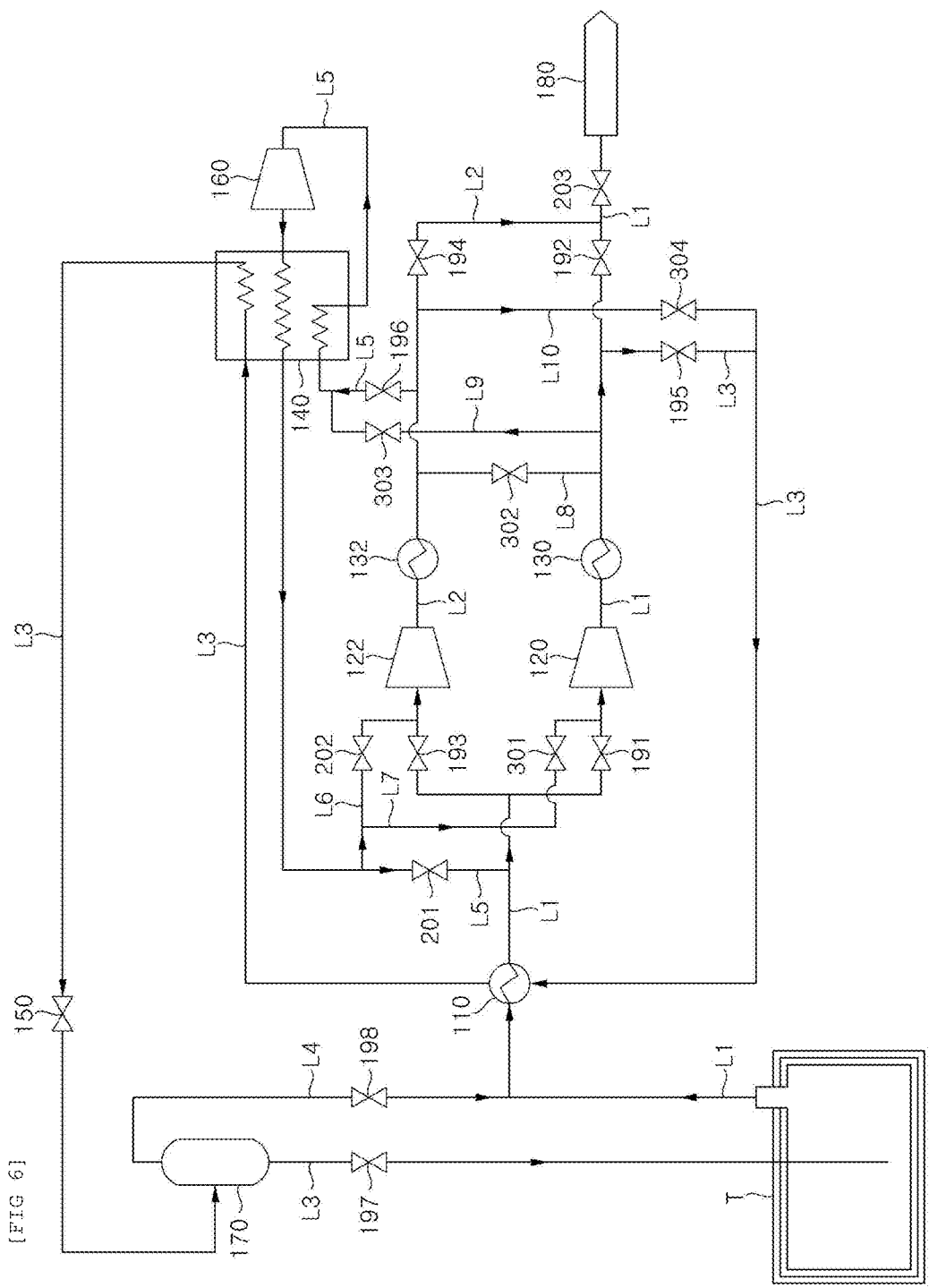
[FIG 6]

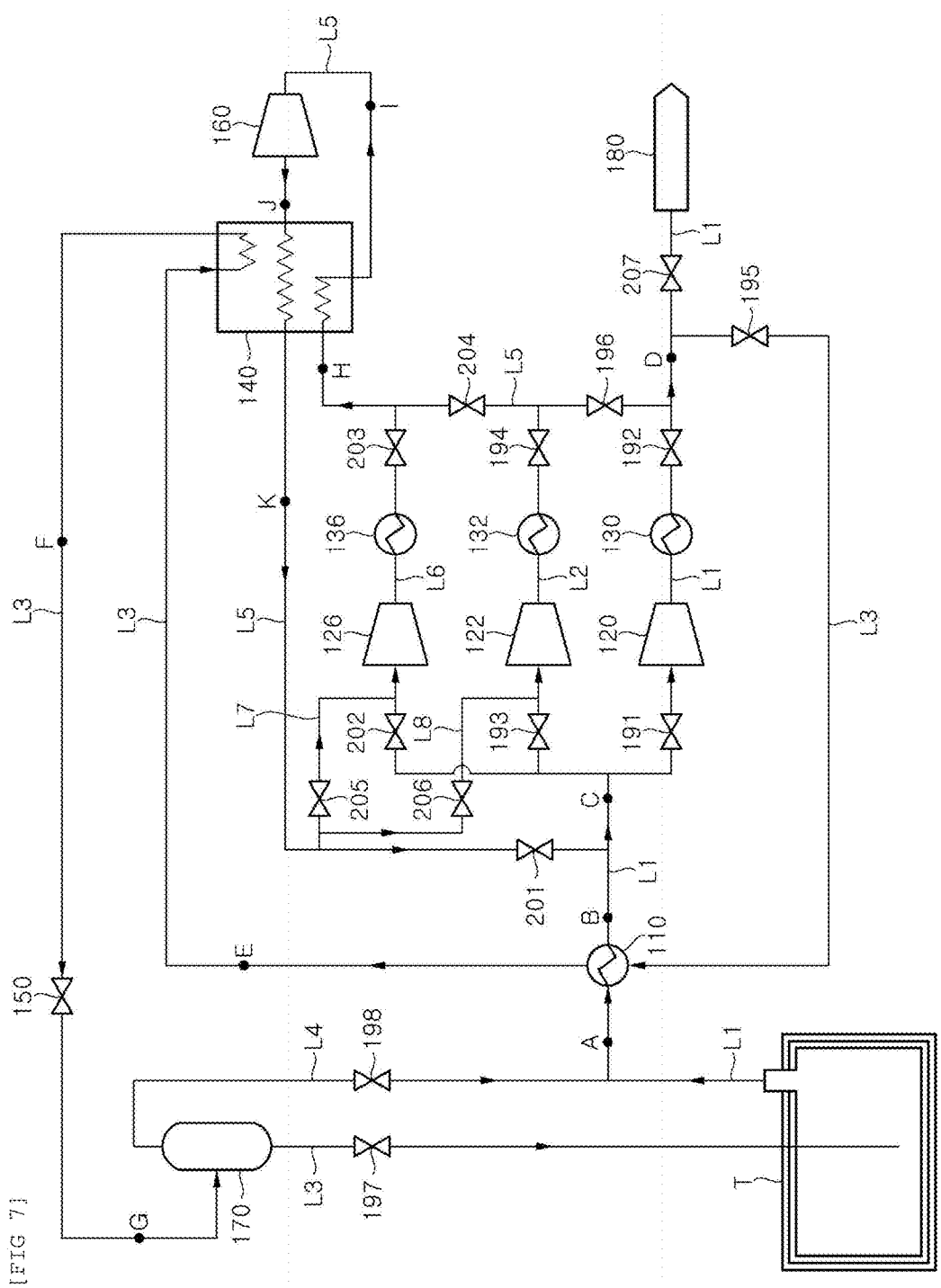
[FIG 7]

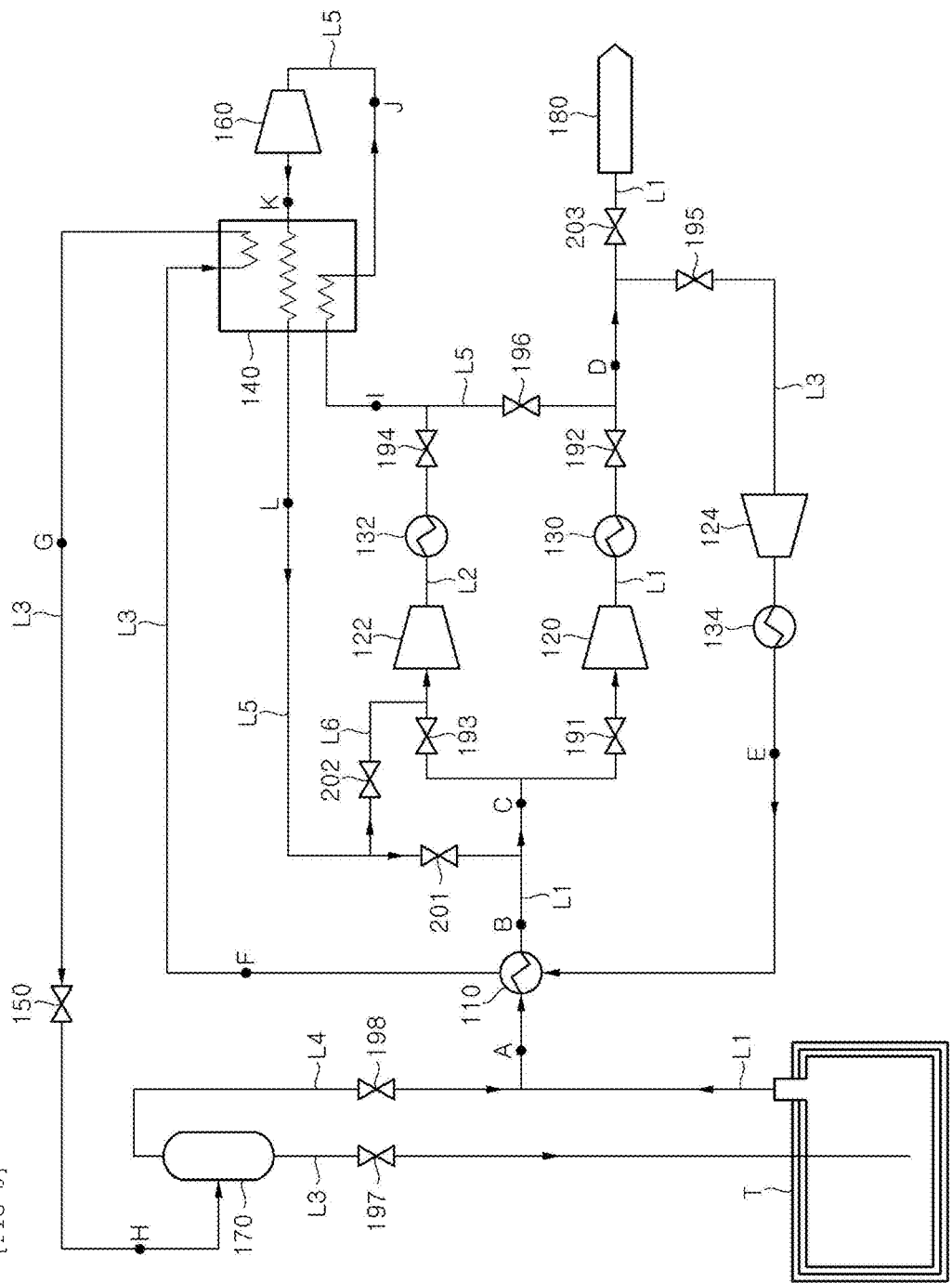

[FIG 9]
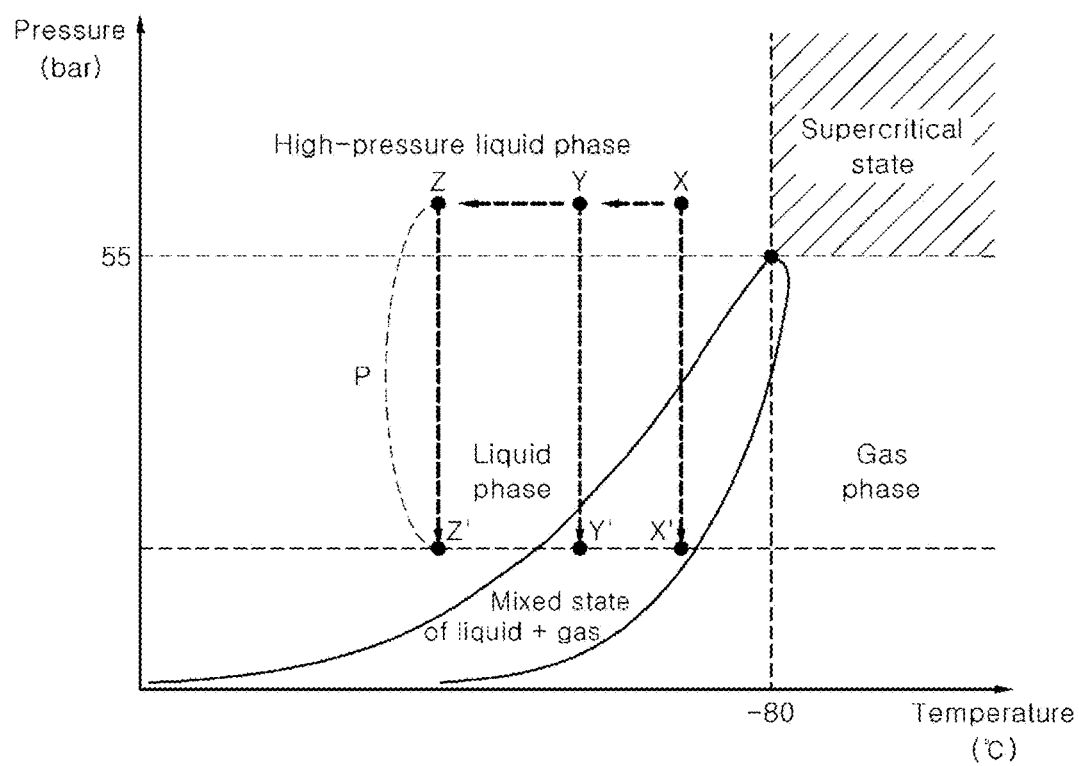

[FIG 10]
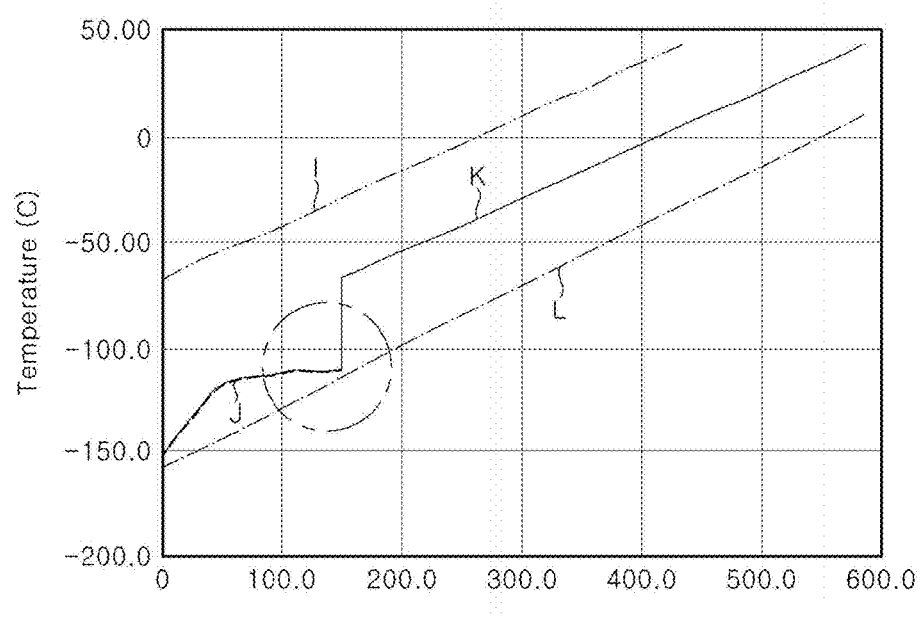
(a)
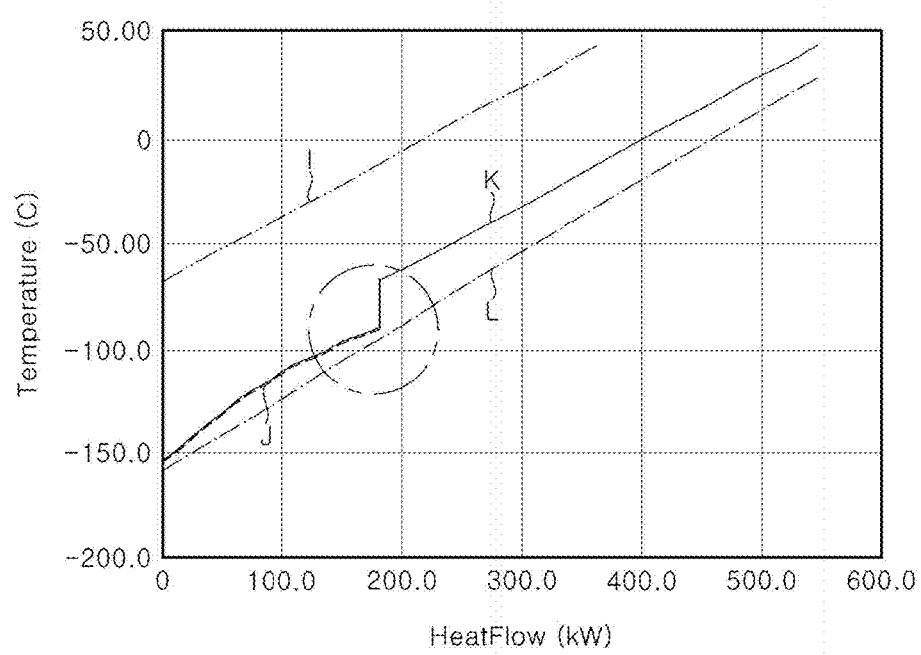
(b)

SHIP

TECHNICAL FIELD

The present invention relates to a ship, and more particularly, to a ship including a system for re-liquefying boil-off gas left after being used as fuel of an engine among boil-off gases generated in a storage tank.

BACKGROUND ART

In recent years, consumption of liquefied gas such as liquefied natural gas (LNG) has been rapidly increasing worldwide. Since a volume of liquefied gas obtained by liquefying gas at a low temperature is much smaller than that of gas, the liquefied gas has an advantage of being able to increase storage and transport efficiency. In addition, the liquefied gas, including liquefied natural gas, can remove or reduce air pollutants during the liquefaction process, and therefore may also be considered as eco-friendly fuel with less emission of air pollutants during combustion.

The liquefied natural gas is a colorless transparent liquid obtained by cooling and liquefying methane-based natural gas to about −162° C., and has about 1/600 less volume than that of natural gas. Therefore, to very efficiently transport the natural gas, the natural gas needs to be liquefied and transported.

However, since the liquefaction temperature of the natural gas is a cryogenic temperature of −162° C. at normal pressure, the liquefied natural gas is sensitive to temperature change and easily boiled-off. As a result, the storage tank storing the liquefied natural gas is subjected to a heat insulating process. However, since external heat is continuously sent to the storage tank, boil-off gas (BOG) is generated as the liquefied natural gas is continuously vaporized naturally in the storage tank during transportation of the liquefied natural gas. This goes the same for other low-temperature liquefied gases such as ethane.

The boil-off gas is a kind of loss and is an important problem in transportation efficiency. In addition, if the boil-off gas is accumulated in the storage tank, an internal pressure of the tank may rise excessively, and if the internal pressure of the tank becomes more severe, the tank is highly likely to be damaged. Accordingly, various methods for treating the boil-off gas generated in the storage tank have been studied. Recently, to treat the boil-off gas, a method for re-liquefying boil-off gas and returning the re-liquefied boil-off gas to the storage tank, a method for using boil-off gas as an energy source for fuel consumption places like an engine of a ship, or the like have been used.

As the method for re-liquefying boil-off gas, there are a method for re-liquefying boil-off gas by heat-exchanging the boil-off gas with a refrigerant by a refrigeration cycle using a separate refrigerant, a method for re-liquefying boil-off gas by the boil-off gas itself as a refrigerant without using a separate refrigerant, or the like. In particular, the system employing the latter method is called a partial re-liquefaction System (PRS).

Generally, on the other hand, as engines which can use natural gas as fuel among engines used for a ship, there are gas fuel engines such as a DFDE engine and an ME-GI engine.

The DFDE engine adopts an Otto cycle which consists of four strokes and injects natural gas with a relatively low pressure of approximately 6.5 bars into a combustion air inlet and compresses the natural gas as the piston lifts up.

The ME-GI engine adopts a diesel cycle which consists of two strokes and employs a diesel cycle which directly injects high pressure natural gas near 300 bars into the combustion chamber around a top dead point of the piston. Recently, there is a growing interest in the ME-GI engine, which has better fuel efficiency and boost efficiency.

DISCLOSURE

Technical Problem

An object of the present invention is to provide a ship including a system capable of providing better boil-off gas re-liquefying performance than the existing partial re-liquefaction system.

Technical Solution

According to an exemplary embodiment of the present invention, there is provided a ship including a storage tank for storing a liquefied gas, including: a boil-off gas heat exchanger which is installed on a downstream of the storage tank and heat-exchanges a compressed boil-off gas (hereafter referred to as "a first fluid") by means of a boil-off gas discharged from the storage tank as a refrigerant, thereby cooling same; a compressor which is installed on the downstream of the boil-off gas heat exchanger and compresses a part of the boil-off gas discharged from the storage tank; an extra compressor which is provided in parallel with the compressor on the downstream of the boil-off gas heat exchanger and compresses the other part of the boil-off gas discharged from the storage tank; a refrigerant heat exchanger which additionally cools the first fluid cooled by means of the boil-off gas heat exchanger; a refrigerant decompressing device which expands a second fluid, which has been sent to the refrigerant heat exchanger (a fluid sent to the refrigerant heat exchanger hereafter being referred to as "a second fluid") and cooled by means of the refrigerant heat exchanger, and then sending the expanded second fluid back to the refrigerant heat exchanger; and a first decompressing device which expands the first fluid cooled by means of the boil-off gas heat exchanger and the refrigerant heat exchanger, in which the refrigerant heat exchanger may heat exchange and cool both the first fluid and the second fluid by means of the boil-off gas, which passes through the refrigerant decompressing device, as the refrigerant, the first fluid may be any one of the boil-off gas compressed by means of the compressor and a confluent flow of the boil-off gas compressed by means of the compressor and the boil-off gas compressed by means of the extra compressor, and the second fluid is any one of the boil-off gas compressed by means of the extra compressor and a confluent flow of the boil-off gas compressed by means of the compressor and the boil-off gas compressed by means of the extra compressor.

The ship may further include a gas-liquid separator that separates the partially re-liquefied liquefied gas passing through the boil-off gas heat exchanger, the refrigerant heat exchanger, and the first decompressing device and the boil-off gas remaining in a gas phase, in which the liquefied gas separated by the gas-liquid separator may be sent to the storage tank, and the boil-off gas separated by the gas-liquid separator may be sent to the boil-off gas heat exchanger.

The first fluid may be branched into two flows on an upstream of a fuel consumption place, and a part of the first fluid may sequentially pass through the boil-off gas heat exchanger, the refrigerant heat exchanger, and the first decompressing device and may be partially or totally re-liquefied and the other part thereof may be sent to the fuel consumption place.

The second fluid which is compressed by the extra compressor, passes through the refrigerant heat exchanger and the refrigerant decompressing device and is then used as the refrigerant of the refrigerant heat exchanger is sent back to the extra compressor to form a refrigerant cycle of a closed loop in which the extra compressor, the refrigerant heat exchanger, the refrigerant decompressing device, and the refrigerant heat exchanger are connected.

The second fluid which is compressed by the extra compressor, passes through the refrigerant heat exchanger and the refrigerant decompressing device, and is then used as the refrigerant of the refrigerant heat exchanger may be discharged from the storage tank and then joined with the boil-off gas passing the boil-off gas heat exchanger.

The ship may further include a valve installed on a line along which the first fluid and the second fluid communicate with each other, and the valve may be opened/closed to join or separate the boil-off gas compressed by the compressor and the boil-off gas compressed by the extra compressor.

The refrigerant decompressing device may be an expander, and the fluid just before passing through the refrigerant decompressing device and the fluid just after passing through the refrigerant decompressing device may be a gas phase.

According to another exemplary embodiment of the present invention, there is provided a boil-off gas treatment system for a ship including a storage tank for storing a liquefied gas, including: a first supply line along which boil-off gas, which is discharged from the storage tank and partially compressed by a compressor, is sent to a fuel consumption place; a second supply line which is branched from the first supply line and has an extra compressor provided thereon, with the extra compressor compressing the other part of the boil-off gas discharged from the storage tank; a return line which is branched from the first supply line and has a boil-off gas heat exchanger, a refrigerant heat exchanger, and a first decompressing device provided thereon, with the compressed boil-off gas being re-liquefied by passing through the boil-off gas heat exchanger, the refrigerant heat exchanger, and the first decompressing device; a recirculation line which has the refrigerant heat exchanger and a refrigerant decompressing device provided thereon, with the boil-off gas, which is cooled by passing through the refrigerant heat exchanger and a refrigerant decompressing device, being sent back to the refrigerant heat exchanger to be used as a refrigerant and then joined with the boil-off gas discharged from the storage tank; a first additional line which connects between the recirculation line on a downstream of the refrigerant decompressing device and the refrigerant heat exchanger and a second supply line on an upstream of the extra compressor; a second additional line which connects between the first additional line and the first supply line on an upstream of the compressor; a third additional line which connects between the first supply line on a downstream of the compressor and the second supply line on a downstream of the extra compressor; a fourth additional line which connects between the first supply line on the downstream of the compressor and the recirculation line on an upstream of the refrigerant heat exchanger and the refrigerant decompressing device; and a fifth additional line which connects the second supply line on the downstream of the extra compressor and the return line on an upstream of the boil-gas heat exchanger, in which the boil-gas heat exchanger heat-exchanges and cools the boil-off gas supplied along the return line by means of the boil-off gas discharged from the storage tank as the refrigerant, the refrigerant heat exchanger heat-exchanges and cools both boil-off gas supplied along the recirculation line and the boil-off gas supplied along the return line by means of the boil-off gas passing through the refrigerant decompressing device as the refrigerant.

The boil-off gas treatment system of a ship may further include: a first valve which is installed on the first supply line on the upstream of the compressor; a second valve which is installed on the first supply line on the downstream of the compressor; a third valve which is installed on the second supply line on the upstream of the extra compressor; a fourth valve which is installed on the second supply line on the downstream of the extra compressor; a fifth valve which is installed on the return line on the upstream of the boil-off gas heat exchanger; a sixth valve which is installed on the recirculation line on the upstream of the refrigerant decompressing device and the refrigerant heat exchanger; a ninth valve which is installed on the recirculation line on the downstream of the refrigerant decompressing device and the refrigerant heat exchanger; a tenth valve which is installed on the first additional line; a twelfth valve which is installed on the second additional line; a thirteenth valve which is installed on the third additional line; a fourteenth valve which is installed on the fourth additional line; and a fifteenth valve which is installed on the fifth additional line.

The boil-off gas treatment system of a ship may further include an eleventh valve which is installed on the first supply line on an upstream of the fuel consumption place and downstream of the second supply line.

The system may be operated while the first valve, the second valve, the third valve, the fifth valve, the sixth valve, and the tenth valve are open and the fourth valve, the ninth valve, the twelfth valve, the thirteenth valve, the fourteenth valve, and the fifteenth valve are closed, and if the boil-off gas is supplied to the extra compressor, the third valve may be closed to form the refrigerant cycle of the closed loop in which the boil-off gas circulates the extra compressor, the sixth valve, the refrigerant heat exchanger, the refrigerant decompressing device, the refrigerant heat exchanger, and the tenth valve.

If the compressor fails, the first valve, the second valve, the fifth valve, the sixth valve, and the tenth valve may be closed and the third valve and the fourth valve may open to supply the boil-off gas, which is discharged from the storage tank and then passes through the boil-off gas heat exchanger, to the fuel consumption place via the third valve, the extra compressor, and the fourth valve.

The system may be operated while the first valve, the third valve, the fourth valve, the twelfth valve, the fourteenth valve, and the fifteenth valve are open and the second valve, the fifth valve, the sixth valve, the ninth valve, the tenth valve, and the thirteenth valve are closed, and if the boil-off gas is supplied to the compressor, the first valve may be closed to form the refrigerant cycle of the closed loop in which the boil-off gas circulates the compressor, the fourteenth valve, the refrigerant heat exchanger, the refrigerant decompressing device, the refrigerant heat exchanger, and the twelfth valve.

If the extra compressor fails, the third valve, the fourth valve, the twelfth valve, the fourteenth valve, and the fifteenth valve may be closed and the first valve and the second valve may open to supply the boil-off gas, which is discharged from the storage tank and then passes through the boil-off gas heat exchanger, to the fuel consumption place via the first valve, the compressor, and the second valve.

The first valve, the second valve, the third valve, the fifth valve, the sixth valve, the ninth valve, and the thirteenth valve may be open and the fourth valve, the tenth valve, the twelfth valve, the fourteenth valve, and the fifteenth valve may be closed such that the boil-off gas compressed by the compressor and the boil-off gas compressed by the extra compressor are joined and operated.

If the compressor fails, the first valve, the fifth valve, the sixth valve, and the ninth valve may be closed to supply the boil-off gas, which is discharged from the storage tank and then passes through the boil-off gas heat exchanger, to the fuel consumption place via the third valve, the extra compressor, the thirteenth valve, and the second valve.

The first valve, the second valve, the third valve, the fifth valve, the sixth valve, and the ninth valve may be open and the fourth valve, the tenth valve, the twelfth valve, the thirteenth valve, the fourteenth valve, and the fifteenth valve may be closed so that the boil-off gas compressed by the compressor and the boil-off gas compressed by the extra compressor may be separated and operated.

If the compressor fails, the first valve, the fifth valve, the sixth valve, and the ninth valve may be closed and the thirteenth valve may be open to supply the boil-off gas, which is discharged from the storage tank and then passes through the boil-off gas heat exchanger, to the fuel consumption place via the third valve, the extra compressor, the thirteenth valve, and the second valve.

According to another exemplary embodiment of the present invention, there is provided a method including: branching boil-off gas, which is discharged from a liquefied gas storage tank, into two to allow a compressor or an extra compressor to compress the boil-off gas of the branched two flows; and sending at least one of the boil-off gas compressed by the compressor and the boil-off gas compressed by the extra compressor to a fuel consumption place or re-liquefying the at least one boil-off gas to return the at least one boil-off gas (hereinafter, referred to as 'returning boil-off gas') to the storage tank or re-circulate the at least one boil-off gas (hereinafter, referred to as 'recirculation boil-off gas'); additionally cooling the returning boil-off gas by exchanging heat with the re-circulated boil-off gas; and cooling and expanding the re-circulated boil-off gas and then exchanging heat between the cooled and expanded re-circulated boil-off gas and the returning boil-off gas.

The downstream line of the compressor and the downstream line of the extra compressor may be connected to each other to join the boil-off gas compressed by the compressor with the boil-off gas compressed by the extra compressor.

According to yet another exemplary embodiment of the present invention, there is provided a ship including a storage tank storing liquefied gas, including: a boil-off gas heat exchanger which is installed on downstream of a storage tank and heat-exchanges a compressed boil-off gas (hereafter referred to as "a first fluid") by means of a boil-off gas discharged from the storage tank as a refrigerant, thereby cooling the boil-off gas ; a compressor which is installed on downstream of the boil-off gas heat exchanger and compresses a part of the boil-off gas discharged from the storage tank; a first extra compressor which is provided in parallel with the compressor on the downstream of the boil-off gas heat exchanger and compresses the other part of the boil-off gas discharged from the storage tank; a second extra compressor which is provided in parallel with the compressor and the first extra compressor on the downstream of the boil-off gas heat exchanger and compresses the other part of the boil-off gas discharged from the storage tank; a refrigerant heat exchanger which additionally cools the first fluid cooled by means of the boil-off gas heat exchanger; a refrigerant decompressing device which expands a second fluid, which has been sent to the refrigerant heat exchanger (a fluid sent to the refrigerant heat exchanger hereafter being referred to as "a second fluid") and cooled by means of the refrigerant heat exchanger, and then sending the expanded second fluid back to the refrigerant heat exchanger; and a first decompressing device which expands the first fluid cooled by means of the boil-off gas heat exchanger and the refrigerant heat exchanger, wherein the refrigerant heat exchanger heat-exchanges and cools both the first fluid and the second fluid by means of the boil-off gas, which passes through the refrigerant decompressing device, as the refrigerant, the first fluid is any one of the boil-off gas compressed by means of the compressor, the boil-off gas compressed by means of the first extra compressor, a confluent flow of the boil-off gas compressed by means of the compressor and the boil-off gas compressed by means of the first extra compressor, and a confluent flow of the boil-off gas compressed by means of the compressor, the boil-off gas compressed by means of the first extra compressor, and the boil-off gas compressed by means of the second extra compressor, and the second fluid is any one of the boil-off gas compressed by means of the first extra compressor, the boil-off gas compressed by means of the second extra compressor, a confluent flow of the boil-off gas compressed by means of the first extra compressor and the boil-off gas compressed by means of the second extra compressor, and a confluent flow of the boil-off gas compressed by means of the compressor, the boil-off gas compressed by means of the first extra compressor and the boil-off gas compressed by means of the second extra compressor.

The boil-off gas used as the refrigerant of the refrigerant heat exchanger after passing through the refrigerant decompressing device may be joined with the boil-off gas which is discharged from the storage tank and then passes through the boil-off gas heat exchanger.

The boil-off gas used as the refrigerant of the refrigerant heat exchanger after being compressed by the first extra compressor may be sent back to the first extra compressor to form the refrigerant cycle of the closed loop circulating the first extra compressor, the refrigerant heat exchanger, the refrigerant decompressing device, and the refrigerant heat exchanger.

The boil-off gas used as the refrigerant of the refrigerant heat exchanger after being compressed by the second extra compressor may be sent back to the second extra compressor to form the refrigerant cycle of the closed loop circulating the second extra compressor, the refrigerant heat exchanger, the refrigerant decompressing device, and the refrigerant heat exchanger.

The boil-off gas compressed by the first extra compressor and the boil-off gas compressed by the second extra compressor may be joined and supplied to the refrigerant heat exchanger, and the refrigerant cycle of the closed loop may be formed to pass the boil-off gas supplied to the refrigerant heat exchanger through the refrigerant decompressing device and the refrigerant heat exchanger and then branch the boil-off gas into two flows to be sent to the first extra compressor or the second extra compressor.

According to another exemplary embodiment of the present invention, there is provided a boil-off gas treatment system for a ship including a storage tank storing liquefied gas, including: a first supply line along which a part of boil-off gas discharged from the storage tank is compressed by a compressor, is sent to a fuel consumption place; a second supply line which is branched from the first supply line and has a first extra compressor provided thereon, with the first extra compressor compressing the other part of the boil-off gas discharged from the storage tank; a third supply line which is branched from the second supply line and has a second extra compressor provided thereon, the second extra compressor compressing the other part of the boil-off gas discharged from the storage tank; a return line which is branched from the first supply line and has a boil-off gas heat exchanger, a refrigerant heat exchanger, and a first decompressing device provided thereon, with the compressed boil-off gas being re-liquefied by passing through the boil-off gas heat exchanger, the refrigerant heat exchanger, and the first decompressing device; and a recirculation line which has the refrigerant heat exchanger and the refrigerant decompressing device thereon, with the boil-off gas, which is cooled by passing through the refrigerant heat exchanger and the refrigerant decompressing device and sent back to the refrigerant heat exchanger to be used as a refrigerant, being joined with boil-off gas discharged from the storage tank, in which the boil-off gas heat exchanger heat-exchanges and cools the boil-off gas supplied along the return line by means of the boil-off gas discharged from the storage tank as the refrigerant, and the refrigerant heat exchanger heat-exchanges and cools both the boil-off gas supplied along the recirculation line and the boil-off gas supplied along the return line by means of the boil-off gas passing through the refrigerant decompressing device as the refrigerant.

The recirculation line on the upstream of the refrigerant decompressing device and the refrigerant heat exchanger may be sequentially connected to a third supply line on a downstream of the second extra compressor and a second supply line on a downstream of the first extra compressor, and then connected to a first supply line on the downstream of the compressor, and the boil-off gas treatment system for a ship may further include: a first valve which is installed on the upstream of the compressor on the first supply line; a second valve which is installed on the downstream of the compressor on the first supply line; a third valve which is installed on the upstream of the first extra compressor on the second supply line; a fourth valve which is installed on the downstream of the first extra compressor on the second supply line; a sixth valve which is installed on the recirculation line between the first supply line and the second supply line; a ninth valve which is installed on the recirculation line for sending the boil-off gas from the refrigerant heat exchanger to the first supply line; a tenth valve which is installed on the upstream of the second extra compressor on the third supply line; an eleventh valve which is installed on the downstream of the second extra compressor on the third supply line; and a twelfth valve which is installed on the recirculation line between the second supply line and the third supply line, in which the sixth valve and the twelfth valve are opened/closed to join or separate the boil-off gas compressed by the compressor, the boil-off gas compressed by the first extra compressor, and the boil-off gas compressed by the second extra compressor.

The boil-off gas treatment system for a ship may further include: a first additional line which connects between the recirculation line and the third supply line; a second additional line which connects between the first additional line and the second supply line; a thirteenth valve which is installed on the first additional line; and a fourteenth valve which is installed on the second additional line.

One side of the first additional line may be connected to the recirculation line for sending the boil-off gas, which passes through the refrigerant decompressing device and the refrigerant heat exchanger, to the first supply line, the other side thereof may be connected to the third supply line between the tenth valve and the second extra compressor, one side of the second additional line may be connected to the first additional line on an upstream of the thirteenth valve, and the other side thereof may be connected to the second supply line between the third valve and the first extra compressor.

When the ship is traveling at a high speed, only any one of the compressor, the first extra compressor, and the second extra compressor may be used, and when the ship is traveling at a low speed, any two of the compressor, the first extra compressor, and the second extra compressor may be used, and when the ship is anchored, all the compressor, the first extra compressor, and the second extra compressor may be used.

The system may be operated while the first valve, the second valve, the third valve, the fourth valve, the sixth valve, the tenth valve, the eleventh valve, the thirteenth valve, and the fifteenth valve are open and the ninth valve, the twelfth valve, and the fourteenth valve are closed, and if the boil-off gas is supplied to the second extra compressor, the tenth valve may be closed to form the refrigerant cycle of the closed loop in which the boil-off gas circulates the second extra compressor, the eleventh valve, the refrigerant heat exchanger, the refrigerant decompressing device, the refrigerant heat exchanger, and the thirteenth valve.

The system may be operated while the first valve, the second valve, the third valve, the fourth valve, the twelfth valve, the fourteenth valve, and the fifteenth valve are open and the sixth valve, the ninth valve, the tenth valve, the eleventh valve, and the thirteenth valve are closed, and if the boil-off gas is supplied to the first extra compressor, the third valve may be closed to form the refrigerant cycle of the closed loop in which the boil-off gas circulates the first extra compressor, the fourth valve, the twelfth valve, the refrigerant heat exchanger, the refrigerant decompressing device, the refrigerant heat exchanger, and the fourteenth valve.

The system may be operated while the first valve, the second valve, the fourth valve, the ninth valve, the eleventh valve, the twelfth valve, the thirteenth valve, the fourteenth valve, and the fifteenth valve are open and the third valve, the sixth valve, and the tenth valve are closed, and if the boil-off gas is supplied to the first extra compressor and the second extra compressor, the ninth valve may be closed to form the refrigerant cycle of the closed loop in which the boil-off gas compressed by the first extra compressor and the boil-off gas passing through the second extra compressor are joined to be supplied to the refrigerant heat exchanger and the boil-off gas supplied to the refrigerant heat exchanger passes through the refrigerant decompressing device and the refrigerant heat exchanger and then branched into two flows to be sent to the first extra compressor and the second extra compressor, respectively.

The first valve, the second valve, the third valve, the fourth valve, the sixth valve, the ninth valve, the tenth valve, the eleventh valve, the twelfth valve, and the fifteenth valve may be open and the thirteenth valve and the fourteenth valve may be closed so that the boil-off gas compressed by the compressor, the boil-off gas compressed by the first extra compressor, and the boil-off gas compressed by the second extra compressor may be joined and operated.

The first valve, the second valve, the third valve, the fourth valve, the ninth valve, the tenth valve, the eleventh valve, the twelfth valve, and the fifteenth valve may be open and the sixth valve, the thirteenth valve, and the fourteenth valve may be closed so that the boil-off gas compressed by the first extra compressor and the boil-off gas compressed by the second extra compressor may be joined to be sent to the refrigerant heat exchanger, and a part of the boil-off gas compressed by the compressor may be sent to the fuel consumption place and the other part thereof may be sent to the boil-off gas heat exchanger.

The first valve, the second valve, the third valve, the fourth valve, the sixth valve, the ninth valve, the tenth valve, the eleventh valve, and the fifteenth valve may be open and the twelfth valve, the thirteenth valve, and the fourteenth valve may be closed to send the boil-off gas compressed by the second extra compressor to the refrigerant heat exchanger and join the boil-off gas compressed by the compressor with the boil-off gas compressed by the first extra compressor, so a part of the joined boil-off gas may be sent to the fuel consumption place and the other part thereof may be sent to the boil-off gas heat exchanger.

According to another exemplary embodiment of the present invention, there is provided a method including: branching boil-off gas, which is discharged from a liquefied gas storage tank, into three to allow a compressor, a first extra compressor, or a second extra compressor to compress the boil-off gas of the branched three flows; and sending at least one of the boil-off gas compressed by the compressor, the boil-off gas compressed by the first extra compressor, and the boil-off gas compressed by the second extra compressor to a fuel consumption place or re-liquefying the at least one boil-off gas to return the at least one boil-off gas (hereinafter, referred to as 'returning boil-off gas') to the storage tank or re-circulate the at least one boil-off gas (hereinafter, referred to as 'recirculation boil-off gas'), in which the returning boil-off gas is additionally cooled by exchanging heat with the boil-off gas discharged from the storage tank, the re-circulated boil-off gas is cooled and expanded and then exchanges heat with the returning boil-off gas.

The downstream line of the compressor and the downstream line of the first extra compressor may be connected so that the boil-off gas compressed by the compressor may be joined with the boil-off gas compressed by the first extra compressor.

The downstream line of the first extra compressor and the downstream line of the second extra compressor may be connected so that the boil-off gas compressed by the first extra compressor may be joined with the boil-off gas compressed by the second extra compressor.

The downstream line of the compressor, the downstream line of the first extra compressor, and the downstream line of the second extra compressor may be connected so that the boil-off gas compressed by the compressor, the boil-off gas compressed by the first extra compressor, and the boil-off gas compressed by the second extra compressor may be joined.

According to another exemplary embodiment of the present invention, there is provided a ship including a storage tank for storing a liquefied gas, includes: a boil-off gas heat exchanger which is installed on a downstream of a storage tank and heat-exchanges a compressed boil-off gas (hereafter referred to as "a first fluid") by means of a boil-off gas discharged from the storage tank as a refrigerant, thereby cooling same; a compressor which is installed on the downstream of the boil-off gas heat exchanger and compresses a part of the boil-off gas discharged from the storage tank; an extra compressor which is provided in parallel with the compressor on the downstream of the boil-off gas heat exchanger and compresses the other part of the boil-off gas discharged from the storage tank; a boost compressor which is installed on the upstream of the boil-off gas heat exchanger to compress the first fluid supplied to the boil-off gas heat exchanger; a refrigerant heat exchanger which additionally cools the first fluid cooled by the boil-off gas heat exchanger; a refrigerant decompressing device which expands the second fluid, which is sent to the refrigerant heat exchanger (hereinafter, the fluid sent to the refrigerant heat exchanger being referred to as 'second fluid') and cooled by the refrigerant heat exchanger, and then sent the expanded second fluid back to the refrigerant heat exchanger; and a first decompressing device which expands the first fluid cooled by the boil-off gas heat exchanger and the refrigerant heat exchanger, in which the refrigerant heat exchanger may heat exchange and cool both the first fluid and the second fluid by means of the boil-off gas, which passes through the refrigerant decompressing device, as the refrigerant, the first fluid may be any one of the boil-off gas compressed by means of the compressor and a confluent flow of the boil-off gas compressed by means of the compressor and the boil-off gas compressed by means of the extra compressor, and the second fluid is any one of the boil-off gas compressed by means of the extra compressor and a confluent flow of the boil-off gas compressed by means of the compressor and the boil-off gas compressed by means of the extra compressor.

The ship may further include a gas-liquid separator that separates the partially re-liquefied liquefied gas passing through the boil-off gas heat exchanger, the refrigerant heat exchanger, and the first decompressing device and the boil-off gas remaining in a gas phase, in which the liquefied gas separated by the gas-liquid separator may be sent to the storage tank, and the boil-off gas separated by the gas-liquid separator may be sent to the boil-off gas heat exchanger.

The boost compressor may have a capacity of ½ relative to that of the compressor.

The first fluid may be branched into two flows on an upstream of a fuel consumption place, and a part of the first fluid may sequentially pass through the boost compressor, the boil-off gas heat exchanger, the refrigerant heat exchanger, and the first decompressing device and may be partially or totally re-liquefied and the other part thereof may be sent to the fuel consumption place.

The second fluid which is compressed by the extra compressor, passes through the refrigerant heat exchanger and the refrigerant decompressing device, and then used as the refrigerant of the refrigerant heat exchanger is sent back to the extra compressor to form a refrigerant cycle of a closed loop in which the extra compressor, the refrigerant heat exchanger, the refrigerant decompressing device, and the refrigerant heat exchanger are connected.

The second fluid which is compressed by the extra compressor, passes through the refrigerant heat exchanger and the refrigerant decompressing device, and then used as the refrigerant of the refrigerant heat exchanger may be discharged from the storage tank and then joined with the boil-off gas passing the boil-off gas heat exchanger.

The ship may further include a valve installed on a line along which the first fluid and the second fluid communicate with each other, and the valve may be opened/closed to join or separate the boil-off gas compressed by the compressor and the boil-off gas compressed by the extra compressor.

The boost compressor may compress the boil-off gas to a pressure equal to or lower than a critical point.

The boost compressor may compress the boil-off gas to a pressure exceeding the critical point.

The boost compressor may compress the boil-off gas to 300 bars.

According to an exemplary embodiment of the present invention, there is provided a boil-off gas treatment system for a ship including a storage tank storing liquefied gas, including: a first supply line along which a part of boil-off gas discharged from the storage tank is compressed by a compressor, is sent to a fuel consumption place; a second supply line which is branched from the first supply line and has an extra compressor provided thereon, the extra compressor compressing the other part of the boil-off gas discharged from the storage tank; a return line which is branched from the first supply line and re-liquefy the compressed boil-off gas by passing the compressed boil-off gas through a boil-off gas heat exchanger, a refrigerant heat exchanger, and a first decompressing device on the return line; and a recirculation line which has the refrigerant heat exchanger and the refrigerant decompressing device provided thereon, with the boil-off gas, which is cooled by passing through the refrigerant heat exchanger and the refrigerant decompressing device, being sent back to the refrigerant heat exchanger to be used as a refrigerant and is joined with boil-off gas discharged from the storage tank, in which the boil-off gas heat exchanger heat-exchanges and cools the boil-off gas supplied along the return line by means of the boil-off gas discharged from the storage tank as the refrigerant, and the refrigerant heat exchanger heat-exchanges and cools both the boil-off gas supplied along the recirculation line and the boil-off gas supplied along the return line by means of the boil-off gas passing through the refrigerant decompressing device as the refrigerant.

The boil-off gas treatment system for a ship may further include: a first valve which is installed on the upstream of the compressor on the first supply line; a second valve which is installed on the downstream of the compressor on the first supply line; a third valve which is installed on the upstream of the extra compressor on the second supply line; a fourth valve installed on the downstream of the extra compressor on the second supply line; a sixth valve which is provided between the first supply line and the second supply line on the recirculation line along which the boil-off gas branched from the first supply line is sent to the refrigerant heat exchanger; a ninth valve which is installed on the recirculation line for sending the boil-off gas from the refrigerant heat exchanger to the first supply line; a first additional line which connects the recirculation line between the ninth valve and the refrigerant heat exchanger with the second supply line between the third valve and the extra compressor; and a tenth valve which is installed on the first additional line.

The system may be operated while the first valve, the second valve, the third valve, the fourth valve, and the tenth valve are open and the sixth valve and the ninth valve are closed, and if the boil-off gas is supplied to the extra compressor, the third valve may be closed to form the refrigerant cycle of the closed loop in which the boil-off gas circulates the extra compressor, the fourth valve, the refrigerant heat exchanger, the refrigerant decompressing device, the refrigerant heat exchanger, and the tenth valve.

If the compressor fails, the first valve, the second valve, and the tenth valve, may be closed and the third valve and the sixth valve may be open to supply the boil-off gas, which is discharged from the storage tank and then passes through the boil-off gas heat exchanger, to the fuel consumption place via the third valve, the extra compressor, the fourth valve, and the sixth valve.

The first valve, the second valve, the third valve, the fourth valve, the sixth valve and the ninth valve are open and the tenth valve is closed so that the boil-off gas compressed by the compressor and the boil-off gas compressed by the extra compressor may be joined and operated.

If the compressor fails, the first valve and the second valve may be closed so that the boil-off gas, which is discharged from the storage tank and then passes through the boil-off gas heat exchanger, may be supplied to the fuel consumption place via the third valve, the extra compressor, the fourth valve, and the sixth valve.

The first valve, the second valve, the third valve, the fourth valve, and the ninth valve are open and the sixth valve and the tenth valve are closed so that the boil-off gas compressed by the compressor and the boil-off gas compressed by the extra compressor may be separated and operated.

If the compressor fails, the first valve and the second valve may be closed and the sixth valve is open so that the boil-off gas, which is discharged from the storage tank and then passes through the boil-off gas heat exchanger, may be supplied to the fuel consumption place via the third valve, the extra compressor, the fourth valve, and the sixth valve.

According to an exemplary embodiment of the present invention, there is provided a method including: branching boil-off gas, which is discharged from a liquefied gas storage tank, into two to allow a compressor or an extra compressor to compress the boil-off gas of the branched two flows; sending at least one of the boil-off gas compressed by the compressor and the boil-off gas compressed by the extra compressor to a fuel consumption place or re-liquefying the at least one boil-off gas to return the at least one boil-off gas to the storage tank or re-circulate the at least one boil-off gas, in which the returning boil-off gas is compressed and cooled by exchanging heat with the boil-off gas discharged from the storage tank and then additionally cooled by exchanging heat with the re-circulated boil-off gas, and the re-circulated boil-off gas is compressed, cooled and expanded and then exchanges heat with the returning boil-off gas.

The downstream line of the compressor and the downstream line of the extra compressor may be connected to each other to join the boil-off gas compressed by the compressor with the boil-off gas compressed by the extra compressor.

Advantageous Effects

Compared with the existing partial re-liquefaction system (PRS), the present invention can increase the re-liquefaction efficiency and the re-liquefaction amount since the boil-off gas is decompressed after undergoing the additional cooling process by the refrigerant heat exchanger. In particular, most or all of the remaining boil-off gas can be re-liquefied without employing the refrigeration cycle using the separate refrigerant, thereby increasing the economical efficiency.

Further, according to the present invention, it is possible to flexibly control the refrigerant flow rate and the supply of cold heat in response to the discharge amount of the boil-off gas, the engine load depending on the operating speed of the ship, and the like.

According to the embodiment of the present invention, it is possible to contribute to securing the space on the ship and save the cost of additionally installing the compressor by increasing the re-liquefaction efficiency and the re-liquefaction amount by using the extra compressor already provided. In particular, the refrigerant heat exchanger can use not only the boil-off gas compressed by the extra compressor but also the boil-off gas compressed by the compressor as the refrigerant to increase the flow rate of the boil-off gas used as the refrigerant in the refrigerant heat exchanger, thereby more increasing the re-liquefaction efficiency and the re-liquefaction amount.

According to another embodiment of the present invention, since there are two or more extra compressors, the smaller capacity of the two or more compressors can be used to increase the economical efficiency and sufficiently prepare for the failure of the compressor or the extra compressor, thereby more elaborately and flexibly operating the system according to the operating speed of the ship.

According to another embodiment of the present invention, the pressure of the boil-off gas undergoing the re-liquefaction process can be increased due to the additionally included boost compressor, thereby further increasing the re-liquefaction efficiency and the re-liquefaction amount.

BRIEF DESCRIPTION OF THE DRAWINGS

FIG. 1 is a configuration diagram schematically showing the existing partial re-liquefaction system.

FIG. 2 is a configuration diagram schematically showing a boil-off gas treatment system for a ship according to a first embodiment of the present invention.

FIG. 3 is a configuration diagram schematically showing a boil-off gas treatment system for a ship according to a second embodiment of the present invention.

FIG. 4 is a configuration diagram schematically showing a boil-off gas treatment system for a ship according to a third embodiment of the present invention.

FIG. 5 is a configuration diagram schematically showing a boil-off gas treatment system for a ship according to a fourth embodiment of the present invention.

FIG. 6 is a configuration diagram schematically showing a boil-off gas treatment system for a ship according to a fifth embodiment of the present invention.

FIG. 7 is a configuration diagram schematically showing a boil-off gas treatment system for a ship according to a sixth embodiment of the present invention.

FIG. 8 is a configuration diagram schematically showing a boil-off gas treatment system for a ship according to a seventh embodiment of the present invention.

FIG. 9 is a graph schematically illustrating a phase change of methane depending on temperature and pressure.

FIG. 10 shows graphs showing temperature values of methane depending on a heat flow under different pressures.

BEST MODE

Hereinafter, configurations and effects of exemplary embodiments of the present invention will be described with reference to the accompanying drawings. The present invention can variously be applied to ships such as a ship equipped with an engine using natural gas as fuel and a ship including a liquefied gas storage tank. In addition, the following embodiments may be changed in various forms, and therefore the technical scope of the present invention is not limited to the following embodiments.

Boil-off gas treatment systems of the present invention to be described below can be applied to offshore structures such as LNG FPSO and LNG FSRU, in addition to all types of ships and offshore structures equipped with a storage tank capable of storing a low-temperature fluid cargo or liquefied gas, i.e., ships such as a liquefied natural gas carrier, a liquefied ethane gas carrier, and LNG RV. However, for convenience of explanation, the following embodiments will describe, by way of example, liquefied natural gas which is a typical low-temperature fluid cargo.

Further, a fluid on each line of the present invention may be in any one of a liquid phase, a gas-liquid mixed state, a gas phase, and a supercritical fluid state, depending on operating conditions of a system.

FIG. 1 is a configuration diagram schematically showing the existing partial re-liquefaction system.

Referring to FIG. 1, in the conventional partial re-liquefaction system, the boil-off gas generated and discharged from a storage tank storing a fluid cargo is sent along a pipe and compressed by a boil-off gas compressor 10.

A storage tank T is provided with a sealing and heat insulating barrier to be able to store liquefied gas such as liquefied natural gas at a cryogenic temperature. However, the sealing and heat insulating barrier may not completely shut off heat transmitted from the outside. Therefore, the liquefied gas is continuously evaporated in the storage tank, so an internal pressure of the storage tank may be increased. Accordingly, to prevent the pressure of the tank from excessively increasing due to the boil-off gas and keep the internal pressure of the tank at an appropriate level, the boil-off gas in the storage tank is discharged and is then supplied to the boil-off compressor 10.

When the boil-off gas discharged from the storage tank and compressed by the boil-off gas compressor 10 is referred to as a first stream, the first stream of the compressed boil-off gas is divided into a second stream and a third stream, and the second stream may be formed to be liquefied and then return to the storage tank T, and the third stream may be formed to be supplied to gas fuel consumption places such as a boost engine and a power generation engine in a ship. In this case, in the boil-off gas compressor 10 can compress the boil-off gas to a supply pressure of the fuel consumption place, and the second stream may be branched via all or a part of the boil-off gas compressor if necessary. All of the boil-off gas compressed as the third stream may also be supplied according to the amount of fuel required for the fuel consumption place, and all of the compressed boil-off gas may return to the storage tank by supplying the whole amount of boil-off gas as the second stream. An example of the gas fuel consumption places may include a DF generator, a gas turbine, DFDE, and the like, in addition to high pressure gas injection engine (e.g., ME-GI engines developed by MDT Co., etc.) and low-pressure gas injection engines (e.g., generation X-dual fuel engine (X-DF engine) by Wartsila Co.).

At this time, a heat exchanger 20 is provided to liquefy the second stream of the compressed boil-off gas. The boil-off gas generated from the storage tank is used as a cold heat supply source of the compressed boil-off gas. The compressed boil-off gas, that is, the second stream, whose temperature rises while being compressed by the boil-off gas compressor while passing through the heat exchanger 20 is cooled, and the boil-off gas generated from the storage tank and introduced into the heat exchanger 20 is heated and then supplied to the boil-off gas compressor 10.

Since a flow rate of pre-compressed boil-off gas is greater than that of the second stream, the second stream of the compressed boil-off gas may be at least partially liquefied by receiving cold heat from the boil-off gas before being compressed. As described above, the heat exchanger heat-exchanges the low-temperature boil-off gas immediately after being discharged from the storage tank with the high-pressure boil-off gas compressed by the boil-off gas compressor to liquefy the high-pressure boil-off gas.

The boil-off gas of the second stream passing through the heat exchanger 20 is further cooled while being decompressed by passing through an expansion means 30 such as an expansion valve or an expander and is then supplied to a gas-liquid separator 40. The gas-liquid separator 40 separates the liquefied boil-off gas into gas and liquid components. The liquid component, that is, the liquefied natural gas returns to the storage tank, and the gas component, that is, the boil-off gas is discharged from the storage tank to be joined with a flow of boil-off gas supplied to the heat exchanger 20 and the boil-off gas compressor 10 or is then supplied back to the heat exchanger 20 to be utilized as a cold heat supply source which heat-exchanges high-pressure boil-off gas compressed by the boil-off gas compressor 10. Of course, the boil-off gas may be sent to a gas combustion unit (GCU) or the like to be combusted or may be sent to a gas consumption place (including a gas engine) to be consumed. Another expansion means 50 for additionally decompressing the gas separated by the gas-liquid separator before being joined with the flow of boil-off gas may be further provided.

FIG. 2 is a configuration diagram schematically showing a boil-off gas treatment system for a ship according to a first embodiment of the present invention.

Referring to FIG. 2, the system of the present embodiment includes a refrigerant circulator 300*a* which is supplied with boil-off gas generated from a low-temperature fluid cargo stored in a storage tank and circulates the boil-off gas as a refrigerant.

To this end, the system includes a refrigerant supply line CSLa which supplies boil-off gas from the storage tank to a refrigerant circulator 300*a*. The refrigerant supply line is provided with a valve 400*a* to shut off the refrigerant supply line CSLa if a sufficient amount of boil-off gas, which may circulate the refrigerant circulator, is supplied, such that the refrigerant circulator 300*a* is operated as a closed loop.

Similar to the above-described basic embodiment, even in the first modified embodiment, the compressor 100*a* for compressing the boil-off gas generated from the low-temperature fluid cargo in the storage tank T is also provided. The boil-off gas generated from the storage tank is introduced into the compressor 100*a* along a boil-off gas supply line BLa.

The storage tank (T) of the present embodiment may be an independent type tank in which a load of the fluid cargo is not directly applied to a heat insulating layer, or a membrane type tank in which the load of the cargo is directly applied to the heat insulating layer. The independent type tank can be used as a pressure vessel which is designed to withstand a pressure of 2 barg or more.

Meanwhile, in the present embodiment, only a line for re-liquefying the boil-off gas is shown. However, the boil-off gas compressed by the compressor may be supplied as fuel to a fuel consumption place including a boost engine and a power generation engine of a ship or an offshore structure and there may be no re-liquefied boil-off gas when the fuel consumption may consume the whole amount of boil-off gas. When a ship is anchored, there is little or no consumption of gas fuel, the whole amount of boil-off gas may also be supplied to a re-liquefaction line RLa.

The compressed boil-off gas is supplied to a boil-off gas heat exchanger 200*a* along the boil-off gas re-liquefaction line RLa. The boil-off gas heat exchanger 200*a* is provided over the boil-off gas re-liquefaction line RLa and the boil-off gas supply line BLa to exchange heat between boil-off gas introduced into the compressor 100*a* and the boil-off gas compressed by at least a part of the compressor. The boil-off gas whose temperature rises during the compression is cooled through the heat exchange with the low-temperature boil-off gas which is generated from the storage tank and is to be introduced into the compressor 100*a*.

A downstream of the boil-off gas heat exchanger 200*a* is provided with a refrigerant heat exchanger 500*a*. The boil-off gas, which is compressed and then heat-exchanged by the boil-off gas heat exchanger is additionally cooled by the heat exchange with the boil-off gas which circulates the refrigerant circulator 300*a*.

The refrigerant circulator 300*a* includes a refrigerant compressor 310*a* which compresses the boil-off gas supplied from the storage tank, a cooler 320*a* which cools the boil-off gas compressed by the refrigerant compressor, and a refrigerant decompressing device 330*a* which decompresses and additionally cools the boil-off gas cooled by the cooler. The refrigerant decompressing device 330*a* may be an expansion valve or an expander which adiabatically expands and cools the boil-off gas.

The boil-off gas cooled by the refrigerant decompressing device 330*a* is supplied as a refrigerant to the refrigerant heat exchanger 500*a* along the refrigerant circulation line CCLa. The refrigerant heat exchanger 500*a* cools the boil-off gas by the heat exchange with the boil-off gas supplied via the boil-off gas heat exchanger 200*a*. The boil-off gas of the refrigerant circulation line CCLa passing through the refrigerant heat exchanger 500*a* is circulated to the refrigerant compressor 310*a* and circulates the refrigerant circulation line while undergoing the above-described compression and cooling processes.

Meanwhile, the boil-off gas of the boil-off gas re-liquefaction line RLa cooled by the refrigerant heat exchanger 500*a* is decompressed by a first decompressing device 600*a*. The first decompressing device 600*a* may be an expansion valve, such as a Joule-Thomson valve, or an expander.

The decompressed boil-off gas is separated into gas and liquid by being supplied to a gas-liquid separator 700*a* on a downstream of the first decompressing device 600*a*, and the liquid separated by the gas-liquid separator 700*a*, that is, the liquefied natural gas is supplied to the storage tank T and again stored.

The gas separated by the gas-liquid separator 700*a*, that is, the boil-off gas is additionally decompressed by a second decompressing device 800*a*, and is joined with the flow of boil-off gas to be introduced into the boil-off gas heat exchanger 200*a* from the storage tank T or is supplied to the boil-off gas heat exchanger 200*a* to be utilized as the cold heat supply source which heat-exchanges a high-pressure boil-off gas compressed by the compressor 100*a*. Of course, the boil-off gas may be sent to a gas combustion unit (GCU) or the like to be combusted or may be sent to a fuel consumption place (including a gas engine) to be consumed.

FIG. 3 is a configuration diagram schematically showing a boil-off gas treatment system for a ship according to a second embodiment of the present invention.

Referring to FIG. 3, according to the present embodiment, in a refrigerant circulator 300*b*, the boil-off gas which is to be introduced into a refrigerant decompressing device 330*b* from a cooler 320*b* is cooled by exchanging heat with the boil-off gas decompressed by the refrigerant decompressing device 330*b* and then supplied to the refrigerant decompressing device 330*b*.

Since the boil-off gas is cooled while being decompressed by the refrigerant decompressing device 330*b*, the boil-off gas on the downstream of the refrigerant decompressing device has temperature lower than that of the boil-off gas on the upstream of the refrigerant decompressing device. In this regard, according to the present embodiment, the boil-off gas on the upstream of the refrigerant decompressing device is cooled by exchanging heat with the boil-off gas on the downstream of the refrigerant decompressing device and then introduced into the decompressing device. To this end, as illustrated in FIG. 3, the boil-off gas on the upstream of the refrigerant decompressing device 330b may be supplied to the refrigerant heat exchanger 500b (portion A of FIG. 3). If necessary, a separate heat exchanging device which may exchange heat between the boil-off gases on the upstream and downstream of the refrigerant decompressing device may be additionally provided.

As described above, the system of the present embodiments can re-liquefy and store the boil-off gas generated from the storage tank fluid cargo, thereby increasing the transportation rate of the fluid cargo. In particular, even when the consumption amount of fuel on the in-ship gas consumption places is small, the gas can be combusted by the gas combustion unit (GCU) or the like to prevent the pressure of the storage tank from increasing to reduce or eliminate the amount of wasted cargo, thereby preventing a waste of energy.

In addition, the boil-off gas is circulated as the refrigerant to be utilized as the cold heat source for re-liquefaction of the boil-off gas, thereby effectively re-liquefying the boil-off gas without configuring the separate refrigerant cycle, and the separate refrigerant need not be supplied to contribute to securing the in-ship space and increase the economical efficiency. In addition, if the refrigerant is insufficient in the refrigerant cycle, the refrigerant may be replenished from the storage tank to be smoothly replenished and the refrigerant cycle may be effectively operated.

As described above, the boil-off gas may be re-liquefied by using the cold heat of the boil-off gas itself in multiple steps, so that the system configuration for treating the in-ship boil-off gas can be simplified and the cost required to install and operate the apparatus for complicated boil-off gas treatment can be saved.

FIG. 4 is a configuration diagram schematically showing a boil-off gas treatment system for a ship according to a third embodiment of the present invention.

Referring to FIG. 4, the ship of the present embodiment includes: a boil-off gas heat exchanger 110 which is installed on the downstream of the storage tank T; a compressor 120 and an extra compressor 122 which are installed on the downstream of the boil-off gas heat exchanger 110 to compress the boil-off gas discharged from the storage tank T; a cooler 130 which lowers temperature of the boil-off gas compressed by the extra compressor 120; an extra cooler 132 which lowers the temperature of the boil-off gas compressed by the extra compressor 122; a first valve 191 which is installed on the upstream of the compressor 120; a second valve 192 which is installed on the downstream of the cooler 130; a third valve 193 which is installed on the upstream of the extra compressor 122; a fourth valve 194 which is installed on the downstream of the extra cooler 132; a refrigerant heat exchanger 140 which additionally cools the boil-off gas cooled by the boil-off gas heat exchanger 110; a refrigerant decompressing device 160 which expands the boil-off gas passing through the refrigerant heat exchanger 140 and then sends the expanded boil-off gas back to the refrigerant heat exchanger 140; and a first decompressing device 150 which expands the boil-off gas additionally cooled by the refrigerant heat exchanger 140.

The boil-off gas, which is naturally generated from the storage tank T and then discharged, is supplied to a fuel consumption source 180 along the first supply line L1. The boil-off gas heat exchanger 110 is installed on the first supply line L1 and recovers cold heat from the boil-off gas immediately after being discharged from the storage tank T. The ship of the present embodiment may further include an eleventh valve 203 which is installed on the upstream of the fuel consumption place 180 to controlling a flow rate of the boil-off gas sent to the fuel consumption place 180 and opening/closing thereof.

The boil-off gas heat exchanger 110 is supplied with the boil-off gas discharged from the storage tank T and uses the boil-off gas supplied to the boil-off gas heat exchanger 110 along the return line L3 as a refrigerant. A fifth valve 195 which controls the flow rate of the boil-off gas and the opening/closing thereof may be installed on a return line L3.

The compressor 120 and the extra compressor 122 compress the boil-off gas passing through the boil-off gas heat exchanger 110. The compressor 120 is installed on the first supply line L1 and the extra compressor 122 is installed on the second supply line L2. The second supply line L2 is branched from the first supply line L1 on the upstream of the compressor 120 and connected to the first supply line L1 on the downstream of the compressor 120. In addition, the compressor 120 and the extra compressor 122 are installed in parallel, and may have the same performance.

In general, the ship is additionally provided with the extra compressor 122 and the extra cooler 132 for preparing for the case where the compressor 120 and the cooler 130 fail. Typically, the extra compressor 122 and the extra cooler 132 are not used at ordinary times when the compressor 120 or the cooler 130 does not fail.

That is, typically, at ordinary times when the compressor 120 or the cooler 130 does not fail, the third valve 193 on an upstream of the extra compressor 122 and the fourth valve 194 on a downstream of the extra cooler 132 are closed so that the boil-off gas is supplied to the fuel consumption place 180 via the compressor 120 and the cooler 130, and when the compressor 120 or the cooler 130 fails, the third valve 193 on the upstream of the extra compressor 122 and the fourth valve 194 on the downstream of the extra cooler 132 are open and the first valve 191 on the upstream of the compressor 120 and the second valve 192 on a downstream of the cooler 130 are closed so that the boil-off gas is supplied to the fuel consumption place 180 via the extra compressor 122 and the extra cooler 132.

The present invention is to increase the re-liquefaction efficiency and re-liquefaction amount of the boil-off gas by using the extra compressor 122 and the extra cooler 132 which are not used even if they are installed in the ship, and sends a part of the boil-off gas compressed by the extra compressor 122 to the fuel consumption place 180 and uses the other part of the boil-off gas as a refrigerant which additionally cools the boil-off gas in the refrigerant heat exchanger 140.

FIG. 9 is a graph schematically illustrating a phase change of methane depending on temperature and pressure. Referring to FIG. 9, methane becomes a supercritical fluid state at a temperature of approximately −80° C. or higher and a pressure of approximately 55 bars or higher. That is, in the case of methane, a critical point is approximately −80° C. and 55 bars. The supercritical fluid state is a third state different from a liquid phase or a gas phase.

On the other hand, if boil-off gas has a temperature lower than the critical point at a pressure equal to or higher than the critical point, it may also be a state similar to a supercritical state in which a density is high, unlike a general liquid phase. Here, the state of the boil-off gas having a pressure equal to or higher than the critical point and a temperature equal to lower than the critical point is referred to as a "high-pressure liquid phase".

The boil-off gas compressed by the compressor 120 or the extra compressor 122 may be in a gaseous state or in a supercritical fluid state depending on how much the boil-off gas is compressed.

When the boil-off gas sent to the boil-off gas heat exchanger 110 through the return line L3 is in a gas phase, the temperature of the boil-off gas is lowered while the boil-off gas passes through the boil-off gas heat exchanger 110, and thus the boil-off gas may be a mixed state of liquid and gas. In the case of the supercritical fluid state, the temperature of the boil-off gas is lowered while the boil-off gas passes through the boil-off gas heat exchanger 110 and thus the boil-off gas may be the "high-pressure liquid phase".

The temperature of the boil-off gas cooled by the boil-off gas heat exchanger 110 is further lowered while the boil-off gas passes through the refrigerant heat exchanger 140. When the boil-off gas passing through the boil-off gas heat exchanger 110 is in the mixed state of liquid and gas, the temperature of the boil-off gas is further lowered while the boil-off gas passes through the refrigerant heat exchanger 140 and thus the boil-off gas becomes the mixed state in which a ratio of liquid is higher or becomes the liquid phase and in the case of the "high-pressure liquid phase", the temperature of the boil-off gas is further lowered while the boil-off gas passes through the refrigerant heat exchanger 140.

Further, even when the boil-off gas which passes through the refrigerant heat exchanger 140 is in the "high-pressure liquid phase", the pressure of the boil-off gas is lowered while the boil-off gas passes through the first decompressing device 150, and thus the pressure of the boil-off gas becomes low in a liquid phase or the mixed state of liquid and gas.

It can be appreciated that even if the pressure of the boil-off gas is lowered to the same level (P in FIG. 9) by the first decompressing device 150, the boil-off gas becomes the mixed state in which the ratio of the liquid is higher in the case where the boil-off gas is decompressed in the higher temperature (X→X' in FIG. 9) than in the case where the boil-off gas is decompressed in the lower temperature (Y→Y' in FIG. 9). Further, it can be appreciated that if the temperature may be further lowered, the boil-off gas can theoretically be re-liquefied 100% (Z→Z 'in FIG. 9). Therefore, if the boil-off gas is cooled once more by the refrigerant heat exchanger 140 before passing through the first decompressing device 150, the re-liquefaction efficiency and the liquefaction amount can be increased.

Referring back to FIG. 4, compared with the first and second embodiments in which the refrigerant circulators 300*a* and 300*b* for additionally cooling the boil-off gas are configured as the closed loop, the present embodiment is different from the first and second embodiments in that the refrigerant cycle is configured as the open loop.

In the first and second embodiments, the refrigerant circulators 300*a* and 300*b* are configured as the closed loop, and thus the boil-off gas compressed by the refrigerant compressors 310*a* and 310*b* is used only as a refrigerant in the refrigerant heat exchangers 500*a* and 500*b* but may not be sent to the fuel consumption place or may not undergo the re-liquefaction process.

On the other hand, in the present embodiment, the refrigerant cycle is configured as the open loop, and thus the boil-off gas compressed by the extra compressor 122 is joined with the boil-off gas compressed by the compressor 120, and then a part of the joined boil-off gas is sent to the fuel consumption place 180, the other part thereof is used as the refrigerant in the refrigerant heat exchanger 140 along the recirculation line L5, and the remaining part thereof undergoes the re-liquefaction process along the return line L3.

The recirculation line L5 is a line which is branched from the first supply line L1 on the downstream of the compressor 120 and connected to the first supply line L1 on the upstream of the compressor 120. A sixth valve 196 which controls the flow rate of the boil-off gas and the opening/closing thereof may be installed on the recirculation line L5 along which the boil-off gas branched from the first supply line L1 is sent to the refrigerant heat exchanger 140.

Compared with the first and second embodiments in which the refrigerant cycle is configured as the closed loop, the present embodiment in which the refrigerant cycle is configured as the open loop is greatly different from the first and second embodiments in thon the downstream line of the compressor 120 and the downstream line of the extra compressor 122 are connected. That is, in the present embodiment, the second supply line L2 on the downstream of the extra compressor 122 is connected to the first supply line L1 on the downstream of the compressor 120, and thus the boil-off gas compressed by the extra compressor 122 is joined with the boil-off gas compressed by the compressor 120 and then sent to the refrigerant heat exchanger 140, the fuel consumption place 180, or the boil-off gas heat exchanger 110. The present embodiment includes all other modifications in which the downstream line of the compressor 120 and the downstream line of the extra compressor 122 are connected.

Therefore, according to the present embodiment, upon the increase in the demanded amount of the fuel consumption place 180 such as the increase in the operating speed of the ship, the boil-off gas compressed by the extra compressor 122 as well as the boil-off gas compressed by the compressor 120 as well as the compressed may be sent to the fuel consumption place 180.

Generally, however, since the compressor 120 and the extra compressor 122 are designed to have a capacity of approximately 1.2 times the amount required in the fuel consumption place 180, the case in which the boil-off gas compressed by the extra compressor 122 exceeding the capacity of the compressor 120 is sent to the fuel consumption place 180 little occurs. Rather, since the boil-off gas discharged from the storage tank T are entirely not consumed in the fuel consumption place 180 and therefore the boil-off gas to be re-liquefied increases, the case in which a large amount of refrigerant is required to re-liquefy a large amount of boil-off gas is more frequent.

According to the present embodiment, since not only the boil-off gas compressed by the compressor 120 but also the boil-off gas compressed by the extra compressor 122 may be used as the refrigerant for the heat exchange in the refrigerant heat exchanger 140, the boil-off gas supplied to the refrigerant heat exchanger 140 along the return line L3 after passing through the boil-off gas heat exchanger 110 may be cooled to a lower temperature by using more refrigerant and the overall re-liquefaction efficiency and re-liquefaction amount may be increased. Theoretically, 100% re-liquefaction is possible.

Generally, upon determining the capacity of the compressors 120 and 122 provided in the ship, both of the capacity required for supplying the boil-off gas to the fuel consumption place 180 and the capacity required for re-liquefying the boil-off gas remaining by being not completely consumed in the fuel consumption place 180 are considered. According to the present embodiment, since the re-liquefaction amount may be increased by using the extra compressor 122, the capacity required for re-liquefaction may be reduced, and thus small-capacity compressors 120 and 122 can be provided. Reducing the capacity of the compressor can save both equipment installation costs and operating costs.

In the present embodiment, at ordinary times when the compressor 120 or the cooler 130 does not fail, not only the first valve 191 and the second valve 192 but also the third valve 193 and the fourth valve 194 are open so that all of the compressor 120, the cooler 130, the extra compressor 122, and the extra cooler 132 are operated, and when the compressor 120 or the cooler 130 fails, increasing the re-liquefaction efficiency and the re-liquefaction amount is abandoned and the first valve 191 and the second valve 192 are closed so that the system is operated only by the boil-off gas passing through the extra compressor 122 and the extra compressor 132.

For convenience of explanation, it is described that the compressor 120 and the cooler 130 play a major role and the extra compressor 122 and the extra cooler 132 play an auxiliary role. However, the compressor 120 and the extra compressor 122 and the cooler 130 and the extra cooler 132 play the same role. At least two compressors and coolers which play the same role are installed in one ship, and therefore when any one of the two compressors fail, the other unbroken compressor may be used, which may satisfy a redundancy concept. Next, the above description is applied.

Therefore, as in the case in which the compressor 120 or the cooler 130 fails, even in the case in which the extra compressor 122 or the extra cooler 132 fails, increasing the re-liquefaction efficiency and the re-liquefaction amount is abandoned, and the third valve 193 and the fourth valve 194 are closed so that the system is operated only the boil-off gas passing through the compressor 120 and the cooler 130.

On the other hand, when the ship is operated at a high speed enough that most or all of the boil-off gas discharged from the storage tank T can be used as fuel for the fuel consumption place 180, there is little or no amount of boil-off gas to be re-liquefied. Accordingly, when the ship is operated at a high speed, only one of the compressor 120 and the extra compressor 122 may be operated.

The compressor 120 and the extra compressor 122 may compress the boil-off gas to a pressure required by the fuel consumption place 180. The fuel consumption place 180 may be an engine, a generator, or the like which are operated by the boil-off gas as fuel. For example, if the fuel consumption place 180 is a boost engine for a ship, the compressor 120 and the extra compressor 122 may compress the boil-off gas to a pressure of approximately 10 to 100 bars.

In addition, the compressor 120 and the extra compressor 122 may also compress the boil-off gas to a pressure of approximately 150 bars to 400 bars when the fuel consumption place 180 is an ME-GI engine, and when the fuel consumption place 180 is a DFDE, the boil-off gas may be compressed to a pressure of approximately 6.5 bars, and when the fuel consumption place 180 is an X-DF engine, the boil-off gas may be compressed to a pressure of approximately 16 bars.

The fuel consumption place 180 may also include various kinds of engines. For example, when the fuel consumption place 180 includes the X-DF engine and the DFDE, the compressor 120 and the extra compressor 122 may compress the boil-off gas to the pressure required by the X-DF engine, and the decompressing device is installed on the upstream of the DFDE to lower a part of the boil-off gas compressed at the pressure required by the X-DF engine to a pressure required by the DFDE and then supply the compressed boil-off gas to the DFDE.

In addition, in order to increase the re-liquefaction efficiency and the re-liquefaction amount in the boil-off gas heat exchanger 110 and the refrigerant heat exchanger 140, the compressor 120 or the extra compressor 122 compresses the boil-off gas so that the pressure of the boil-off gas exceeds the pressure required by the fuel consumption place 180, and the decompressing device is installed on the upstream of the fuel consumption place 180 to lower the pressure of the compressed boil-off gas to exceed the pressure required by the fuel consumption place 180 to the pressure required by the fuel consumption place 180 and then supply the compressed boil-off gas to the fuel consumption place 180.

Meanwhile, the compressor 120 and the extra compressor 122 may each be a multi-stage compressor. FIG. 4 illustrates that one compressor 120 or 122 compresses the boil-off gas to the pressure required by the fuel consumption place 180, but when the compressor 120 and the extra compressor 122 are a multi-stage compressor, a plurality of compression cylinders may compress the boil-off gas to the pressure required by the fuel consumption place 180 several times.

When the compressor 120 and the extra compressor 122 are a multi-stage compressor, the plurality of compression cylinders may be provided in the compressor 120 and the extra compressor 122 in series and the plurality of coolers may each be provide on the downstream of the plurality of compression cylinders.

The cooler 130 of the present embodiment is installed on the downstream of the compressor 120 to cool the boil-off gas which is compressed by the compressor 120 and has the increased pressure and temperature. The extra cooler 132 of the present embodiment is installed on the downstream of the extra compressor 122 to cool the boil-off gas which is compressed by the extra compressor 122 and has the increased pressure and temperature. The cooler 130 and the extra cooler 132 may cool the boil-off gas by exchanging heat with seawater, fresh water, or air introduced from the outside.

The refrigerant heat exchanger 140 of the present embodiment additionally cools the boil-off gas which is cooled by the boil-off gas heat exchanger 110 and then supplied to the refrigerant heat exchanger 140 along the return line L3. The refrigerant decompressing device 160 of the present embodiment expands the boil-off gas which passes through the refrigerant heat exchanger 140 and then sends the expanded the boil-off gas back to the refrigerant heat exchanger 140.

That is, the refrigerant heat exchanger 140 expands the boil-off gas, which passes through the boil-off gas heat exchanger 110 and then supplied to the refrigerant heat exchanger 140 along the return line L3, performs heat exchange by the refrigerant to additionally cool the boil-off gas expanded by the refrigerant decompressing device 160.

The refrigerant decompressing device 160 of the present embodiment may be various means for lowering the pressure of the fluid, and the state of the fluid just before passing through the refrigerant decompressing device 160 and the state of the fluid just after passing through the refrigerant decompressing device 160 may be changed depending on the operation condition of the system. However, when the refrigerant decompressing device 160 is an expander, in order to prevent a physical damage of the refrigerant decompressing device 160, the fluid just before passing through the refrigerant decompressing device 160 and the fluid just after passing through the refrigerant decompressing device 160 is preferably maintained in a gas phase. Next, the above description is applied.

By means of the boil-off gas used as the refrigerant for the heat exchange in the refrigerant heat exchanger 140 after passing through the refrigerant decompressing device 160, after the boil-off gas compressed by the compressor 120 is joined with the boil-off gas compressed by the extra compressor 122, a part of the joined boil-off gas is supplied to the refrigerant heat exchanger 140 along the recirculation line L5 and cooled by exchanging heat with the boil-off gas, which passes through the refrigerant decompressing device 160, in the refrigerant heat exchanger 140 by the refrigerant and then supplied to the refrigerant decompressing device 160.

In addition, the boil-off gas supplied from the first supply line L1 to the refrigerant heat exchanger 140 along the recirculation line L5 is primarily cooled in the refrigerant heat exchanger 140 and is additionally cooled by the refrigerant decompressing device 160 and is then sent back to the refrigerant heat exchanger 140, such that the boil-off gas is used as the refrigerant.

That is, the flow of the boil-off gas compressed by the compressor 120 supplied to the refrigerant heat exchanger 140 along the recirculation line L5 after being joined with the boil-off gas compressed by the extra compressor 122 and the boil-off gas which passes through the boil-off gas heat exchanger 110 and is then supplied to the refrigerant heat exchanger 140 along the return line L3 exchange heat with each other by means of the boil-off gas, which passes through the refrigerant decompressing device 160, as a refrigerant to be cooled.

The first decompressing device 150 of the present embodiment is installed on the return line L3 to expand the boil-off gas cooled by the boil-off gas heat exchanger 110 and the refrigerant heat exchanger 140. The boil-off gas compressed by the compressor 120 is joined with the boil-off gas compressed by the extra compressor 122 and then a part of the boil-off gas is branched into pass through the boil-off gas heat exchanger 110, the refrigerant heat exchanger 140, and the first decompressing device 150, such that the boil-off gas is partially or totally re-liquefied.

The first decompressing device 150 includes all means which may expand and cool the boil-off gas, and may be an expansion valve, such as a Joule-Thomson valve, or an expander.

The ship of the present embodiment may include the gas-liquid separator 170 which is installed on the return line L3 on the downstream of the first decompressing device 150 and separates the gas-liquid mixture discharged from the first decompressing device 150 into gas and liquid.

When the ship of the present embodiment does not include the gas-liquid separator 170, the liquid or the boil-off gas in the gas-liquid mixed state which passes through the first decompressing device 150 is immediately sent to the storage tank T.

When the ship of the present embodiment includes the gas-liquid separator 170, the boil-off gas which passes through the first decompressing device 150 is sent to the gas-liquid separator 170 to separate the gas phase and the liquid phase. The liquid separated by the gas-liquid separator 170 returns to the storage tank T along the return line L3 and the gas separated by the gas-liquid separator 170 is supplied to the boil-off gas heat exchanger 110 along a gas discharge line L4 which extends from the gas-liquid separator 170 to the first supply line L1 on the upstream of the boil-off gas heat exchanger 110.

When the ship of the present embodiment includes the gas-liquid separator 170, the ship may further include a seventh valve 197 which controls the flow rate of the liquid separated by the gas-liquid separator 170 and sent to the storage tank T; and an eighth valve 198 which controls the flow rate of gas separated by the gas-liquid separator 170 and sent to the boil-off gas heat exchanger 110.

The first to eighth valves and the eleventh valve 191, 192, 193, 194, 195, 196, 197, 198, and 203 of the present embodiment may be manually controlled by allowing a person to directly determine the operation condition of the system and may be automatically controlled to be opened or closed depending on a preset value.

The main flow of the boil-off gas is defined to easily describe the operation of the device for re-liquefaction of boil-off gas according to an embodiment of the present invention. A flow in which the boil-off gas generated from the storage tank T and the gas discharged from the gas-liquid separator 170 are supplied to the boil-off gas heat exchanger 110 is defined as a first flow 100, a flow which is supplied from the boil-off gas heat exchanger 110 to the compressor 120 or the extra compressor 122 and then discharged from the compressor 120 or the extra compressor 122 and supplied to the fuel consumption place 180 is defined as a second flow 102, a flow which is branched from the second flow 102 on the downstream of the compressor 120 and the extra compressor 122 and the supplied to the refrigerant heat exchanger 140 is defined as a third flow 104, a flow which is branched from the second flow 102 on the downstream of the compressor 120 and the extra compressor 122 and supplied to the boil-off gas heat exchanger 110 is defined as a fourth flow 106, and a flow which is supplied from the boil-off gas heat exchanger 110 to the refrigerant heat exchanger 140 is defined as a fifth flow 108. The first flow 100 becomes the second flow while passing through the boil-off gas heat exchanger 110 and the fourth flow 106 becomes the fifth flow 108 while passing through the boil-off gas heat exchanger 110.

Hereinafter, an operation of an apparatus for re-liquefaction of boil-off gas re-according to an embodiment of the present invention will be described with reference to FIG. 4. The present embodiment is particularly suitable for the case where the liquefied gas stored in the storage tank is liquefied natural gas and the fuel consumption place is X-DF, but is not limited thereto. The same goes for the fourth to seventh embodiments.

The gaseous boil-off gas generated from the storage tank (T) storing the liquefied gas in the liquid phase is supplied to the boil-off gas heat exchanger 110. At this time, the gaseous boil-off gas generated from the storage tank T meets the gaseous boil-off gas discharged from the gas-liquid separator 170 after the predetermined time elapses from the operation of the system to form the first flow 100. Ultimately, the boil-off gas supplied to the boil-off gas heat exchanger 110 becomes the first flow 100.

The boil-off gas heat exchanger 110 serves to recover the cold heat of the first flow 100 to cool the other boil-off gas. That is, the boil-off gas heat exchanger 110 recovers the cold heat of the first flow 100 and delivers the recovered cold heat to the flow supplied back to the boil-off gas heat exchanger 110 in the second flow 102, that is, the fourth flow 106.

Accordingly, in the boil-off gas heat exchanger 110, the heat exchange is generated between the first flow 100 and the fourth flow 106 so that the first flow 100 is heated and the fourth flow 106 is cooled. The heated first flow 100 becomes the second flow 102 and the cooled fourth flow 106 becomes the fifth flow 108.

The second flow 102 discharged from the boil-off gas heat exchanger 110 is supplied to the compressor 120 or the extra compressor 122 and is compressed by the compressor 120 or the extra compressor 122.

A part of the second flow 102 in which the boil-off gas compressed by the compressor 120 and the boil-off gas compressed by the extra compressor 122 are joined is the third flow 104 and supplied to the refrigerant heat exchanger 140 as a refrigerant, and the other part thereof is the fourth flow 106 and is supplied to the boil-off gas heat exchanger 110 to be cooled and the remaining part thereof is supplied to the fuel consumption place 180.

The third flow 104 supplied to the refrigerant heat exchanger 140 is discharged from the refrigerant heat exchanger 140 and expanded in the refrigerant decompressing device 160 and then supplied back to the refrigerant heat exchanger 140. At this time, the third flow 104 primarily supplied to the refrigerant heat exchanger 140 is expanded in the refrigerant heat exchanger 140 and then exchanges heat with the third flow 104 supplied back to the refrigerant heat exchanger 140 to be cooled. The third flow 104 which passes through the refrigerant decompressing device 160 and the refrigerant heat exchanger 140 is joined with the second flow 102 that is discharged from the boil-off gas heat exchanger 110 and supplied to the compressor 120 or the extra compressor 122.

The fourth flow 106 cooled by the heat exchange with the first flow 100 in the boil-off gas heat exchanger 110 becomes the fifth flow 108 and is supplied to the refrigerant heat exchanger 140. The fifth flow 108 supplied to the refrigerant heat exchanger 140 exchanges heat with the third flow 104 which passes through the refrigerant decompressing device 160 and is cooled, and then passes through the first decompressing device 150 and expanded. The fifth flow 108 which passes through the first decompressing device 150 becomes a gas-liquid mixture state in which gas and liquid are mixed.

The fifth flow 108 in the gas-liquid mixture state is immediately sent to the storage tank T or separated into gas and liquid while passing through the gas-liquid separator 170. The liquid separated by the gas-liquid separator 170 is supplied to the storage tank T and the gas separated by the gas-liquid separator 170 is supplied back to the boil-off gas heat exchanger 110, thereby repeating the above-mentioned series of processes.

FIG. 5 is a configuration diagram schematically showing a boil-off gas treatment system for a ship according to a fourth embodiment of the present invention.

The ship of the fourth embodiment shown in FIG. 5 further includes a ninth valve 201, a tenth valve 202, and a first additional line L6 as compared with the ship of the third embodiment shown in FIG. 4. The ship of the fourth embodiment is different from that of the third embodiment in that the ship is configured to operate the refrigerant cycle as the closed loop as in the first and second embodiments and operate the refrigerant cycle as the open loop as in the third embodiment, by modifying some lines along which the boil-off gas flows. Hereinafter, the difference will be mostly described. The detailed description of the same member as the ship of the foregoing third embodiment will be omitted.

Referring to FIG. 5, similar to the third embodiment, the ship of the present embodiment includes the boil-off gas heat exchanger 110, the first valve 191, the compressor 120, the cooler 130, the second valve 192, the third valve 193, the extra compressor 122, the extra cooler 132, the fourth valve 194, the refrigerant heat exchanger 140, the refrigerant decompressing device 160, and the first decompressing device 150.

Similar to the third embodiment, the storage tank T of the present embodiment stores liquefied gas such as liquefied natural gas and liquefied ethane gas, and discharges the boil-off gas to the outside when the internal pressure of the storage tank T exceeds a certain pressure or higher. The boil-off gas discharged from the storage tank (T) is sent to the boil-off gas heat exchanger 110.

Similar to the third embodiment, the boil-off gas heat exchanger 110 of the present embodiment uses the boil-off gas discharged from the storage tank T as the refrigerant and cools the boil-off gas supplied to the boil-off gas heat exchanger 110 along the return line L3. That is, the boil-off gas heat exchanger 110 recovers the cold heat of the boil-off gas discharged from the storage tank T and supplies the recovered cold heat to the boil-off gas sent to the boil-off gas heat exchanger 110 along the return line L3. The fifth valve 195 which controls the flow rate of the boil-off gas and opening/closing thereof may be installed on a return line L3.

Similar to the third embodiment, the compressor 120 of the present embodiment is installed on the first supply line L1 to compress the boil-off gas discharged from the storage tank T and similar to the third embodiment, the extra compressor 122 of the present embodiment is installed in parallel with the compressor 120 on the second supply line L2 to compress the boil-off gas discharged from the storage tank T. The compressor 120 and the extra compressor 122 may be a compressor having the same performance, and each may be a multi-stage compressor.

Similar to the third embodiment, the compressor 120 and the extra compressor 122 of the present embodiment may compress the boil-off gas to the pressure required by the fuel consumption place 180. In addition, when the fuel consumption place 180 includes various kinds of engines, after the boil-off gas is compressed according to the required pressure of the engine requiring a higher pressure (hereinafter referred to as a 'high pressure engine'), a part of the boil-off gas is supplied to the high pressure engine and the other part thereof is supplied to the engine (hereinafter, referred to as 'low pressure engine') requiring a lower pressure. The boil-off gas may be decompressed by the decompressing device installed on the upstream and supplied to the low pressure engine. In addition, in order to increase the re-liquefaction efficiency and the re-liquefaction amount in the boil-off gas heat exchanger 110 and the refrigerant heat exchanger 140, the compressor 120 or the extra compressor 122 compresses the boil-off gas to a pressure equal to or higher than the pressure required by the fuel consumption place 180, and the decompressing device is installed on the upstream of the fuel consumption place 180 to lower the pressure of the boil-off gas compressed at the high pressure to the pressure required by the fuel consumption place 180 and then supply the decompressed boil-off gas to the fuel consumption place 180.

Similar to the third embodiment, the ship of the present embodiment may further include an eleventh valve 203 which is installed on the upstream of the fuel consumption place 180 to controlling a flow rate of the boil-off gas sent to the fuel consumption place 180 and opening/closing thereof.

Similar to the third embodiment, the ship of the present embodiment uses the boil-off gas compressed by the extra compressor 122 as the refrigerant which additionally cools the boil-off gas in the refrigerant heat exchanger 140, thereby increasing the re-liquefaction efficiency and the re-liquefaction amount.

Similar to the third embodiment, the cooler 130 of the present embodiment is installed on the downstream of the compressor 120 to cool the boil-off gas that passes through the compressor 120 and has the increased pressure and temperature. Similar to the third embodiment, the extra cooler 132 of the present embodiment is installed on the downstream of the extra compressor 122 to cool the boil-off gas which passes through the extra compressor 122 and has the increased pressure and temperature.

Similar to the third embodiment, the refrigerant heat exchanger 140 of the present embodiment additionally cools the boil-off gas which is supplied to the boil-off gas heat exchanger 110 along the return line L3 and cooled by the boil-off gas heat exchanger 110.

Similar to the third embodiment, according to the present embodiment, the boil-off gas discharged from the storage tank T is further cooled not only in the boil-off gas heat exchanger 110 but also in the refrigerant heat exchanger 140, and may be supplied to the first decompressing device 150 in the state in which the temperature is lower, thereby increasing the re-liquefaction efficiency and the re-liquefaction amount.

Similar to the third embodiment, the refrigerant decompressing device 160 of the present embodiment expands the boil-off gas which passes through the refrigerant heat exchanger 140, and then sends the expanded boil-off gas back to the refrigerant heat exchanger 140.

Similar to the third embodiment, the first decompressing device 150 of the present embodiment is installed on the return line L3 to expand the boil-off gas cooled by the boil-off gas heat exchanger 110 and the refrigerant heat exchanger 140. The first decompressing device 150 of the present embodiment includes all means which may expand and cool the boil-off gas, and may be an expansion valve, such as a Joule-Thomson valve, or an expander.

Similar to the third embodiment, the ship of the present embodiment may include the gas-liquid separator 170 which is installed on the return line L3 on the downstream of the first decompressing device 150 and separates the gas-liquid mixture discharged from the first decompressing device 150 into gas and liquid.

Similar to the third embodiment, when the ship of the present embodiment does not include the gas-liquid separator 170, the liquid or the boil-off gas in the gas-liquid mixed state which passes through the first decompressing device 150 is directly sent to the storage tank T, and when the ship of the present embodiment includes the gas-liquid separator 170, the boil-off gas which passes through the first decompressing device 150 is sent to the gas-liquid separator 170 to be separated into the gas phase and the liquid phase. The liquid separated by the gas-liquid separator 170 returns to the storage tank T along the return line L3 and the gas separated by the gas-liquid separator 170 is supplied to the boil-off gas heat exchanger 110 along a gas discharge line L4 which extends from the gas-liquid separator 170 to the first supply line L1 on the upstream of the boil-off gas heat exchanger 110.

Similar to the third embodiment, when the ship of the present embodiment includes the gas-liquid separator 170, the ship may further include a seventh valve 197 which controls the flow rate of the liquid separated by the gas-liquid separator 170 and sent to the storage tank T; an eighth valve 198 which controls the flow rate of gas separated by the gas-liquid separator 170 and sent to the boil-off gas heat exchanger 110.

However, unlike the third embodiment, the ship of the present embodiment has a first additional line L6 connecting between the recirculation line L5 and the second supply line L2; a ninth valve 201 installed on the recirculation line L5; and a tenth valve 202 installed on the first additional line L6. Unlike the third embodiment which selectively includes the sixth valve, the ship of the present embodiment essentially includes the sixth valve 196 which is installed on the recirculation line L5 along which the boil-off gas branched from the first supply line L1 is sent to the refrigerant heat exchanger 140 to control the flow rate and of the boil-off gas and the opening/closing thereof.

One side of the first additional line L6 of the present embodiment is connected to a recirculation line L5 (not shown) along which the boil-off gas is expanded by the refrigerant decompressing device 160 and then passes through the refrigerant heat exchanger 140 to be sent to the first supply line L1 and the other side thereof is connected to the second supply line L2 between the third valve 193 and the extra compressor 122.

The ninth valve 201 of the present embodiment is installed on the recirculation line L5 between the point where the recirculation line L5 meets the first supply line L1 on the upstream of the compressor 120 and the extra compressor 122 and the point where the recirculation line L5 meets the first additional line L6.

In addition, the ship of the present embodiment is different from the third embodiment in that the second supply line L2 on the downstream of the extra compressor 122 is connected to the recirculation line L5 instead of the first supply line L1.

The first to the eleventh valve 191, 192, 193, 194, 195, 196, 197, 198, 201, 202 and 203 of the present embodiment may be manually controlled by allowing a person to directly determine the operation condition of the system and may be automatically controlled to be opened or closed depending on a preset value.

The differentiated features of the ship of the present embodiment from of the ship of the third embodiment are that the refrigerant cycle may be operated not only as the open loop but also as the closed loop so as to more flexibly use the re-liquefaction system according to the operating conditions of the ship. Hereinafter, a method of operating a refrigerant cycle as the closed loop and a method of operating a refrigerant cycle as the open loop by a valve control will be described.

To operate the refrigerant cycle of the ship of the present embodiment as the closed loop, the system is operated while the first valve 191, the second valve 192, the third valve 193, the fourth valve 194, and the tenth valve 202 are open, and the sixth valve 196 and the ninth valve 201 is closed.

If the boil-off gas which is discharged from the storage tank T and then compressed by the extra compressor 122 is supplied to the recirculation line L5, the third valve 193 is closed to form the refrigerant cycle of the closed loop in which the boil-off gas circulates the extra compressor 122, the extra cooler 132, the fourth valve 194, the refrigerant heat exchanger 140, the refrigerant decompressing device 160, the refrigerant heat exchanger 140, and the tenth valve 202.

When the refrigerant cycle is configured as the closed loop, nitrogen gas may be used as the refrigerant circulating the closed loop. In this case, the storage tank of the present embodiment may further include a pipe through which nitrogen gas is introduced into the refrigerant cycle of the closed loop.

When the refrigerant cycle is operated as the closed loop, only the boil-off gas circulating the closed loop is used as the refrigerant in the refrigerant heat exchanger 140. The boil-off gas passing through the compressor 120 is not introduced into the refrigerant cycle but is supplied to the fuel consumption place 180 or undergoes the re-liquefaction process along the return line L3. Therefore, a predetermined flow rate of boil-off gas is circulated as the refrigerant in the refrigerant heat exchanger 140 irrespective of the re-liquefaction amount or the amount of boil-off gas required by the fuel consumption place 180.

The flow of the boil-off gas in the case where the refrigerant cycle of the ship of the present embodiment is operated as the closed loop will be described as follows.

The boil-off gas discharged from the storage tank T passes through the boil-off gas heat exchanger 110 and then compressed by the compressor 120, and a part thereof is cooled by the cooler 130 and then sent to the fuel consumption place 180, and the remaining part thereof is sent to the boil-off gas heat exchanger 110 along the return line L3. The boil-off gas sent to the boil-off gas heat exchanger 110 along the return line L3 exchanges heat with the boil-off gas discharged from the storage tank T to be cooled and is then heat-exchanged in the refrigerant heat exchanger 140 to be additionally cooled.

The boil-off gas cooled by the boil-off gas heat exchanger 110 and the refrigerant heat exchanger 140 is expanded by the first decompressing device 150 and thus the boil-off gas is partially or totally re-liquefied. When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

Meanwhile, the boil-off gas circulating the refrigerant cycle is compressed by the extra compressor 122, cooled by the extra cooler 132, and then sent to the refrigerant heat exchanger 140 along the recirculation line L5. The boil-off gas which passes through the extra compressor 122 and the extra cooler 132 and then sent to the refrigerant heat exchanger 140 is primarily heat-exchanged in the refrigerant heat exchanger 140 to be cooled and then sent to the refrigerant decompressing device 160 to be secondarily expanded and cooled. The boil-off gas which passes through the refrigerant decompressing device 160 is sent back to the refrigerant heat exchanger 140 to be used as a refrigerant which cools the boil-off gas passing through the boil-off gas heat exchanger 110 and then supplied to the refrigerant heat exchanger 140 along the return line L3 and the boil-off gas compressed by the extra compressor 122 and then supplied to the refrigerant heat exchanger 140 along the recirculation line L5. The boil-off gas which passes through the refrigerant decompressing device 160 and then used as the refrigerant in the refrigerant heat exchanger 140 is sent back to the extra compressor 122, thereby repeating the above-mentioned series of processes.

When the compressor 120 or the cooler 130 fails while the refrigerant cycle of the ship of the present embodiment is operated as the closed loop, the first valve 191, the second valve 192, and the tenth valve 202 are closed and the third valve 193 and the sixth valve 196 are open to allow the boil-off gas which is discharged from the storage tank T and then passes through the boil-off gas heat exchanger 110 to be supplied to the fuel consumption place 180 via the third valve 193, the extra compressor 122, the extra cooler 132, the fourth valve 194, and the sixth valve 196. When it is necessary to use the boil-off gas compressed by the extra compressor 122 as the refrigerant of the refrigerant heat exchanger 140, the ninth valve 201 may be open to operate the system.

To operate the refrigerant cycle of the ship of the present embodiment as the open loop, the first valve 191, the second valve 192, the third valve 193, the fourth valve 194, the sixth valve 196 and the ninth valve 201 are open, and the tenth valve 202 are closed.

When the refrigerant cycle is operated as the closed loop, the boil-off gas circulating the refrigerant cycle and the boil-off gas sent to the fuel consumption place 180 or undergoing the re-liquefaction process along the return line L3 are separated. On the other hand, when the refrigerant cycle is operated as the open loop, the boil-off gas compressed by the compressor 120 and the boil-off gas compressed by the extra compressor 122 are joined to be used as a refrigerant in the refrigerant heat exchanger 140, to be sent to the fuel consumption place (180), or to undergo the re-liquefaction process along the return line L3.

Therefore, if the refrigerant cycle is operated as the open loop, the flow rate of the refrigerant to be sent to the refrigerant heat exchanger 140 may be flexibly controlled in consideration of the re-liquefaction amount and the amount of boil-off gas required by the fuel consumption place 180. In particular, when the amount of boil-off gas required by the fuel consumption place 180 is small, increasing the flow rate of the refrigerant sent to the refrigerant heat exchanger 140 may increase the re-liquefaction efficiency and the re-liquefaction amount.

That is, when the refrigerant cycle is operated as the closed loop, it is not possible to supply the refrigerant heat exchanger 140 with the boil-off gas equal to or more than the capacity of the extra compressor 122. However, when the refrigerant cycle is operated as the open loop, the boil-off gas having a flow rate exceeding the capacity of the extra compressor 122 may be supplied to the refrigerant heat exchanger 140.

The flow of the boil-off gas in the case where the refrigerant cycle of the ship of the present embodiment is operated as the open loop will be described as follows.

The boil-off gas discharged from the storage tank T is branched into two flows after passing through the boil-off gas heat exchanger 110 and a part thereof is sent to the first supply line L1 and the remaining part thereof is supplied to the second supply line L2.

The boil-off gas sent to the first supply line L1 passes through the first valve 191, the compressor 120, the cooler 130, and the second valve 192 and then a part thereof passes through the sixth valve 196 and is sent to the refrigerant heat exchanger 140, and the other part thereof is again branched into two flows. One flow of the boil-off gases branched into the two flows is sent to the fuel consumption place 180 and the other thereof is sent to the boil-off gas heat exchanger 110 along the return line L3.

The boil-off gas sent to the second supply line L1 passes through the third valve 193, the extra compressor 122, the extra cooler 132, and the fourth valve 194 and then a part thereof is sent to the refrigerant heat exchanger 140 and the other part thereof is sent to the first supply line L1 and then branched into two flows. One flow of the boil-off gases branched into the two flows is sent to the fuel consumption place 180 and the other thereof is sent to the boil-off gas heat exchanger 110 along the return line L3.

For convenience of explanation, the boil-off gas compressed by the compressor 120 and the boil-off gas compressed by the extra compressor 122 are separately described. However, each of the boil-off gas compressed by the compressor 120 and the boil-off gas compressed by the extra compressor 122 does not flow separately but is joined to be supplied to the refrigerant heat exchanger 140, the fuel consumption place 180, or the boil-off gas heat exchanger 110. That is, the boil-off gas compressed by the compressor 120 and the boil-off gas compressed by the extra compressor 122 are mixed, which in turn flows in the recirculation line L5 along which the boil-off gas is sent to the refrigerant heat exchanger 140, the first supply line L1 along which the boil-off gas is sent to the fuel consumption place 180, and the return line along which the boil-off gas is sent to the boil-off gas heat exchanger 110.

The boil-off gas sent to the refrigerant heat exchanger 140 along the recirculation line L5 is primarily heat-exchanged in the refrigerant heat exchanger 140 to be cooled, and secondarily expanded by the refrigerant decompressing device 160 to be cooled and supplied back to the refrigerant heat exchanger 140. The boil-off gas which passes through the refrigerant decompressing device 160 and is then supplied to the refrigerant heat exchanger 140 is used as the refrigerant which cools both of the boil-off gas passing through the boil-off gas heat exchanger 110 and then supplied to the refrigerant heat exchanger 140 along the return line L3 and the confluent flow of the boil-off gas compressed by the compressor 120 and the boil-off gas compressed by the extra compressor 122 which are supplied to the refrigerant heat exchanger 140 along the recirculation line L5.

That is, the boil-off gas used as the refrigerant in the refrigerant heat exchanger 140 is supplied to the refrigerant heat exchanger 140 along the recirculation line L5, and then is primarily cooled by the refrigerant heat exchanger 140 and secondarily cooled by the refrigerant decompressing device 160. In addition, the boil-off gas sent from the compressor 120 or the extra compressor 122 to the refrigerant heat exchanger 140 along the recirculation line L5 is primarily cooled by means of the boil-off gas, which passes through the refrigerant decompressing device 160, as the refrigerant.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 110, thereby repeating the above-mentioned series of processes.

The boil-off gas sent to the boil-off gas heat exchanger 110 along the return line L3 is primarily cooled by the boil-off gas heat exchanger 110, secondarily cooled by the refrigerant heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

When the compressor 120 or the cooler 130 fails while the refrigerant cycle of the ship of the present embodiment is operated as the open loop, the first valve 191, the second valve 192, and the ninth valve 201 are closed to allow the boil-off gas which is discharged from the storage tank T and then passes through the boil-off gas heat exchanger 110 to be supplied to the fuel consumption place 180 via the third valve 193, the extra compressor 122, the extra cooler 132, the fourth valve 194, and the sixth valve 196. When it is necessary to use the boil-off gas compressed by the extra compressor 122 as the refrigerant of the refrigerant heat exchanger 140, the ninth valve 201 may be open to operate the system.

When the refrigerant cycle of the ship of the present embodiment is operated as the open loop, the liquefied gas stored in the storage tank T is liquefied natural gas, the fuel consumption place 180 is the X-DF engine, and the refrigerant cycle includes the gas-liquid separator 170, temperatures and pressures of fluid at each point will be described as an example.

Boil-off gas at point A where the boil-off gas discharged from the storage tank T and the boil-off gas separated by the gas-liquid separator 170 are joined and supplied to the boil-off gas heat exchanger 110 may be approximately −120° C. and 1.060 bara, and boil-off gas at point B after the boil-off gas of approximately −120° C. and 1.060 bara exchanges heat with the boil-off gas of 43° C. and 20 bara in the boil-off gas heat exchanger 110 may be approximately 3° C. and 0.96 bara.

In addition, it may be assumed that the boil-off gas of approximately 3° C. and 0.96 bara passes through the refrigerant decompressing device 160 and then joined with the boil-off gas of approximately 20° C. and 0.96 bara passing through the refrigerant heat exchanger 140 and then the boil-off gas at point C may be approximately 15° C. and 0.96 bara.

The boil-off gas of approximately 15° C. and 0.96 bara is branched into two, and one flow is compressed by the compressor 120 and then cooled by the cooler 130, the other flow is compressed by the extra compressor 122 and is then cooled by the extra compressor 132. The boil-off gas at point D and the boil-off gas at point H which are the confluent flow of the flow passing through the compressor 120 and the cooler 130 and the flow passing through the extra compressor 122 and the extra cooler 132 may be approximately 43° C. and 20 bara.

Boil-off gas at point E where the boil-off gas of approximately 43° C. and 20 bara exchanges heat with the boil-off gas of approximately −120° C. and 1.060 bara in the boil-off gas heat exchanger 110 may be approximately −110° C. and 20 bara, boil-off gas at point F after the boil-off gas of approximately −110° C. and 20 bara is cooled by the refrigerant heat exchanger 140 may be approximately −153° C. and 20 bara, and boil-off gas at point G after the boil-off gas of approximately −153° C. and 20 bara is expanded by the first decompressing device 150 may be −157° C. and 2.1 bara.

On the other hand, the boil-off gas at point I after the boil-off gas of approximately 43° C. and 20 bara is primarily cooled by the refrigerant heat exchanger 140 may be approximately −73° C. and 20 bara, the boil-off gas at point J after the boil-off gas of approximately −73° C. and 20 bara is secondarily cooled by the refrigerant decompressing device 160 may be approximately −154° C. and 1.56 bara, and the boil-off gas at point K after the boil-off gas of approximately −154° C. and 1.56 bara is used in the refrigerant heat exchanger 140 may be approximately 20° C. and 0.96 bara.

The ship of the present embodiment may be independently operated while operating the refrigerant cycle as the open loop so that the boil-off gas compressed by the extra compressor 122 is used only as the refrigerant of the refrigerant heat exchanger 140, the boil-off gas compressed by the compressor 120 is sent to the fuel consumption place 180 or undergoes the re-liquefaction process along the return line L3 and is not used as the refrigerant of the refrigerant heat exchanger 140. Hereinafter, the refrigerant cycle of the open loop in which the extra compressor 122 and the compressor 120 are operated independently is referred to as an 'independent open loop'.

To operate the refrigerant cycle of the ship of the present embodiment as the independent open loop, the first valve 191, the second valve 192, the third valve 193, the fourth valve 194, and the ninth valve 201 are open, and the sixth valve 196 and the tenth valve 202 are closed. When the refrigerant cycle is operated as the independent open loop, the system can be operated more easily than when the open loop is operated.

The flow of the boil-off gas in the case where the refrigerant cycle of the ship of the present embodiment is operated as the independent open loop will be described as follows.

The boil-off gas discharged from the storage tank T is branched into two flows after passing through the boil-off gas heat exchanger 110 and a part thereof is sent to the first supply line L1 and the remaining part thereof is supplied to the second supply line L2. The boil-off gas sent to the first supply line L1 passes through the first valve 191, the compressor 120, the cooler 130, and the second valve 192 and then a part thereof is sent to the fuel consumption place 180 and the other part thereof is sent to the boil-off gas heat exchanger 110 along the return line L3. The boil-off gas sent to the second supply line L2 passes through the third valve 193, the extra compressor 122, the extra cooler 132, and the fourth valve 194 and is then sent to the refrigerant heat exchanger 140 along the recirculation line L5.

The boil-off gas which is compressed by the extra compressor 122 and then sent to the refrigerant heat exchanger 140 along the recirculation line L5 is used as the refrigerant which cools the boil-off gas which is primarily heat-exchanged in the refrigerant heat exchanger 140 to be cooled, secondarily expanded by the refrigerant decompressing device 160 to be cooled, and then supplied back to the refrigerant heat exchanger 140 to pass through the boil-off gas heat exchanger 110 and then be supplied to the refrigerant heat exchanger 140 via the return line L3 and the boil-off gas which is compressed by the extra compressor 122 and then supplied to the refrigerant heat exchanger 140 along the recirculation line L5.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 110, thereby repeating the above-mentioned series of processes.

The boil-off gas compressed by the compressor 120 and sent to the boil-off gas heat exchanger 110 along the return line L3 is primarily cooled by the boil-off gas heat exchanger 110, secondarily cooled by the refrigerant heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

When the compressor 120 or the cooler 130 fails while the refrigerant cycle of the ship of the present embodiment is operated as the independent open loop, the first valve 191, the second valve 192, and the ninth valve 201 are closed and the sixth valve 196 is open to allow the boil-off gas which is discharged from the storage tank T and then passes through the boil-off gas heat exchanger 110 to be supplied to the fuel consumption place 180 via the third valve 193, the extra compressor 122, the extra cooler 132, the fourth valve 194, and the sixth valve 196. When it is necessary to use the boil-off gas compressed by the extra compressor 122 as the refrigerant of the refrigerant heat exchanger 140, the ninth valve 201 may be open to operate the system.

FIG. 6 is a configuration diagram schematically showing a boil-off gas treatment system for a ship according to a fifth embodiment of the present invention.

The ship of the fifth embodiment shown in FIG. 6 is different from the ship of the fourth embodiment shown in FIG. 5 in that a twelfth valve 301, a thirteenth valve 302, a fourteenth valve 303, a fifteenth valve 304, a second additional line L7, a third additional line L8, a fourth additional line L9, and a fifth additional line L10 are further provided. Hereinafter, the difference will be mainly described. The detailed description of the same member as the ship of the foregoing fourth embodiment will be omitted.

Referring to FIG. 6, similar to the fourth embodiment, the ship of the present embodiment includes the boil-off gas heat exchanger 110, the first valve 191, the compressor 120, the cooler 130, the second valve 192, the third valve 193, the extra compressor 122, the extra cooler 132, the fourth valve 194, the refrigerant heat exchanger 140, the refrigerant decompressing device 160, and the first decompressing device 150.

Similar to the fourth embodiment, the storage tank T stores liquefied gas such as liquefied natural gas and liquefied ethane gas, and discharges the boil-off gas to the outside when the internal pressure of the storage tank T exceeds a certain pressure or higher. The boil-off gas discharged from the storage tank (T) is sent to the boil-off gas heat exchanger 110.

Similar to the fourth embodiment, the boil-off gas heat exchanger 110 of the present embodiment uses the boil-off gas discharged from the storage tank T as the refrigerant and cools the boil-off gas supplied to the boil-off gas heat exchanger 110 along the return line L3.

Similar to the fourth embodiment, the compressor 120 of the present embodiment is installed on the first supply line L1 to compress the boil-off gas discharged from the storage tank T and similar to the fourth embodiment, the extra compressor 122 of the present embodiment is installed in parallel with the compressor 120 on the second supply line L2 to compress the boil-off gas discharged from the storage tank T. The compressor 120 and the extra compressor 122 may be a compressor having the same performance, and each may be a multi-stage compressor.

Similar to the fourth embodiment, the compressor 120 and the extra compressor 122 of the present embodiment may compress the boil-off gas to the pressure required by the fuel consumption place 180. In addition, when the fuel consumption place 180 includes various kinds of engines, after the boil-off gas is compressed according to the required pressure of the high pressure engine, a part of the compressed gas may be supplied to the high pressure engine and the other part thereof may be decompressed by the decompressing device installed on the upstream of the low pressure engine and then supplied to the low pressure engine. In addition, in order to increase the re-liquefaction efficiency and the re-liquefaction amount in the boil-off gas heat exchanger 110 and the refrigerant heat exchanger 140, the compressor 120 or the extra compressor 122 compresses the boil-off gas to a pressure equal to or higher than the pressure required by the fuel consumption place 180, and the decompressing device is installed on the upstream of the fuel consumption place 180 to lower the pressure of the boil-off gas compressed at the high pressure to the pressure required by the fuel consumption place 180 and then supply the decompressed boil-off gas to the fuel consumption place 180.

Similar to the fourth embodiment, the ship of the present embodiment may further include an eleventh valve 203 which is installed upstream of the fuel consumption place 180 to controlling a flow rate of the boil-off gas sent to the fuel consumption place 180 and the opening/closing thereof.

Similar to the fourth embodiment, the ship of the present embodiment uses the boil-off gas compressed by the extra compressor 122 as the refrigerant which additionally cools the boil-off gas in the refrigerant heat exchanger 140, thereby increasing the re-liquefaction efficiency and the re-liquefaction amount.

Similar to the fourth embodiment, the cooler 130 of the present embodiment is installed on the downstream of the compressor 120 to cool the boil-off gas that passes through the compressor 120 and has the increased pressure and temperature. Similar to the fourth embodiment, the extra cooler 132 of the present embodiment is installed on the downstream of the extra compressor 122 to cool the boil-off gas which passes through the extra compressor 122 and has the increased pressure and temperature.

Similar to the fourth embodiment, the refrigerant heat exchanger 140 of the present embodiment additionally cools the boil-off gas which is supplied to the boil-off gas heat exchanger 110 along the return line L3 and cooled by the boil-off gas heat exchanger 110.

Similar to the fourth embodiment, according to the present embodiment, the boil-off gas discharged from the storage tank T is further cooled not only in the boil-off gas heat exchanger 110 but also in the refrigerant heat exchanger 140, and may be supplied to the first decompressing device 150 in the state in which the temperature is lower, thereby increasing the re-liquefaction efficiency and the re-liquefaction amount.

Similar to the fourth embodiment, the refrigerant decompressing device 160 of the present embodiment expands the boil-off gas which passes through the refrigerant heat exchanger 140, and then sends the expanded boil-off gas back to the refrigerant heat exchanger 140.

Similar to the fourth embodiment, the first decompressing device 150 of the present embodiment is installed on the return line L3 to expand the boil-off gas cooled by the boil-off gas heat exchanger 110 and the refrigerant heat exchanger 140. The first decompressing device 150 of the present embodiment includes all means which may expand and cool the boil-off gas, and may be an expansion valve, such as a Joule-Thomson valve, or an expander.

Similar to the fourth embodiment, the ship of the present embodiment may include the gas-liquid separator 170 which is installed on the return line L3 on the downstream of the first decompressing device 150 and separates the gas-liquid mixture discharged from the first decompressing device 150 into gas and liquid.

Similar to the fourth embodiment, when the ship of the present embodiment does not include the gas-liquid separator 170, the liquid or the boil-off gas in the gas-liquid mixed state which passes through the first decompressing device 150 is directly sent to the storage tank T, and when the ship of the present embodiment includes the gas-liquid separator 170, the boil-off gas which passes through the first decompressing device 150 is sent to the gas-liquid separator 170 to be separated into the gas phase and the liquid phase. The liquid separated by the gas-liquid separator 170 returns to the storage tank T along the return line L3 and the gas separated by the gas-liquid separator 170 is supplied to the boil-off gas heat exchanger 110 along a gas discharge line L4 which extends from the gas-liquid separator 170 to the first supply line L1 on the upstream of the boil-off gas heat exchanger 110.

Similar to the fourth embodiment, when the ship of the present embodiment includes the gas-liquid separator 170, the ship may further include a seventh valve 197 which controls the flow rate of the liquid separated by the gas-liquid separator 170 and sent to the storage tank T; and an eighth valve 198 which controls the flow rate of gas separated by the gas-liquid separator 170 and sent to the boil-off gas heat exchanger 110.

Similar to the fourth embodiment, the ship of the present embodiment further includes the sixth valve 196 which is installed on the recirculation line L5, the first additional line L6 which connects the recirculation line L5 and the second supply line L2, the ninth valve 201 which is installed on the recirculation line L5, and the tenth valve 202 which is installed on the first additional line L6.

Similar to the fourth embodiment, one side of the first additional line L6 of the present embodiment is connected to a recirculation line L5 along which the boil-off gas is expanded by the refrigerant decompressing device 160 and then passes through the refrigerant heat exchanger 140 to be sent to the first supply line L1 and the other side thereof is connected to the second supply line L2 between the third valve 193 and the extra compressor 122.

Similar to the fourth embodiment, the ninth valve 201 of the present embodiment is installed on the recirculation line L5 between the point where the recirculation line L5 meets the first supply line L1 on the upstream of the compressor 120 and the extra compressor 122 and the point where the recirculation line L5 meets the first additional line L6.

However, the ship of the present embodiment is different from the fourth embodiment in that the second supply line L2 on the downstream of the extra compressor 122 is connected to the first supply line L1 and the recirculation line L5 on the upstream of the refrigerant heat exchanger 140 is connected to the second supply line L1.

In addition, unlike the fourth embodiment, the ship of the present embodiment has a first additional line L6 on the upstream of the tenth valve 202, a second additional line L7 which connects between the first valve 191 and the compressor 120, a third additional line L8 which connects between the second supply line L2 between the extra cooler 132 and the fourth valve 194 and the first supply line L1 between the cooler 130 and the second valve 192, a fourth additional line L9 which connects between the first supply line L1 between the cooler 130 and the second valve 192 and the recirculation line L5 on the downstream of the sixth valve 196, and a fifth additional line L10 which connects between the second supply line L2 between the extra cooler 132 and the fourth valve 194 and a downstream of the fifth valve 195 of the return line L3.

In addition, the ship of the present embodiment further includes the fifth valve 195 which is installed on the return line L3, the twelfth valve 301 which is installed on the second additional line L7, the thirteenth vale 320 which is installed on the third additional line L8, the fourteenth valve 303 which is installed on the fourth additional line L9, and the fifteenth valve 304 which is installed on the fifth additional line L10.

The first to fifteenth valves 191, 192, 193, 194, 195, 196, 197, 198, 201, 202, 203, 301, 302, 303, and 304 of the present embodiment may be manually controlled by allowing a person to directly determine the operation condition of the system and may be automatically controlled to be opened or closed depending on a preset value.

Similar to the fourth embodiment, the refrigerant cycle of the ship of the present embodiment may be operated as the closed loop, the open loop, or the independent open loop. Hereinafter, a method for operating a refrigerant cycle as the closed loop, the open loop, or an independent open loop by a valve control will be described.

To operate the refrigerant cycle of the ship of the present embodiment as the closed loop, the system is operated while the first valve 191, the second valve 192, the third valve 193, the fifth valve 195, the sixth valve 196, and the tenth valve 202 are open, and the fourth valve 194, the ninth valve 201, the twelfth valve 301, the thirteenth valve 302, the fourteenth valve 303, and the fifteenth valve 304 are closed.

If the boil-off gas which is discharged from the storage tank T and then compressed by the extra compressor 122 is supplied to the recirculation line L5, the third valve 193 is closed to form the refrigerant cycle of the closed loop in which the boil-off gas circulates the extra compressor 122, the extra cooler 132, the sixth valve 196, the refrigerant heat exchanger 140, the refrigerant decompressing device 160, the refrigerant heat exchanger 140, and the tenth valve 202.

Similar to the fourth embodiment, when the refrigerant cycle is configured as the closed loop, nitrogen gas can be used as a refrigerant circulating the closed loop, and further includes a pipe through which the nitrogen gas is introduced into the refrigerant cycle of the closed loop.

Similar to the fourth embodiment, when the refrigerant cycle is operated as the closed loop, a predetermined flow rate of boil-off gas is circulated as the refrigerant in the refrigerant heat exchanger 140 irrespective of the re-liquefaction amount or the amount of boil-off gas required by the fuel consumption place 180.

The flow of the boil-off gas in the case where the refrigerant cycle of the ship of the present embodiment is operated as the closed loop will be described as follows.

The boil-off gas discharged from the storage tank T passes through the boil-off gas heat exchanger 110 and then compressed by the compressor 120, and a part thereof is cooled by the cooler 130 and then sent to the fuel consumption place 180, and the remaining part thereof is sent to the boil-off gas heat exchanger 110 along the return line L3. The boil-off gas sent to the boil-off gas heat exchanger 110 along the return line L3 exchanges heat with the boil-off gas discharged from the storage tank T to be cooled and is then heat-exchanged in the refrigerant heat exchanger 140 to be additionally cooled.

The boil-off gas cooled by the boil-off gas heat exchanger 110 and the refrigerant heat exchanger 140 is expanded by the first decompressing device 150 and thus the boil-off gas is partially or totally re-liquefied. When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

Meanwhile, the boil-off gas circulating the refrigerant cycle is compressed by the extra compressor 122, cooled by the extra cooler 132, and then sent to the refrigerant heat exchanger 140 along the recirculation line L5. The boil-off gas which passes through the extra compressor 122 and the extra cooler 132 and then sent to the refrigerant heat exchanger 140 is primarily heat-exchanged in the refrigerant heat exchanger 140 to be cooled and then sent to the refrigerant decompressing device 160 to be secondarily expanded and cooled. The boil-off gas which passes through the refrigerant decompressing device 160 is sent back to the refrigerant heat exchanger 140 to be used as a refrigerant which cools the boil-off gas passing through the boil-off gas heat exchanger 110 and then supplied to the refrigerant heat exchanger 140 along the return line L3 and the boil-off gas compressed by the extra compressor 122 and then supplied to the refrigerant heat exchanger 140 along the recirculation line L5. The boil-off gas which passes through the refrigerant decompressing device 160 and then used as the refrigerant in the refrigerant heat exchanger 140 is sent back to the extra compressor 122, thereby repeating the above-mentioned series of processes.

When the compressor 120 or the cooler 130 fails while the refrigerant cycle of the ship of the present embodiment is operated as the closed loop, the first valve 191, the second valve 192, the fifth valve 195, the sixth valve 196, and the tenth valve 202 are closed and the third valve 193 and the fourth valve 196 are open to allow the boil-off gas which is discharged from the storage tank T and then passes through the boil-off gas heat exchanger 110 to be supplied to the fuel consumption place 180 via the third valve 193, the extra compressor 122, the extra cooler 132, and the fourth valve 194.

If it is necessary to re-liquefy a part of the boil-off gas even when the compressor 120 or the cooler 130 fails while the refrigerant cycle of the ship of the present embodiment is operated as the closed loop, the fifteenth valve 304 is open, the fifteenth valve 304 is open so that a part of the boil-off gas may undergo the re-liquefaction process along the return line L3. In addition, When it is necessary to use boil-off gas compressed by the extra compressor 122 as the refrigerant of the refrigerant heat exchanger 140 while re-liquefying a part of the boil-off gas, the sixth valve 196 and the ninth valve 201 may be open or the sixth valve 196 and the tenth valve 202 may be open to operate the system.

The ship of the present embodiment uses the boil-off gas compressed by the compressor 120 as the refrigerant in the refrigerant heat exchanger 140 while the refrigerant cycle is operated as the closed loop, and may supply the boil-off gas compressed by the extra compressor 122 to the fuel consumption 180 or perform the re-liquefaction process on the compressed boil-off gas (hereinafter, referred to as a 'second closed loop').

As described above, the compressor 120 and the cooler 130 and the extra compressor 122 and the extra cooler 132 are separately described only for convenience of description and perform the same role. The redundancy concept is satisfied in that one ship includes two or more compressors and coolers which perform the same role. Therefore, the compressor 120 and the cooler 130 and the extra compressor 122 and the extra cooler 132 may be operated by changing the roles.

To operate the refrigerant cycle of the ship of the present embodiment as the second closed loop, the system is operated while the first valve 191, the third valve 193, the fourth valve 194, the twelfth valve 301, the fourteenth valve 303, and the fifteenth valve 304 are open, and the second valve 192, the fifth valve 195, the sixth valve 196, the ninth valve 201, the tenth valve 202, and the thirteenth valve 302 are closed.

If the boil-off gas which is discharged from the storage tank T and then compressed by the compressor 120 is supplied to the recirculation line L5, the first valve 191 is closed to form the refrigerant cycle of the closed loop in which the boil-off gas circulates the compressor 120, the cooler 130, the fourteenth valve 303, the refrigerant heat exchanger 140, the refrigerant decompressing device 160, the refrigerant heat exchanger 140, and the twelfth valve 301.

The flow of the boil-off gas in the case where the refrigerant cycle of the ship of the present embodiment is operated as the second closed loop will be described as follows.

After the boil-off gas discharged from the storage tank T passes through the boil-off gas heat exchanger 110 and passes through the third valve 193 and is compressed by the extra compressor 122 and cooled by the extra cooler 132, a part of the refrigerant is sent to the fuel consumption place 180 via the fourth valve 194 and the remaining part thereof is sent to the boil-off gas heat exchanger 110 along the return line L3 via the fifteenth valve 304. The boil-off gas sent to the boil-off gas heat exchanger 110 exchanges heat with the boil-off gas discharged from the storage tank T to be cooled and then to be additionally cooled by the refrigerant heat exchanger 140.

The boil-off gas cooled by the boil-off gas heat exchanger 110 and the refrigerant heat exchanger 140 is expanded by the first decompressing device 150 and thus the boil-off gas is partially or totally re-liquefied. When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

Meanwhile, the boil-off gas circulating the refrigerant cycle is compressed by the extra compressor 120, cooled by the extra cooler 130, and then sent to the refrigerant heat exchanger 140 via the fourteenth valve 330. The boil-off gas which passes through the compressor 120 and the cooler 130 and then sent to the refrigerant heat exchanger 140 is primarily heat-exchanged in the refrigerant heat exchanger 140 to be cooled and then sent to the refrigerant decompressing device 160 to be secondarily expanded and cooled. The boil-off gas which passes through the refrigerant decompressing device 160 is sent back to the refrigerant heat exchanger 140 to be used as a refrigerant which cools the boil-off gas passing through the boil-off gas heat exchanger 110 and then supplied to the refrigerant heat exchanger 140 along the return line L3 and the boil-off gas compressed by the compressor 120 and then supplied to the refrigerant heat exchanger 140 via the fourteenth valve 303. The boil-off gas passing through the refrigerant decompressing device 160 and used as the refrigerant in the refrigerant heat exchanger 140 is branched into the first additional line L6 while flowing along the recirculation line L5 and then is again branched into the second additional line L7 to be sent to the first supply line L1 after passing through the twelfth valve 301. The boil-off gas sent to the first supply line L1 is sent back to the compressor 120, thereby repeating the above series of processes.

When the extra compressor 122 or the extra cooler 130 fails while the refrigerant cycle of the ship of the present embodiment is operated as the second closed loop, the third valve 191, the fourth valve 192, the twelfth valve 301, the fourteenth valve 303, and the fifteenth valve 304 are closed and the first valve 191 and the second valve 192 are open to allow the boil-off gas which is discharged from the storage tank T and then passes through the boil-off gas heat exchanger 110 to be supplied to the fuel consumption place 180 via the first valve 191, the compressor 120, the cooler 130, and the second valve 192.

If it is necessary to re-liquefy a part of the boil-off gas even when the extra compressor 122 or the extra cooler 132 fails while the refrigerant cycle of the ship of the present embodiment is operated as the second closed loop, the fifteenth valve 195 is open, the fifth valve 195 is open so that a part of the boil-off gas may undergo the re-liquefaction process along the return line L3. In addition, when it is necessary to use boil-off gas compressed by the extra compressor 120 as the refrigerant of the refrigerant heat exchanger 140 while re-liquefying a part of the boil-off gas, the ninth valve 201 and the fourteenth valve 303 may be open or the twelfth valve 301 and the fourteenth valve 303 may be open to operate the system.

Meanwhile, to operate the refrigerant cycle of the ship of the present embodiment as the open loop, the first valve 191, the second valve 192, the third valve 193, the fifth valve 195, the sixth valve 196, the ninth valve 201, and the thirteenth valve 302 are open, and the fourth valve 194, the tenth valve 202, the twelfth valve 301, the fourteenth valve 303, and the fifteenth valve 304 are closed.

Similar to the fourth embodiment, if the refrigerant cycle is operated as the open loop, the flow rate of the refrigerant to be sent to the refrigerant heat exchanger 140 may be flexibly controlled in consideration of the re-liquefaction amount and the required amount of boil-off gas in the fuel consumption place 180. In particular, when the amount of boil-off gas required in the fuel consumption place 180 is small, increasing the flow rate of the refrigerant sent to the refrigerant heat exchanger 140 may increase the re-liquefaction efficiency and the re-liquefaction amount. That is, when the refrigerant cycle is operated as the open loop, the boil-off gas of the flow rate exceeding the capacity of the extra compressor 122 may be supplied to the refrigerant heat exchanger 140.

The flow of the boil-off gas in the case where the refrigerant cycle of the ship of the present embodiment is operated as the open loop will be described as follows.

The boil-off gas discharged from the storage tank T passes through the boil-off gas heat exchanger 110 and is then branched into two flows, such that a part thereof is sent to the compressor 120 via the first valve 191 and the remaining part thereof is sent to the extra compressor 122 via the third valve 193.

After the boil-off gas sent to the compressor 120 is compressed by the compressor 120 and cooled by the cooler 130, a part of the boil-off gas is sent to the refrigerant heat exchanger 140 via the thirteenth valve 302 and the sixth valve 196, the other part thereof is sent to the fuel consumption place 180 via the second valve 192, and the remaining part thereof is sent to the boil-off gas heat exchanger 110 via the fifth valve 195.

After the boil-off gas sent to the extra compressor 122 is compressed by the extra compressor 122 and cooled by the extra cooler 132, a part of the boil-off gas is sent to the refrigerant heat exchanger 140 via the sixth valve 196 and the remaining part thereof passes through the thirteenth valve 302 and then branched into two.

One of the flows that are branched into two after passing through the extra compressor 122, the extra cooler 132, and the thirteenth valve 302 are supplied to the fuel consumption place 180 via the second valve 192, and the other is sent to the boil-off gas heat exchanger 110 via the fifth valve 195.

Similar to the fourth embodiment, for convenience of description the boil-off gas compressed by the compressor 120 and the boil-off gas separated by the extra compressor 122 are separately described, but the boil-off gas separated by the compressor 120 and the boil-off gas separated by the extra compressor 122 are joined to be sent to the refrigerant heat exchanger 140, the fuel consumption place 180, and the boil-off gas heat exchanger 110.

The boil-off gas sent to the refrigerant heat exchanger 140 via the sixth valve 196 is primarily heat-exchanged in the refrigerant heat exchanger 140 to be cooled, and secondarily expanded by the refrigerant decompressing device 160 to be cooled and supplied back to the refrigerant heat exchanger 140. The boil-off gas which passes through the refrigerant decompressing device 160 and is then sent to the refrigerant heat exchanger 140 is used as a refrigerant which cools the boil-off gas passing through the boil-off gas heat exchanger 110 and then supplied to the refrigerant heat exchanger 140 along the return line L3 and the boil-off gas supplied from the compressor 120 or the extra compressor 122 to the refrigerant heat exchanger 140 via the sixth valve 196.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 110, thereby repeating the above-mentioned series of processes.

The boil-off gas sent to the boil-off gas heat exchanger 110 along the return line L3 is primarily cooled by the boil-off gas heat exchanger 110, secondarily cooled by the refrigerant heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

When the compressor 120 or the cooler 130 fails while the refrigerant cycle of the ship of the present embodiment is operated as the open loop, the first valve 191, the fifth valve 195, the sixth valve 196, and the ninth valve 201 are closed to allow the boil-off gas which is discharged from the storage tank T and then passes through the boil-off gas heat exchanger 110 to be supplied to the fuel consumption place 180 via the third valve 193, the extra compressor 122, the extra cooler 132, the thirteenth valve 302, and the second valve 192.

If it is necessary to re-liquefy a part of the boil-off gas even when the compressor 120 or the cooler 130 fails while the refrigerant cycle of the ship of the present embodiment is operated as the open loop, the fifteenth valve 195 is open, the fifth valve 195 is open so that a part of the boil-off gas may undergo the re-liquefaction process along the return line L3. In addition, when it is necessary to use boil-off gas compressed by the extra compressor 122 as the refrigerant of the refrigerant heat exchanger 140 while re-liquefying a part of the boil-off gas, the ninth valve 196 and the fourteenth valve 303 may be open or the tenth valve 202 and the fourteenth valve 303 may be open to operate the system.

To operate the refrigerant cycle of the ship of the present embodiment as the independent open loop, the first valve 191, the second valve 192, the third valve 193, the fifth valve 195, the sixth valve 196, and the ninth valve 201 are open, and the fourth valve 194, the tenth valve 202, the twelfth valve 301, the thirteenth valve 302, the fourteenth valve 303, and the fifteenth valve 304 are closed. When the refrigerant cycle is operated as the independent open loop, the system can be operated more easily than when the open loop is operated.

The flow of the boil-off gas in the case where the refrigerant cycle of the ship of the present embodiment is operated as the independent open loop will be described as follows.

The boil-off gas discharged from the storage tank T passes through the boil-off gas heat exchanger 110 and is then branched into two flows, such that a part thereof is sent to the compressor 120 via the first valve 191 and the remaining part thereof is sent to the extra compressor 122 via the third valve 193. After the boil-off gas sent to the compressor 120 is compressed by the compressor 120 and cooled by the cooler 130, a part of the boil-off gas is sent to the fuel consumption place 180 via the second valve 192 and the other part thereof is sent to the boil-off gas heat exchanger 110 via the fifth valve 195. The boil-off gas sent to the extra compressor 122 is compressed by the extra compressor 122, cooled by the extra cooler 132, and then sent to the refrigerant heat exchanger 140 via the sixth valve 196.

The boil-off gas which is compressed by the extra compressor 122 and then sent to the refrigerant heat exchanger 140 via the sixth valve 196 is used as the refrigerant which cools the boil-off gas which is primarily heat-exchanged in the refrigerant heat exchanger 140 to be cooled, secondarily expanded by the refrigerant decompressing device 160 to be cooled, and then supplied back to the refrigerant heat exchanger 140 to pass through the boil-off gas heat exchanger 110 and then be supplied to the refrigerant heat exchanger 140 along the return line L3 and the boil-off gas which is compressed by the extra compressor 122 and then supplied to the refrigerant heat exchanger 140 via the sixth valve 196.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 110, thereby repeating the above-mentioned series of processes.

The boil-off gas compressed by the compressor 120 and sent to the boil-off gas heat exchanger 110 along the return line L3 is primarily cooled by the boil-off gas heat exchanger 110, secondarily cooled by the refrigerant heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

When the compressor 120 or the cooler 130 fails while the refrigerant cycle of the ship of the present embodiment is operated as the independent open loop, the first valve 191, the fifth valve 195, the sixth valve 196, and the ninth valve 201 are closed and the thirteenth valve 302 is open to allow the boil-off gas which is discharged from the storage tank T and then passes through the boil-off gas heat exchanger 110 to be supplied to the fuel consumption place 180 via the third valve 193, the extra compressor 122, the extra cooler 132, the thirteenth valve 302, and the second valve 192.

If it is necessary to re-liquefy a part of the boil-off gas even when the compressor 120 or the cooler 130 fails while the refrigerant cycle of the ship of the present embodiment is operated as the independent open loop, the fifteenth valve 195 is open, the fifth valve 195 is open so that a part of the boil-off gas may undergo the re-liquefaction process along the return line L3. In addition, when it is necessary to use a boil-off gas compressed by the extra compressor 122 as the refrigerant of the refrigerant heat exchanger 140 while re-liquefying a part of the boil-off gas, the sixth valve 196 and the ninth valve 201 may be open or the sixth valve 196 and the tenth valve 202 may be open to operate the system.

FIG. 7 is a configuration diagram schematically showing a boil-off gas treatment system for a ship according to a sixth embodiment of the present invention.

The ship of the sixth embodiment shown in FIG. 7 is different from the ship of the third embodiment shown in FIG. 4 in that a second extra compressor 126, a second extra cooler 136, a third supply line L6, a first additional line L7, a second additional line L8, a ninth to fourteenth valves 201, 202, 203, 204, 205, and 206 are further provided and some lines along which a fluid flows is modified. Hereinafter, the difference will be mainly described. The detailed description of the same member as the ship of the foregoing third embodiment will be omitted.

Referring to FIG. 7, similar to the third embodiment, the ship of the present embodiment includes the boil-off gas heat exchanger 110, the first valve 191, the compressor 120, the cooler 130, the second valve 192, the third valve 193, the first extra compressor 122, the first extra cooler 132, the fourth valve 194, the refrigerant heat exchanger 140, the refrigerant decompressing device 160, and the first decompressing device 150.

However, unlike the third embodiment, the ship of the present embodiment further includes: a ninth valve 201 which is installed on the recirculation line L5; a third supply line L6 which is branched from the second supply line L2 and connected to the recirculation line L5; a second extra compressor 126 which is installed on the third supply line L6 to compress the boil-off gas discharged from the storage tank T; a second extra cooler 136 which is installed on the downstream of the second extra compressor 126 of the third supply line L6 to lower the temperature of the boil-off gas compressed by the second extra compressor 126; a tenth valve 202 which is installed on a third supply line L6 on the upstream of the second extra compressor 126; a twelfth valve 204 which is installed on a recirculation line L5 between the second supply line L2 and the third supply line L6; a first additional line L7 which connects between the recirculation line L5 and the third supply line L6; a second additional line L8 which connects between the first additional line L7 and the second supply line L2; a thirteenth valve 205 which is installed on the first additional line L7; and a fourteenth valve 206 which is installed on the second additional line L8.

In addition, unlike the third embodiment selectively including the sixth valve, the ship of the present embodiment essentially includes the sixth valve 196 which is installed on the recirculation line L5 between the first supply line L1 and the second supply line L2.

In addition, the ship of the present embodiment is different from the third embodiment in that the second supply line L2 on the downstream of the first extra compressor 122 is connected to the recirculation line L5 instead of the first supply line L1. That is, the recirculation line L5 of the present embodiment is branched from the first supply line L1 to be sequentially connected to an end on the downstream of the second supply line L2 and an end on the downstream of the third supply line L6 and then extend to the refrigerant heat exchanger 140.

Similar to the third embodiment, the storage tank T stores liquefied gas such as liquefied natural gas and liquefied ethane gas, and discharges the boil-off gas to the outside when the internal pressure of the storage tank T exceeds a certain pressure or higher. The boil-off gas discharged from the storage tank (T) is sent to the boil-off gas heat exchanger 110.

Similar to the third embodiment, the boil-off gas heat exchanger 110 of the present embodiment uses the boil-off gas discharged from the storage tank T as the refrigerant and cools the boil-off gas supplied to the boil-off gas heat exchanger 110 along the return line L3. That is, the boil-off gas heat exchanger 110 recovers the cold heat of the boil-off gas discharged from the storage tank T and supplies the recovered cold heat to the boil-off gas sent to the boil-off gas heat exchanger 110 along the return line L3. The fifth valve 195 which controls the flow rate of the boil-off gas and opening/closing thereof may be installed on a return line L3.

Similar to the third embodiment, the compressor 120 of the present embodiment is installed on the first supply line L1 to compress the boil-off gas discharged from the storage tank T and similar to the third embodiment, the first extra compressor 122 of the present embodiment is installed in parallel with the compressor 120 on the second supply line L2 to compress the boil-off gas discharged from the storage tank T.

The second extra compressor 126 of the present embodiment is installed in parallel with the compressor 120 and the first extra compressor 122 on the third supply line L6 to compress the boil-off gas discharged from the storage tank T. The compressor 120, the first extra compressor 122, and the second extra compressor 126 may be a compressor having the same performance, and each may be a multi-stage compressor.

Since the ship of the present embodiment includes not only the first extra compressor 122 but also the second extra compressor 126, the compressor having a small capacity may be used, thereby increasing the economical efficiency. If any one of the compressor 120, the first extra compressor 122, and the second extra compressor 126 fails, the other one should perform a role of the fault compressor (or extra compressor). Therefore, the compressor 120, the first extra compressor 122, and the second extra compressor 126 generally have the same capacity. For example, when the compressor requires a capacity of 150 in total to treat the boil-off gas, it costs much less to install compressors each having a capacity of 50 and two extra compressors rather than to install compressors each having a capacity of 75 and one extra compressor. That, the ship of the present embodiment may include another extra compressor to treat the same flow rate of boil-off gas or a larger flow rate of boil-off gas with less cost.

In addition, since the ship of the present embodiment includes not only the first extra compressor 122 but also the second extra compressor 126, the system can be more elaborately and flexibly operated according to the operating speed of the ship.

If the amount of liquefied gas in the storage tank T is large, the generation amount of boil-off gas is increased, and if the operating speed of the ship is slow, the use amount of boil-off gas in the fuel consuming place 180 is reduced, such that the larger the amount of liquefied gas in the storage tank T and the slower the operating speed of the ship, the larger the amount of boil-off gas to be re-liquefied, and the less the amount of liquefied gas in the storage tank T, and the faster the operating speed of the ship, the smaller the amount of boil-off gas to be re-liquefied.

The amount of liquefied gas in the storage tank T is flexible, but the amount of liquefied gas is increased when the liquefied gas carrier travels from a production place toward a consumption place, and the amount of liquefied gas is reduced when the liquefied gas carrier travels toward the production place after the liquefied gas is unloaded at the consumption place. For example, the system may be operated in a manner that when a ship is operated at a high speed (approximately 13 to 14 knots) in consideration of the amount of liquefied gas in the storage tank T together, only one of three compressors 120, 122, and 126 is used, when a ship is operated at a low speed (approximately 13 to 14 knots), two compressors are used, and when a ship is anchored, all three compressors are used.

When only one extra compressor is installed in addition to the compressor, if the compressor or the extra compressor fails, the redundancy concept may be satisfied in that the boil-off gas may be treated by using only one unbroken compressor (or extra compressor) by abandoning the increase in the re-liquefaction efficiency. However, since the compressor and the extra compressor both are operated for almost all the time for which the ship is operated, the concept of redundancy is inevitably weakened.

However, since the case in which the time required for the ship to travel at a high speed is mostly shorter than the time when the ship is operated at low speed or anchored, according to the present embodiment, the time to operate all of the compressors installed in the ship is minimized, such that the redundancy concept may be sufficiently secured.

On the other hand, the compressor 120, the first extra compressor 122, and the second extra compressor 126 of the present embodiment may compress the boil-off gas to the pressure required by the fuel consumption place 180. In addition, when the fuel consumption place 180 includes various kinds of engines, after the boil-off gas is compressed according to the required pressure of the engine requiring a higher pressure (hereinafter referred to as a 'high pressure engine'), a part of the boil-off gas is supplied to the high pressure engine and the other part thereof is supplied to the engine (hereinafter, referred to as 'low pressure engine') requiring a lower pressure. The boil-off gas may be decompressed by the decompressing device installed on the upstream and supplied to the low pressure engine. In addition, in order to increase the re-liquefaction efficiency and the re-liquefaction amount in the boil-off gas heat exchanger 110 and the refrigerant heat exchanger 140, the boil-off gas is compressed to a pressure equal to or higher than the pressure required by the fuel consumption place 180, and the decompressing device is installed on the upstream of the fuel consumption place 180 to lower the pressure of the boil-off gas compressed at the high pressure to the pressure required by the fuel consumption place 180 and then supply the decompressed boil-off gas to the fuel consumption place 180.

The ship of the present embodiment uses the boil-off gas compressed by the first extra compressor 122 and the second extra compressor 126 as the refrigerant which additionally cools the boil-off gas in the refrigerant heat exchanger 140, thereby increasing the re-liquefaction efficiency and the re-liquefaction amount.

Similar to the third embodiment, the cooler 130 of the present embodiment is installed on the downstream of the compressor 120 to cool the boil-off gas that passes through the compressor 120 and has the increased pressure and temperature. Similar to the third embodiment, the first extra cooler 132 of the present embodiment is installed on the downstream of the first extra compressor 122 to cool the boil-off gas which passes through the first extra compressor 122 and has the increased pressure and temperature. The second extra cooler 136 of the present embodiment is installed on the downstream of the second extra compressor 126 to cool the boil-off gas which passes through the second extra compressor 126 and has the increased pressure and temperature.

Similar to the third embodiment, the fuel consumption place 180 of the present embodiment may be any one of the ME-GI engine, the X-DF engine, the DFDE and the gas turbine engine, and the compressor 120, the first extra compressor 122, and the second extra compressor 126 each may compress the boil-off gas to a pressure of approximately 150 bars to 400 bars when the fuel consumption place 180 is the ME-GI engine and compress the boil-off gas to a pressure of approximately 6.5 bars when the fuel consumption place 180 is the DFDE and compress the boil-off gas to a pressure of approximately 16 bars when the fuel consumption place 180 is the X-DF engine.

Similar to the third embodiment, the refrigerant heat exchanger 140 of the present embodiment additionally cools the boil-off gas which is supplied to the boil-off gas heat exchanger 110 along the return line L3 and cooled by the boil-off gas heat exchanger 110. Further, the fifteenth valve 207 that may control the flow rate of the boil-off gas supplied to the fuel consumption place 180 and the opening/closing thereof may be installed on the upstream of the fuel consumption place 180.

One side of the third supply line L6 of the present embodiment is connected to the second supply line L2 on the upstream of the third valve 193 and the other side thereof is connected to the recirculation line L5 on the upstream of the twelfth valve 204.

One side of the first additional line L7 of the present embodiment is connected to the recirculation line L5 along which the boil-off gas is expanded by the refrigerant decompressing device 160 and then sent to the first supply line L1 through the refrigerant heat exchanger 140 and the other side thereof is connected to the third supply line L6 between the tenth valve 202 and the second extra compressor 126.

One side of the second additional line L8 of the present embodiment is connected to the first additional line L7 on the upstream of the thirteenth valve 205 and the other side thereof is connected to the second supply line L2 between the third valve 193 and the first extra compressor 122.

The ninth valve 201 of the present embodiment is installed on the recirculation line L5 between the point where the recirculation line L5 meets the first supply line L1 on the upstream of the compressor 120 and the extra compressors 122 and 126 and the point where the recirculation line L5 meets the first additional line L7, thereby controlling the flow rate of the boil-off gas and the opening/closing thereof.

Similar to the third embodiment, according to the present embodiment, the boil-off gas discharged from the storage tank T is further cooled not only in the boil-off gas heat exchanger 110 but also in the refrigerant heat exchanger 140, and may be supplied to the first decompressing device 150 in the state in which the temperature is lower, thereby increasing the re-liquefaction efficiency and the re-liquefaction amount.

Similar to the third embodiment, the refrigerant decompressing device 160 of the present embodiment expands the boil-off gas which passes through the refrigerant heat exchanger 140, and then sends the expanded boil-off gas back to the refrigerant heat exchanger 140.

Similar to the third embodiment, the first decompressing device 150 of the present embodiment is installed on the return line L3 to expand the boil-off gas cooled by the boil-off gas heat exchanger 110 and the refrigerant heat exchanger 140.The first decompressing device 150 of the present embodiment includes all means which may expand and cool the boil-off gas, and may be an expansion valve, such as a Joule-Thomson valve, or an expander.

Similar to the third embodiment, the ship of the present embodiment may include the gas-liquid separator 170 which is installed on the return line L3 on the downstream of the first decompressing device 150 and separates the gas-liquid mixture discharged from the first decompressing device 150 into gas and liquid.

Similar to the third embodiment, when the ship of the present embodiment does not include the gas-liquid separator 170, the liquid or the boil-off gas in the gas-liquid mixed state which passes through the first decompressing device 150 is directly sent to the storage tank T, and when the ship of the present embodiment includes the gas-liquid separator 170, the boil-off gas which passes through the first decompressing device 150 is sent to the gas-liquid separator 170 to be separated into the gas phase and the liquid phase. The liquid separated by the gas-liquid separator 170 returns to the storage tank T along the return line L3 and the gas separated by the gas-liquid separator 170 is supplied to the boil-off gas heat exchanger 110 along a gas discharge line L4 which extends from the gas-liquid separator 170 to the first supply line L1 on the upstream of the boil-off gas heat exchanger 110.

Similar to the third embodiment, when the ship of the present embodiment includes the gas-liquid separator 170, the ship may further include a seventh valve 197 which controls the flow rate of the liquid separated by the gas-liquid separator 170 and sent to the storage tank T; and an eighth valve 198 which controls the flow rate of gas separated by the gas-liquid separator 170 and sent to the boil-off gas heat exchanger 110.

The first to fifteenth valves 191, 192, 193, 194, 195, 196, 197, 198, 201, 202, 203, 204, 205, 206, and 207 of the present embodiment may be manually controlled by allowing a person to directly determine the operation condition of the system and may be automatically controlled to be opened or closed depending on a preset value.

Unlike the third embodiment, the ship of the present embodiment further includes the first additional line L7, the second additional line L8, the sixth valve 196, the ninth valve 201, the twelfth valve 204, the thirteenth valve 205, and the fourteenth valve 206 and is configured so that the second supply line L2 and the third supply line L6 are directly connected to the recirculation line L5 to control the opening/closing of the valve, thereby operating the refrigerant cycle as the closed loop as in the first and second embodiments and operating the refrigerant cycle as the open loop as in the third embodiment. Hereinafter, a method of operating a refrigerant cycle as a closed loop and an open loop by a valve control will be described.

The boil-off gas compressed by the second extra compressor 126 is used as the refrigerant in the refrigerant heat exchanger 140 while the refrigerant cycle of the ship of the present embodiment is operated as the closed loop, and to send the boil-off gas compressed by the compressor 120 and the boil-off gas compressed by the first extra compressor 122 to the fuel consumption place 180 or re-liquefy the boil-off gas compressed by the compressor 120 and the boil-off gas compressed by the first extra compressor 122 (hereinafter, referred to as 'first closed loop'), the system is operated while the first valve 191, the second valve 192, the third valve 193, the fourth valve 194, the sixth valve 196, the tenth valve 202, the eleventh valve 203, the thirteenth valve 205, and the fifteenth valve 207 are open and the ninth valve 201, the twelfth valve 204, and the fourteenth valve 206 are closed.

If the boil-off gas which is discharged from the storage tank T and then compressed by the second extra compressor 126is supplied to the recirculation line L5, the tenth valve 202 is closed to form the refrigerant cycle of the closed loop in which the boil-off gas circulates the extra compressor 126, the second extra cooler 136, the eleventh valve 203, the refrigerant heat exchanger 140, the refrigerant decompressing device 160, the refrigerant heat exchanger 140, and the thirteenth valve 205.

When the refrigerant cycle is configured as the closed loop, nitrogen gas may be used as the refrigerant circulating the closed loop. In this case, the ship of the present embodiment may further include the pipe through which the nitrogen gas is introduced into the refrigerant cycle of the closed loop.

When the refrigerant cycle is operated as the closed loop, only the boil-off gas circulating the closed loop is used as the refrigerant in the refrigerant heat exchanger 140. The boil-off gas passing through the compressor 120 or the boil-off gas passing through the first extra compressor 122 is not introduced into the refrigerant cycle but is supplied to the fuel consumption place 180 or undergoes the re-liquefaction process along the return line L3. Therefore, a predetermined flow rate of boil-off gas is circulated as the refrigerant in the refrigerant heat exchanger 140 irrespective of the re-liquefaction amount or the amount of boil-off gas required by the fuel consumption place 180.

The operation of the refrigerant cycle as the first closed loop is suitable when the amount required by the fuel consumption place 180 is large and the amount of boil-off gas to be re-liquefied is small.

The flow of the boil-off gas in the case where the refrigerant cycle of the ship of the present embodiment is operated as the first closed loop will be described as follows.

The boil-off gas discharged from the storage tank T passes through the boil-off gas heat exchanger 110 and is then branched into two flows. One flow is compressed by the compressor 120 along the first supply line L1 and cooled by the cooler 130 and the other flow is compressed by the first extra compressor 122 along the second supply line L2 and then cooled by the first extra cooler 132.

The boil-off gas which passes through the compressor 120 and the cooler 130 along the first supply line L1 and the boil-off gas which passes through the first extra compressor 122 and the second extra cooler 136 along the second supply line L2 are joined in the recirculation line L5. A part of the joined boil-off gas is sent to the fuel consumption place 180, and the remaining part thereof is sent to the boil-off gas heat exchanger 110 along the return line L3. The boil-off gas sent to the boil-off gas heat exchanger 110 along the return line L3 exchanges heat with the boil-off gas discharged from the storage tank T to be cooled and is then heat-exchanged in the refrigerant heat exchanger 140 to be additionally cooled.

The boil-off gas cooled by the boil-off gas heat exchanger 110 and the refrigerant heat exchanger 140 is expanded by the first decompressing device 150 and thus the boil-off gas is partially or totally re-liquefied. When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

Meanwhile, the boil-off gas circulating the refrigerant cycle is compressed by the second extra compressor 126, cooled by the second extra cooler 136, and then sent to the refrigerant heat exchanger 140 along the recirculation line L5. The boil-off gas which passes through the second extra compressor 126 and the second extra cooler 136 and then sent to the refrigerant heat exchanger 140 is primarily heat-exchanged in the refrigerant heat exchanger 140 to be cooled and then sent to the refrigerant decompressing device 160 to be secondarily expanded and cooled. The boil-off gas which passes through the refrigerant decompressing device 160 is sent back to the refrigerant heat exchanger 140 to be used as a refrigerant which cools the boil-off gas passing through the boil-off gas heat exchanger 110 and then supplied to the refrigerant heat exchanger 140 along the return line L3 and the boil-off gas compressed by the second extra compressor 126 and then supplied to the refrigerant heat exchanger 140 along the recirculation line L5. The boil-off gas which passes through the refrigerant decompressing device 160 and then used as the refrigerant in the refrigerant heat exchanger 140 is sent back to the second extra compressor 126, thereby repeating the above-mentioned series of processes.

When the compressor 120 or the cooler 130 fails while the refrigerant cycle of the ship of the present embodiment is operated as the first closed loop, the first valve 191, the second valve 192, and the thirteenth valve 205 are closed and the tenth valve 202 and the twelfth valve 204 are open to enable the boil-off gas passing through the first extra compressor 122 and the first extra cooler 132 and the boil-off gas passing through the second extra compressor 126 and the second extra compressor 136 to be joined, among the boil-off gases which are discharged from the storage tank T and then pass through the boil-off gas heat exchanger 110, and supply the joined boil-off gas to the fuel consumption place 180. When it is necessary to use the boil-off gas compressed by the first extra compressor 122 and the boil-off gas compressed by the second extra compressor 126 as the refrigerant of the refrigerant heat exchanger 140, the ninth valve 201 or the thirteenth valve 205 may also be open to operate the system.

The boil-off gas compressed by the first extra compressor 122 is used as the refrigerant in the refrigerant heat exchanger 140 while the refrigerant cycle of the ship of the present embodiment is operated as the closed loop, and to send only the boil-off gas compressed by the compressor 120 to the fuel consumption place 180 or re-liquefy only the boil-off gas compressed by the compressor 120 and not to operate the second extra compressor 126 (hereinafter, referred to as 'second closed loop'), the system is operated while the first valve 191, the second valve 192, the third valve 193, the fourth valve 194, the twelfth valve 204, the fourteenth valve 206, and the fifteenth valve 207 are open and the sixth valve 196, the ninth valve 201, the tenth valve 202, the eleventh valve 203, and the thirteenth valve 205 are closed.

If the boil-off gas which is discharged from the storage tank T and then compressed by the first extra compressor 122 is supplied to the recirculation line L5, the third valve 193 is closed to form the refrigerant cycle of the closed loop in which the boil-off gas circulates the first extra compressor 122, the first extra cooler 132, the fourth valve 194, the twelfth valve 204, the refrigerant heat exchanger 140, the refrigerant decomposition device 160, the refrigerant heat exchanger 140, and the fourteenth valve 206.

Even when the refrigerant cycle is operated as the second closed loop, nitrogen gas may be used as the refrigerant circulating the closed loop, as in the case where the refrigerant cycle is operated as the first closed loop.

In addition, even when the refrigerant cycle is operated as the second closed loop, only the boil-off gas circulating the closed loop is used as the refrigerant in the refrigerant heat exchanger 140 as in the case where the refrigerant cycle is operated as the first closed loop. The boil-off gas passing through the compressor 120 is not introduced into the refrigerant cycle but is supplied to the fuel consumption place 180 or undergoes the re-liquefaction process along the return line L3. Therefore, a predetermined flow rate of boil-off gas is circulated as the refrigerant in the refrigerant heat exchanger 140 irrespective of the re-liquefaction amount or the amount of boil-off gas required by the fuel consumption place 180.

The operation of the refrigerant cycle as the second closed loop is suitable when the amount required by the fuel consumption place 180 is slightly small and the amount of boil-off gas to be re-liquefied is not relatively large.

The flow of the boil-off gas in the case where the refrigerant cycle of the ship of the present embodiment is operated as the second closed loop will be described as follows.

The boil-off gas discharged from the storage tank T passes through the boil-off gas heat exchanger 110 and then compressed by the compressor 120, such that a part thereof is cooled by the cooler 130 and then sent to the fuel consumption place 180 and the remaining part thereof is sent to the boil-off gas heat exchanger 110 along the return line L3. The boil-off gas sent to the boil-off gas heat exchanger 110 along the return line L3 exchanges heat with the boil-off gas discharged from the storage tank T to be cooled and is then heat-exchanged in the refrigerant heat exchanger 140 to be additionally cooled.

The boil-off gas cooled by the boil-off gas heat exchanger 110 and the refrigerant heat exchanger 140 is expanded by the first decompressing device 150 and thus the boil-off gas is partially or totally re-liquefied. When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

Meanwhile, the boil-off gas circulating the refrigerant cycle is compressed by the first extra compressor 122, cooled by the second extra cooler 132, and then sent to the refrigerant heat exchanger 140 via the twelfth valve 204. The boil-off gas which passes through the first extra compressor 122 and the first extra cooler 132 and then sent to the refrigerant heat exchanger 140 is primarily heat-exchanged in the refrigerant heat exchanger 140 to be cooled and then sent to the refrigerant decompressing device 160 to be secondarily expanded and cooled. The boil-off gas which passes through the refrigerant decompressing device 160 is sent back to the refrigerant heat exchanger 140 to be used as a refrigerant which cools the boil-off gas passing through the boil-off gas heat exchanger 110 and then supplied to the refrigerant heat exchanger 140 along the return line L3 and the boil-off gas compressed by the first extra compressor 122 and then supplied to the refrigerant heat exchanger 140 along the recirculation line L5. The boil-off gas which passes through the refrigerant decompressing device 160 and then used as the refrigerant in the refrigerant heat exchanger 140 is sent back to the first extra compressor 122 via the fourteenth valve 206, thereby repeating the above-mentioned series of processes.

When the compressor 120 or the cooler 130 fails while the refrigerant cycle of the ship of the present embodiment is operated as the second closed loop, the first valve 191, the second valve 192, and the fourteenth valve 206 are closed and the third valve 193 and the sixth valve 196 are open to allow the boil-off gas which is discharged from the storage tank T and then passes through the boil-off gas heat exchanger 110 to be supplied to the fuel consumption place 180 via the third valve 193, the first extra compressor 122, the first extra cooler 132, the fourth valve 194, the sixth valve 196, and the fifteenth valve 207. When it is necessary to use boil-off gas compressed by the extra compressor 122 as the refrigerant of the refrigerant heat exchanger 140, the ninth valve 201 and the twelfth valve 204 may be open or the twelfth valve 204 and the fourteenth valve 303 may be open to operate the system.

The boil-off gas compressed by the first extra compressor 126 and the boil-off gas compressed by the second extra compressor 126 are used as the refrigerant in the refrigerant heat exchanger 140 while the refrigerant cycle of the ship of the present embodiment is operated as the closed loop, and to send the boil-off gas compressed by the compressor 120 to the fuel consumption place 180 or re-liquefy the boil-off gas compressed by the compressor 120 (hereinafter, referred to as 'third closed loop'), the system is operated while the first valve 191, the second valve 192, the fourth valve 194, the ninth valve 201, the eleventh valve 203, the twelfth valve 204, the thirteenth valve 205, the fourteenth valve 206, and the fifteenth valve 207 are open and the third valve 193, the sixth valve 196, and the tenth valve 202 are closed.

If the boil-off gas compressed by the first extra compressor 122 and the boil-off gas compressed by the second extra compressor 126 after being discharged from the storage tank T are supplied to the recirculation line L5, the ninth valve 201 is closed to form the refrigerant cycle of the closed loop so that the boil-off gas which passes through the first extra compressor 122 and the first extra cooler 132 along the second supply line L2 and the boil-off gas which passes through the second extra compressor 126 and the second extra cooler 136 along the third supply line L6 are joined and supplied to the refrigerant heat exchanger 140 along the recirculation line L5 and the boil-off gas supplied to the refrigerant heat exchanger 140 again passes through the refrigerant decompressing device 160 and the refrigerant heat exchanger 140 and is then branched into two flows to be sent to the first extra compressor 122 or the second extra compressor 126.

Even when the refrigerant cycle is operated as the third closed loop, nitrogen gas may be used as the refrigerant circulating the closed loop, as in the case where the refrigerant cycle is operated as the first closed loop.

In addition, even when the refrigerant cycle is operated as the third closed loop, only the boil-off gas circulating the closed loop is used as the refrigerant in the refrigerant heat exchanger 140 as in the case where the refrigerant cycle is operated as the first closed loop. The boil-off gas passing through the compressor 120 is not introduced into the refrigerant cycle but is supplied to the fuel consumption place 180 or undergoes the re-liquefaction process along the return line L3. Therefore, a predetermined flow rate of boil-off gas is circulated as the refrigerant in the refrigerant heat exchanger 140 irrespective of the re-liquefaction amount or the amount of boil-off gas required by the fuel consumption place 180.

The operation of the refrigerant cycle as the third closed loop is suitable when the amount required by the fuel consumption place 180 is small and the amount of boil-off gas to be re-liquefied is large.

The flow of the boil-off gas in the case where the refrigerant cycle of the ship of the present embodiment is operated as the third closed loop will be described as follows.

The boil-off gas discharged from the storage tank T passes through the boil-off gas heat exchanger 110 and then compressed by the compressor 120, such that a part thereof is cooled by the cooler 130 and then sent to the fuel consumption place 180 and the remaining part thereof is sent to the boil-off gas heat exchanger 110 along the return line L3. The boil-off gas sent to the boil-off gas heat exchanger 110 along the return line L3 exchanges heat with the boil-off gas discharged from the storage tank T to be cooled and is then heat-exchanged in the refrigerant heat exchanger 140 to be additionally cooled.

The boil-off gas cooled by the boil-off gas heat exchanger 110 and the refrigerant heat exchanger 140 is expanded by the first decompressing device 150 and thus the boil-off gas is partially or totally re-liquefied. When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

On the other hand, a part of the boil-off gas circulating the refrigerant cycle is compressed by the first extra compressor 122, cooled by the first extra cooler 132, and sent to the recirculation line L5, and the other part thereof is compressed by the second extra compressor 126 and cooled by the second extra cooler 136 to be sent to the recirculation line L5. The boil-off gas compressed by the first extra compressor 122 and the boil-off gas compressed by the second extra compressor 126 are joined in the recirculation line L5 and sent to the refrigerant heat exchanger 140. The boil-off gas sent to the refrigerant heat exchanger 140 along the recirculation line L5 is primarily heat-exchanged in the refrigerant heat exchanger 140 to be cooled and then sent to the refrigerant decompressing device 160 to be secondarily expanded and cooled.

The boil-off gas which passes through the refrigerant decompressing device 160 is sent back to the refrigerant heat exchanger 140 to be used as a refrigerant which cools the boil-off gas passing through the boil-off gas heat exchanger 110 and then supplied to the refrigerant heat exchanger 140 along the return line L3 and the boil-off gas supplied to the refrigerant heat exchanger 140 along the recirculation line L5. The boil-off gas which passes through the refrigerant decompressing device 160 and is then used as the refrigerant in the refrigerant heat exchanger 140 is again branched into two and then is sent to the first extra compressor 122 or the second extra compressor 126, thereby repeating the above-mentioned series of processes.

If the compressor 120 or the cooler 130 fails while the refrigerant cycle of the ship of the present embodiment is operated as the third closed loop, for example, the first valve 191 and the second valve 192 are closed and the sixth valve 196 and the ninth valve 201 are open so that the refrigerant cycle may be operated in such a manner that a part of the confluent flow of the boil-off gas compressed by the first extra compressor 122 and the boil-off gas compressed by the second extra compressor 126 is sent to the fuel consumption place 180, the other part thereof is re-liquefied along the return line L3, and the remaining part thereof is sent to the refrigerant heat exchanger 140 to be used as the refrigerant.

To operate the refrigerant cycle of the ship of the present embodiment as the open loop, the first valve 191, the second valve 192, the third valve 193, the fourth valve 194, the sixth valve 196, and the ninth valve 201, the tenth valve 202, the eleventh valve 203, the twelfth valve 204, and the fifteenth valve 207 are open, and the thirteenth valve 205 and the fourteenth valve 206 are closed.

When the refrigerant cycle is operated as the closed loop, the boil-off gas circulating the refrigerant cycle and the boil-off gas sent to the fuel consumption place 180 or undergoing the re-liquefaction process along the return line L3 are separated. On the other hand, if the refrigerant cycle is operated as the open loop, the boil-off gas compressed by the compressor 120, the boil-off gas compressed by the extra compressor 122, and the boil-off gas compressed by the second extra compressor 126 are joined to be used as the refrigerant in the refrigerant heat exchanger 140 or to be sent to the fuel consumption place 180 or undergo the re-liquefaction process along the return line L3.

Therefore, if the refrigerant cycle is operated as the open loop, the flow rate of the refrigerant to be sent to the refrigerant heat exchanger 140 may be flexibly controlled in consideration of the re-liquefaction amount and the amount of boil-off gas required by the fuel consumption place 180. In particular, when the amount of boil-off gas required by the fuel consumption place 180 is small, increasing the flow rate of the refrigerant sent to the refrigerant heat exchanger 140 may increase the re-liquefaction efficiency and the re-liquefaction amount.

For example, compared with the third closed loop described above, when the refrigerant cycle is operated as the third closed loop, the boil-off gas equal to or higher than the capacity of the first extra compressor 122 and the second extra compressor 126 may not be supplied to the refrigerant heat exchanger 140, but when the refrigerant cycle is operated as the open loop, the boil-off gas of a flow rate exceeding the capacity of the first extra compressor 122 and the second extra compressor 126 may be supplied to the refrigerant heat exchanger 140.

The flow of the boil-off gas in the case where the refrigerant cycle of the ship of the present embodiment is operated as the open loop will be described as follows.

The boil-off gas discharged from the storage tank T passes through the boil-off gas heat exchanger 110 and then branched into three flows, such that a part of the boil-off gas is sent to the first supply line L1, the other part thereof is sent to the second supply line L2, and the remaining part thereof is sent to the third supply line L6.

The boil-off gas sent to the first supply line L1 passes through the first valve 191, the compressor 120, the cooler 130, and the second valve 192 and then a part thereof passes through the sixth valve 196 and the twelfth valve 204 and is sent to the refrigerant heat exchanger 140, and the other part thereof is again branched into two flows. One flow of the boil-off gases branched into the two flows is sent to the fuel consumption place 180 and the other thereof is sent to the boil-off gas heat exchanger 110 along the return line L3.

The boil-off gas sent to the second supply line L1 passes through the third valve 193, the first extra compressor 122, the first extra cooler 132, and the fourth valve 194 and then a part thereof is sent to the refrigerant heat exchanger 140 via the twelfth valve 204 and the other part thereof is sent to the first supply line L1 via the sixth valve 196 and then branched into two flows. One flow of the boil-off gases branched into the two flows is sent to the fuel consumption place 180 and the other thereof is sent to the boil-off gas heat exchanger 110 along the return line L3.

The boil-off gas sent to the third supply line L6 passes through the tenth valve 202, the second extra compressor 126, the second extra cooler 136, and the eleventh valve 203 and then a part thereof is sent to the refrigerant heat exchanger 140 and the other part thereof is sent to the first supply line L1 via the twelfth valve 204 and the sixth valve 196 and then branched into two flows. One flow of the boil-off gases branched into the two flows is sent to the fuel consumption place 180 and the other thereof is sent to the boil-off gas heat exchanger 110 along the return line L3.

For convenience of explanation, the boil-off gas compressed by the compressor 120, the boil-off gas compressed by the first extra compressor 122, and the boil-off gas compressed by the second extra compressor 126 are separately described. However, each of the boil-off gas compressed by the compressor 120, the boil-off gas compressed by the first extra compressor 122, and the boil-off gas compressed by the second extra compressor 126 does not flow separately but is joined to be supplied to the refrigerant heat exchanger 140, the fuel consumption place 180, or the boil-off gas heat exchanger 110. That is, the boil-off gas compressed by the compressor 120, the boil-off gas compressed by the first extra compressor 122, and the boil-off gas compressed by the second extra compressor 126 are mixed, which in turn flows in the recirculation line L5 along which the boil-off gas is sent to the refrigerant heat exchanger 140, the first supply line L1 in which the boil-off gas is sent to the fuel consumption place 180, and the return line L3 along which the boil-off gas is sent to the boil-off gas heat exchanger 110.

The boil-off gas sent to the refrigerant heat exchanger 140 along the recirculation line L5 is primarily heat-exchanged in the refrigerant heat exchanger 140 to be cooled, and secondarily expanded by the refrigerant decompressing device 160 to be cooled and supplied back to the refrigerant heat exchanger 140. The boil-off gas which passes through the refrigerant decompressing device 160 and is then supplied to the refrigerant heat exchanger 140 is used as a refrigerant which cools both of the boil-off gas passing through the boil-off gas heat exchanger 110 and then supplied to the refrigerant heat exchanger 140 along the return line L3 and the boil-off gas supplied to the refrigerant heat exchanger 140 along the recirculation line L5.

That is, the boil-off gas used as the refrigerant in the refrigerant heat exchanger 140 is supplied to the refrigerant heat exchanger 140 along the recirculation line L5, and then primarily cooled by the refrigerant heat exchanger 140 and secondarily cooled by the refrigerant decompressing device 160. In addition, the boil-off gas sent from the compressor 120, the first extra compressor 122, or the second extra compressor 126 to the refrigerant heat exchanger 140 along the recirculation line L5 is primarily cooled by means of the boil-off gas, which passes through the refrigerant decompressing device 160, as the refrigerant.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 110, thereby repeating the above-mentioned series of processes.

The boil-off gas sent to the boil-off gas heat exchanger 110 along the return line L3 is primarily cooled by the boil-off gas heat exchanger 110, secondarily cooled by the refrigerant heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

When the compressor 120 or the cooler 130 fails while the refrigerant cycle of the ship of the present embodiment is operated as the open loop, the first valve 191 and the second valve 192 are closed, such that the refrigerant cycle of the open loop may be operated only by the first extra compressor 122 and the second extra compressor 126.

When the refrigerant cycle of the ship of the present embodiment is operated as the open loop, the liquefied gas stored in the storage tank T is liquefied natural gas, the fuel consumption place 180 is the X-DF engine, and the refrigerant cycle includes the gas-liquid separator 170, temperatures and pressures of fluid at each point will be described as an example.

Boil-off gas at point A where the boil-off gas discharged from the storage tank T and the boil-off gas separated by the gas-liquid separator 170 are joined and supplied to the boil-off gas heat exchanger 110 may be approximately −127° C. and 1.060 bara, and boil-off gas at point B after the boil-off gas of approximately −127° C. and 1.060 bara exchanges heat with the boil-off gas of 43° C. and 37 bara in the boil-off gas heat exchanger 110 may be approximately 26° C. and 0.96 bara.

In addition, it may be assumed that the boil-off gas of approximately 26° C. and 0.96 bara passes through the refrigerant decompressing device 160 and then joined with the boil-off gas of approximately 13° C. and 0.96 bara passing through the refrigerant heat exchanger 140 and then the boil-off gas at point C may be approximately 17° C. and 0.96 bara.

The boil-off gas, which is approximately 17° C. and 0.96 bara, is branched into three. One flow of the boil-off gas is compressed by the compressor 120 and then cooled by the cooler 130, the other flow thereof is compressed by the first extra compressor 122 and then cooled by the first extra cooler 132, and the remaining flow thereof is compressed by the second extra compressor 126 and then cooled by the second extra cooler 136. The boil-off gas at point D and the boil-off gas at point H which are the confluent flow of the flow passing through the compressor 120 and the cooler 130, the flow passing through the first extra compressor 122 and the first extra cooler 132, and the flow passing through the second extra compressor 126 and the second extra cooler 136 may be approximately 43° C. and 37 bara.

Boil-off gas at point E where the boil-off gas of approximately 43° C. and 37 bara exchanges heat with the boil-off gas of approximately −127° C. and 1.060 bara in the boil-off gas heat exchanger 110 may be approximately −92° C. and 37 bara, boil-off gas at point F after the boil-off gas of approximately −92° C. and 37 bara is cooled by the refrigerant heat exchanger 140 may be approximately −124° C. and 36.60 bara, and boil-off gas at point G after the boil-off gas of approximately −124° C. and 36.60 bara is expanded by the first decompressing device 150 may be −155° C. and 2.1 bara.

On the other hand, the boil-off gas at point I after is after the boil-off gas of approximately 43° C. and 37 bara is primarily cooled by the refrigerant heat exchanger 140 may be approximately −47° C. and 36.70 bara, the boil-off gas at point J after the boil-off gas of approximately −47° C. and 36.70 bara is secondarily cooled by the refrigerant decompressing device 160 may be approximately −156° C. and 1.56 bara, and the boil-off gas at point K after the boil-off gas of approximately −156° C. and 1.56 bara is used as the refrigerant in the refrigerant heat exchanger 140 may be approximately 13° C. and 0.96 bara.

The ship of the present embodiment may independently be operated so that among the boil-off gas compressed by the compressor 120, the boil-off gas compressed by the first extra compressor 122, and the boil-off gas compressed by the second extra compressor 125 while the refrigerant cycle is operated as the open loop, a part of the boil-off gas is used only as the refrigerant of the refrigerant heat exchanger 140 and the remaining part thereof is sent to the fuel consumption place 180 or undergoes the re-liquefaction process along the return line L3 without being used as the refrigerant of the refrigerant heat exchanger 140. Hereinafter, this is referred to as 'independent open loop'.

The boil-off gas compressed by the first extra compressor 122 and the boil-off gas compressed by the second extra compressor 126 are used as the refrigerant of the refrigerant heat exchanger 140 while the refrigerant cycle of the ship of the present embodiment is operated as the independent open loop. The case where the boil-off gas compressed by the compressor 120 is sent to the fuel consumption place 180 or undergoes the re-liquefaction process (hereinafter, referred to as 'first independent open loop') will be described by way of example.

To operate the refrigerant cycle of the ship of the present embodiment as the first independent open loop, the first valve 191, the second valve 192, the third valve 193, the fourth valve 194, the ninth valve 201, the tenth valve 202, the eleventh valve 203, the twelfth valve 204, and the fifteenth valve 207 are open, and the sixth valve 196, the thirteenth valve 205, and the fourteenth valve 206 are closed. When the refrigerant cycle is operated as the independent open loop, the system can be operated more easily than when the open loop is operated.

The flow of the boil-off gas in the case where the refrigerant cycle of the ship of the present embodiment is operated as the first independent open loop will be described as follows.

The boil-off gas discharged from the storage tank T passes through the boil-off gas heat exchanger 110 and then branched into three flows, such that a part of the boil-off gas is sent to the first supply line L1, the other part thereof is sent to the second supply line L2, and the remaining part thereof is sent to the third supply line L6.

The boil-off gas sent to the first supply line L1 passes through the first valve 191, the compressor 120, the cooler 130, and the second valve 192 and then a part thereof is sent to the fuel consumption place 180 and the other part thereof is sent to the boil-off gas heat exchanger 110 along the return line L3.

The boil-off gas sent to the second supply line L2 passes through the third valve 193, the first extra compressor 122, the first extra cooler 132, and the fourth valve 194 and is then sent to the refrigerant heat exchanger 140 along the recirculation line L5 via the twelfth valve 204.

The boil-off gas sent to the third supply line L6 passes through the tenth valve 202, the second extra compressor 126, the second extra cooler 136, and the eleventh valve 203 and is then sent to the refrigerant heat exchanger 140 along the recirculation line L5.

For convenience of explanation, the boil-off gas compressed by the first extra compressor 122 and the boil-off gas compressed by the second extra compressor 126 are separately described. However, the boil-off gas compressed by the first extra compressor 126 and the boil-off gas compressed by the second extra compressor 126 do not flow separately but are joined in the recirculation line L5 and supplied to the refrigerant heat exchanger 140.

The boil-off gas which is sent to the refrigerant heat exchanger 140 along the recirculation line L5 is primarily heat-exchanged in the refrigerant heat exchanger 140 to be cooled, secondarily expanded by the refrigerant decompressing device 160 to be cooled, and then supplied back to the refrigerant heat exchanger 140 to be used as the refrigerant cooling the boil-off gas which passes through the boil-off gas heat exchanger 110 and is then supplied to the refrigerant heat exchanger 140 via the return line L3 and the boil-off gas which is supplied to the refrigerant heat exchanger 140 along the recirculation line L5.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 110, thereby repeating the above-mentioned series of processes.

The boil-off gas compressed by the compressor 120 and sent to the boil-off gas heat exchanger 110 along the return line L3 is primarily cooled by the boil-off gas heat exchanger 110, secondarily cooled by the refrigerant heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is supplied to the storage tank T.

If the compressor 120 or the cooler 130 fails while the refrigerant cycle of the present embodiment is operated as the first independent open loop, the first valve 191 and the second valve 192 are closed and the sixth valve 196 is open to allow only the first extra compressor 122 and the second extra compressor 126 to operate the refrigerant cycle of the open loop, and the first valve 191, the second valve 192, the ninth valve 201, the tenth valve 202, and the twelfth valve 204 are closed and the sixth valve 196 and the thirteenth valve 205 are open to allow the boil-off gas compressed by the first extra compressor 122 to be sent to the fuel consumption place 180 or undergo the re-liquefaction process and the boil-off gas compressed by the second extra compressor 126 to circulate the refrigerant cycle of the closed loop.

The boil-off gas compressed by the second extra compressor 126 is used as the refrigerant in the refrigerant heat exchanger 140 while the refrigerant cycle of the ship of the present embodiment is operated as the independent open loop, and to send the boil-off gas compressed by the compressor 120 and the boil-off gas compressed by the first extra compressor 122 to the fuel consumption place 180 or re-liquefy the boil-off gas compressed by the compressor 120 and the boil-off gas compressed by the compressor 120 and the first extra compressor 122, the system may be operated while the first valve 191, the second valve 192, the third valve 193, the fourth valve 194, the sixth valve 196, the ninth valve 201, the tenth valve 202, the eleventh valve 203, and the fifteenth valve 207 are open and the twelfth valve 204, the thirteenth valve 205, and the fourteenth valve 206 are closed.

FIG. 8 is a configuration diagram schematically showing a boil-off gas treatment system for a ship according to a seventh embodiment of the present invention.

The ship of the seventh embodiment shown in FIG. 8 is different from the ship of the third embodiment shown in FIG. 4 in that the ship further includes a boost compressor 124 which is installed on the return line; and a boost cooler 134 which is installed on the downstream of the boost compressor 124 to increase the re-liquefaction efficiency and the re-liquefaction amount in the boil-off gas heat exchanger 110 and further includes the ninth valve 201, the tenth valve 202, and the first additional line L6 and may configure the system so that the refrigerant cycle is operated as the closed loop as in the first and second embodiments and the refrigerant cycle is operated as the open loop as in the third embodiment by modifying a part of the line along which the boil-off gas flows. Hereafter, the difference will be mostly described. The detailed description of the same member as the ship of the foregoing third embodiment will be omitted.

Referring to FIG. 8, similar to the third embodiment, the ship of the present embodiment includes the boil-off gas heat exchanger 110, the first valve 191, the compressor 120, the cooler 130, the second valve 192, the third valve 193, the extra compressor 122, the extra cooler 132, the fourth valve 194, the refrigerant heat exchanger 140, the refrigerant decompressing device 160, and the first decompressing device 150.

Similar to the third embodiment, the storage tank T stores liquefied gas such as liquefied natural gas and liquefied ethane gas, and discharges the boil-off gas to the outside when the internal pressure of the storage tank T exceeds a certain pressure or higher. The boil-off gas discharged from the storage tank (T) is sent to the boil-off gas heat exchanger 110.

Similar to the third embodiment, the boil-off gas heat exchanger 110 of the present embodiment uses the boil-off gas discharged from the storage tank T as the refrigerant and cools the boil-off gas supplied to the boil-off gas heat exchanger 110 along the return line L3. That is, the boil-off gas heat exchanger 110 recovers the cold heat of the boil-off gas discharged from the storage tank T and supplies the recovered cold heat to the boil-off gas sent to the boil-off gas heat exchanger 110 along the return line L3. The fifth valve 195 which controls the flow rate of the boil-off gas and opening/closing thereof may be installed on a return line L3.

Similar to the third embodiment, the compressor 120 of the present embodiment is installed on the first supply line L1 to compress the boil-off gas discharged from the storage tank T and similar to the third embodiment, the extra compressor 122 of the present embodiment is installed in parallel with the compressor 120 on the second supply line L2 to compress the boil-off gas discharged from the storage tank T. The compressor 120 and the extra compressor 122 may be a compressor having the same performance, and each may be a multi-stage compressor.

Similar to the third embodiment, the compressor 120 and the extra compressor 122 of the present embodiment may compress the boil-off gas to the pressure required by the fuel consumption place 180. In addition, when the fuel consumption place 180 includes various kinds of engines, after the boil-off gas is compressed according to the required pressure of the engine requiring a higher pressure (hereinafter referred to as a 'high pressure engine'), a part of the boil-off gas is supplied to the high pressure engine and the other part thereof is supplied to the engine (hereinafter, referred to as 'low pressure engine') requiring a lower pressure. The boil-off gas may be decompressed by the decompressing device installed on the upstream and supplied to the low pressure engine. In addition, in order to increase the re-liquefaction efficiency and the re-liquefaction amount in the boil-off gas heat exchanger 110 and the refrigerant heat exchanger 140, the compressor 120 or the extra compressor 122 compresses the boil-off gas to a pressure equal to or higher than the pressure required by the fuel consumption place 180, and the decompressing device is installed on the upstream of the fuel consumption place 180 to lower the pressure of the boil-off gas compressed at the high pressure to the pressure required by the fuel consumption place 180 and then supply the decompressed boil-off gas to the fuel consumption place 180.

Similar to the third embodiment, the ship of the present embodiment may further include an eleventh valve 203 which is installed on the upstream of the fuel consumption place 180 to controlling a flow rate of the boil-off gas sent to the fuel consumption place 180 and opening/closing thereof.

Similar to the third embodiment, the ship of the present embodiment uses the boil-off gas compressed by the extra compressor 122 as the refrigerant which additionally cools the boil-off gas in the refrigerant heat exchanger 140, thereby increasing the re-liquefaction efficiency and the re-liquefaction amount.

Similar to the third embodiment, the cooler 130 of the present embodiment is installed on the downstream of the compressor 120 to cool the boil-off gas that passes through the compressor 120 and has the increased pressure and temperature. Similar to the third embodiment, the extra cooler 132 of the present embodiment is installed on the downstream of the extra compressor 122 to cool the boil-off gas which passes through the extra compressor 122 and has the increased pressure and temperature.

Similar to the third embodiment, the refrigerant heat exchanger 140 of the present embodiment additionally cools the boil-off gas which is supplied to the boil-off gas heat exchanger 110 along the return line L3 and cooled by the boil-off gas heat exchanger 110.

Similar to the third embodiment, according to the present embodiment, the boil-off gas discharged from the storage tank T is further cooled not only in the boil-off gas heat exchanger 110 but also in the refrigerant heat exchanger 140, and may be supplied to the first decompressing device 150 in the state in which the temperature is lower, thereby increasing the re-liquefaction efficiency and the re-liquefaction amount.

Similar to the third embodiment, the refrigerant decompressing device 160 of the present embodiment expands the boil-off gas which passes through the refrigerant heat exchanger 140, and then sends the expanded boil-off gas back to the refrigerant heat exchanger 140.

Similar to the third embodiment, the first decompressing device 150 of the present embodiment is installed on the return line L3 to expand the boil-off gas cooled by the boil-off gas heat exchanger 110 and the refrigerant heat exchanger 140. The first decompressing device 150 of the present embodiment includes all means which may expand and cool the boil-off gas, and may be an expansion valve, such as a Joule-Thomson valve, or an expander.

Similar to the third embodiment, the ship of the present embodiment may include the gas-liquid separator 170 which is installed on the return line L3 on the downstream of the first decompressing device 150 and separates the gas-liquid mixture discharged from the first decompressing device 150 into gas and liquid.

Similar to the third embodiment, when the ship of the present embodiment does not include the gas-liquid separator 170, the liquid or the boil-off gas in the gas-liquid mixed state which passes through the first decompressing device 150 is directly sent to the storage tank T, and when the ship of the present embodiment includes the gas-liquid separator 170, the boil-off gas which passes through the first decompressing device 150 is sent to the gas-liquid separator 170 to be separated into the gas phase and the liquid phase. The liquid separated by the gas-liquid separator 170 returns to the storage tank T along the return line L3 and the gas separated by the gas-liquid separator 170 is supplied to the boil-off gas heat exchanger along a gas discharge line L4 which extends from the gas-liquid separator 170 to the first supply line L1 on the upstream of the boil-off gas heat exchanger 110.

Similar to the third embodiment, when the ship of the present embodiment includes the gas-liquid separator 170, the ship may further include a seventh valve 197 which controls the flow rate of the liquid separated by the gas-liquid separator 170 and sent to the storage tank T; and an eighth valve 198 which controls the flow rate of gas separated by the gas-liquid separator 170 and sent to the boil-off gas heat exchanger 110.

However, the ship of the present embodiment is different from the third embodiment in that the ship further includes the boost compressor 124 which is installed on the return line L3 and the boost cooler 134 which is installed on the return line L3 on the downstream of the boost compressor 124.

The boost compressor 124 of the present embodiment is installed on the return line L3 on which a part of the boil-off gas supplied to the fuel consumption place 180 along the first supply line L1 is branched to be sent to the boil-off gas heat exchanger 110, thereby increasing the pressure of the boil-off gas supplied to the boil-off gas heat exchanger 110 along the return line L3. The boost compressor 124 may compress the boil-off gas to the pressure equal to or lower than a critical point (in the case of methane, approximately 55 bars) or a pressure exceeding the critical point, and the boost compressor 124 of the present embodiment may compress the boil-off gas to approximately 300 bars if the boil-off gas is compressed to a pressure equal to or higher than the critical point.

The boost cooler 134 of the present embodiment is installed on the return line L3 on the downstream of the boost compressor 124 to lower the temperature of the boil-off gas which passes through the boost compressor 124 and has not only the increased pressure but also the increased temperature.

The ship of the present embodiment further includes the boost compressor 124 to increase the pressure of the boil-off gas undergoing the re-liquefaction process, thereby increasing the re-liquefaction efficiency and the re-liquefaction amount.

FIGS. 10A and 10B each are graphs showing temperature values of methane depending on a heat flow under different pressures. Referring to FIGS. 10A and 10B, it can be appreciated that the higher the pressure of the boil-off gas undergoing the re-liquefaction process, the higher the self-heat exchange efficiency becomes. The 'self-' of the self-heat exchange means the heat exchange with the high-temperature boil-off gas by means of the low-temperature boil-off gas itself as the cooling fluid.

FIG. 10A shows the state of each fluid in the refrigerant heat exchanger 140 when the boost compressor 124 and the boost cooler 134 are not included, and FIG. 10B shows the state of each fluid in the refrigerant heat exchanger 140 when the boost compressor 124 and the boost cooler 134 are included.

Graph I at the uppermost side in FIGS. 10A and 10B shows the fluid state at point I in FIG. 8 to which the refrigerant heat exchanger 140 is supplied along the recirculation line L5, graph L at the lowest side shows the fluid state of point K in FIG. 8 which is supplied back to the refrigerant heat exchanger 140 to be used as the refrigerant after passing through the refrigerant heat exchanger 140 and the refrigerant decompressing device 160 along the recirculation line L5, and graph J overlapping with graph K of an intermediate part shows the fluid state at point F in FIG. 8 which is supplied to the refrigerant heat exchanger 140 along the return line L3 after passing through the boil-off heat exchanger 110.

Since the fluid used as the refrigerant is deprived of the cold heat during the heat exchange process and the temperature thereof is gradually increased, the graph L proceeds from the left to the right as time passes, and since the fluid cooled by the heat exchange with the refrigerant is supplied with the cold heat from the refrigerant during the heat exchange process and the temperature thereof is reduced, the graphs I and J proceed from the right to the left as time passes.

The graph K at the intermediate part of FIGS. 10A and 10B is shown by a combination of the graph I and the graph J. That is, the fluid used as the refrigerant in the refrigerant heat exchanger 140 is drawn by the graph L, and the fluid cooled by the heat exchange with the refrigerant in the refrigerant heat exchanger 140 is drawn by the graph K.

The heat exchanger is designed so that the temperature and the heat flow of the fluid supplied (i.e., the points I, K, and F in FIG. 8) to the heat exchanger may be fixed, the temperature of the fluid used as the refrigerant may not be higher than the temperature of the fluid to be cooled (i.e., graphs L and K intersect each other so that the graph L does not show above the graph K), and a logarithmic mean temperature difference (LMTD) may be as small as possible.

The logarithmic mean temperature difference (LMTD) is a value represented by $(d2-d1)/\ln(d2/d1)$ when in the case of a countercurrent flow which a heat exchanger manner in which the high-temperature fluid and the low-temperature fluid are injected in an opposite direction to each other and discharged from an opposite side from each other, the temperature before the low-temperature fluid passes through the heat exchanger is tc1, the temperature after the low-temperature fluid passes through the heat exchanger is tc2, the temperature before the high-temperature fluid passes through the heat exchanger is th1, the temperature after the high-temperature fluid passes through the heat exchanger is th2, and d1=th2−tc1 and d2=th1−tc2. The smaller the logarithmic mean temperature difference, the higher the efficiency of the heat exchanger.

On the graph, the logarithmic mean temperature difference (LMTD) is represented by an interval between the low-temperature fluid (graph L in FIG. 10) used as the refrigerant and the high-temperature fluid (graph K in FIG. 10) cooled by the heat exchange with the refrigerant. Here, it can be appreciated that the interval between the graph L and the graph K shown in FIG. 10B is narrower than the interval between the graph L and the graph K shown in FIG. 10A.

The difference appears because an initial value of the graph J, which is a point represented by a round circle, that is, the pressure of the point F in FIG. 8 which passes through the boil-off gas heat exchanger 110 and is then supplied to the refrigerant heat exchanger 140 along the return line L3 is higher in FIG. 10B than in FIG. 10A.

That is, as the simulation result, in the case of FIG. 10A which does not include the boost compressor 124, the fluid at the point F in FIG. 8 may be approximately −111° C. and 20 bars, and in the case of FIG. 10B which includes the boost compressor 124, the fluid at the point F in FIG. 8 may be approximately −90° C. and 50 bars. If the heat exchanger is designed so that the LMTD is smallest under the initial condition, in the case of FIG. 10B in which the pressure of the boil-off gas undergoing the re-liquefaction process is high, the efficiency of the heat exchanger is higher, such that the re-liquefaction amount and the re-liquefaction efficiency of the overall system are increased.

In the case of FIG. 10A, when the flow rate of the boil-off gas used as the refrigerant in the refrigerant heat exchanger 140 is approximately 6401 kg/h, a total of heat flow transferred to the fluid (graph K) which is cooled by the heat exchange with the refrigerant from the fluid (graph L) used as the refrigerant is approximately 585.4 kW and the flow rate of the re-liquefied boil-off gas is approximately 3441 kg/h.

In the case of FIG. 10B, when the flow rate of the boil-off gas used as the refrigerant in the refrigerant heat exchanger 140 is approximately 5368 kg/h, a total of heat flow transferred to the fluid (graph K) which is cooled by the heat exchange with the refrigerant from the fluid (graph L) used as the refrigerant is approximately 545.2 kW and the flow rate of the re-liquefied boil-off gas is approximately 4325 kg/h.

That is, it can be appreciated that if the pressure of the boil-off gas undergoing the re-liquefaction process, including the boost compressor 124 is increased, the larger amount of boil-off gas may be re-liquefied even if a smaller amount of refrigerant is used.

As described, since the ship of the present embodiment includes the boost compressor 124, it is possible to increase the re-liquefaction amount and the re-liquefaction efficiency, and since the case in which the boil-off gas can be completely treated without operating the extra compressor 122 by increasing the re-liquefaction amount and the re-liquefaction efficiency is increased, the use frequency of the extra compressor 122 can be reduced.

Although the re-liquefaction efficiency can be increased by using the extra compressor 122, the longer the time to operate the extra compressor 122, the weaker the redundancy concept for preparing for the failure of the compressor 120. The ship of the present embodiment can reduce the use frequency of the extra compressor 122 including the boost compressor 124, and therefore the redundancy concept can be sufficiently secured.

In addition, since the boost compressor 124 is generally sufficient to have approximately one half capacity of the compressor 120 or the extra compressor 122, the operation cost may be more saved in the case in which the system is operated by operating only the boost compressor 124 and the compressor 120 without operating the extra compressor 122 than in the case in which the system is operated only by the compressor 120 and the extra compressor 122 without the installation of the boost compressor 124.

Referring back to FIG. 8, unlike the third embodiment, the ship of the present embodiment further includes a first additional line L6 connecting between the recirculation line L5 and the second supply line L2; a ninth valve 201 installed on the recirculation line L5; and a tenth valve 202 installed on the first additional line L6.

The first to eighth valves and the eleventh valve 191, 192, 193, 194, 195, 196, 197, 198, 201, 202 and 203 of the present embodiment may be manually controlled by allowing a person to directly determine the operation condition of the system and may be automatically controlled to be opened or closed depending on a preset value.

One side of the first additional line L6 of the present embodiment is connected to a recirculation line L5 (not shown) along which the boil-off gas is expanded by the refrigerant decompressing device 160 and then sent to the first supply line L1 through the refrigerant heat exchanger 140 and the other side thereof is connected to the second supply line L2 between the third valve 193 and the extra compressor 122.

The ninth valve 201 of the present embodiment is installed on the recirculation line L5 between the point where the recirculation line L5 meets the first supply line L1 on the upstream of the compressor 120 and the extra compressor 122 and the point where the recirculation line L5 meets the first additional line L6.

In addition, the ship of the present embodiment is different from the third embodiment in that the second supply line L2 on the downstream of the extra compressor 122 is connected to the recirculation line L5 instead of the first supply line L1.

The ship of the present embodiment is that the refrigerant cycle may be operated not only as the open loop but also as the closed loop so as to more flexibly use the re-liquefaction system according to the operating conditions of the ship. Hereinafter, a method of operating a refrigerant cycle as the closed loop and a method of operating a refrigerant cycle as the open loop by a valve control will be described.

To operate the refrigerant cycle of the ship of the present embodiment as the closed loop, the system is operated while the first valve 191, the second valve 192, the third valve 193, the fourth valve 194, and the tenth valve 202 are open, and the sixth valve 196 and the ninth valve 201 is closed.

If the boil-off gas which is discharged from the storage tank T and then compressed by the extra compressor 122 is supplied to the recirculation line L5, the third valve 193 is closed to form the refrigerant cycle of the closed loop in which the boil-off gas circulates the extra compressor 122, the extra cooler 132, the fourth valve 194, the refrigerant heat exchanger 140, the refrigerant decompressing device 160, the refrigerant heat exchanger 140, and the tenth valve 202.

When the refrigerant cycle is configured as the closed loop, nitrogen gas may be used as the refrigerant circulating the closed loop. In this case, the storage tank of the present embodiment may further include a pipe through which nitrogen gas is introduced into the refrigerant cycle of the closed loop.

When the refrigerant cycle is operated as the closed loop, only the boil-off gas circulating the closed loop is used as the refrigerant in the refrigerant heat exchanger 140. The boil-off gas passing through the compressor 120 is not introduced into the refrigerant cycle but is supplied to the fuel consumption place 180 or undergoes the re-liquefaction process along the return line L3. Therefore, a predetermined flow rate of boil-off gas is circulated as the refrigerant in the refrigerant heat exchanger 140 irrespective of the re-liquefaction amount or the amount of boil-off gas required by the fuel consumption place 180.

The flow of the boil-off gas in the case where the refrigerant cycle of the ship of the present embodiment is operated as the closed loop will be described as follows.

The boil-off gas discharged from the storage tank T passes through the boil-off gas heat exchanger 110 and then compressed by the compressor 120, and a part thereof is cooled by the cooler 130 and then sent to the fuel consumption place 180, and the remaining part thereof undergoes the re-liquefaction process along the return line L3.

The boil-off gas undergoing the re-liquefaction process along the return line L3 is compressed by the boost compressor 124 and is cooled by the boost cooler 134, and then exchanges heat with the boil-off gas discharged from the storage tank T by the boil-off gas heat exchanger 110. The boil-off gas cooled by the boil-off gas heat exchanger 110 is additionally cooled by the heat exchange in the refrigerant heat exchanger 140 and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

Meanwhile, the boil-off gas circulating the refrigerant cycle is compressed by the extra compressor 122, cooled by the extra cooler 132, and then sent to the refrigerant heat exchanger 140 along the recirculation line L5. The boil-off gas which passes through the extra compressor 122 and the extra cooler 132 and then sent to the refrigerant heat exchanger 140 is primarily heat-exchanged in the refrigerant heat exchanger 140 to be cooled and then sent to the refrigerant decompressing device 160 to be secondarily expanded and cooled. The boil-off gas which passes through the refrigerant decompressing device 160 is sent back to the refrigerant heat exchanger 140 to be used as a refrigerant which cools the boil-off gas passing through the boil-off gas heat exchanger 110 and then supplied to the refrigerant heat exchanger 140 along the return line L3 and the boil-off gas compressed by the extra compressor 122 and then supplied to the refrigerant heat exchanger 140 along the recirculation line L5. The boil-off gas which passes through the refrigerant decompressing device 160 and then used as the refrigerant in the refrigerant heat exchanger 140 is sent back to the extra compressor 122, thereby repeating the above-mentioned series of processes.

When the compressor 120 or the cooler 130 fails while the refrigerant cycle of the ship of the present embodiment is operated as the closed loop, the first valve 191, the second valve 192, and the tenth valve 202 are closed and the third valve 193 and the sixth valve 196 are open to allow the boil-off gas which is discharged from the storage tank T and then passes through the boil-off gas heat exchanger 110 to be supplied to the fuel consumption place 180 via the third valve 193, the extra compressor 122, the extra cooler 132, the fourth valve 194, and the sixth valve 196. When it is necessary to use the boil-off gas compressed by the extra compressor 122 as the refrigerant of the refrigerant heat exchanger 140, the ninth valve 201 may be open to operate the system.

To operate the refrigerant cycle of the ship of the present embodiment as the open loop, the first valve 191, the second valve 192, the third valve 193, the fourth valve 194, the sixth valve 196 and the ninth valve 201 are open, and the tenth valve 202 are closed.

When the refrigerant cycle is operated as the closed loop, the boil-off gas circulating the refrigerant cycle and the boil-off gas sent to the fuel consumption place 180 or undergoing the re-liquefaction process along the return line L3 are separated. On the other hand, when the refrigerant cycle is operated as the open loop, the boil-off gas compressed by the compressor 120 and the boil-off gas compressed by the extra compressor 122 are joined to be used as a refrigerant in the refrigerant heat exchanger 140, to be sent to the fuel consumption place 180, or to undergo the re-liquefaction process along the return line L3.

Therefore, if the refrigerant cycle is operated as the open loop, the flow rate of the refrigerant to be sent to the refrigerant heat exchanger 140 may be flexibly controlled in consideration of the re-liquefaction amount and the amount of boil-off gas required by the fuel consumption place 180. In particular, when the amount of boil-off gas required by the fuel consumption place 180 is small, increasing the flow rate of the refrigerant sent to the refrigerant heat exchanger 140 may increase the re-liquefaction efficiency and the re-liquefaction amount.

That is, when the refrigerant cycle is operated as the closed loop, it is not possible to supply the refrigerant heat exchanger 140 with the boil-off gas equal to or more than the capacity of the extra compressor 122. However, when the refrigerant cycle is operated as the open loop, the boil-off gas having a flow rate exceeding the capacity of the extra compressor 122 may be supplied to the refrigerant heat exchanger 140.

The flow of the boil-off gas in the case where the refrigerant cycle of the ship of the present embodiment is operated as the open loop will be described as follows.

The boil-off gas discharged from the storage tank T is branched into two flows after passing through the boil-off gas heat exchanger 110 and a part thereof is sent to the first supply line L1 and the remaining part thereof is supplied to the second supply line L2.

The boil-off gas sent to the first supply line L1 passes through the first valve 191, the compressor 120, the cooler 130, and the second valve 192 and then a part thereof passes through the sixth valve 196 and is sent to the refrigerant heat exchanger 140, and the other part thereof is again branched into two flows. One flow of the boil-off gases branched into the two flows is sent to the fuel consumption place 180 and the other thereof is sent to the boost compressor 124 along the return line L3.

The boil-off gas sent to the second supply line L2 passes through the third valve 193, the extra compressor 122, the extra cooler 132, and the fourth valve 194 and then a part thereof is sent to the refrigerant heat exchanger 140 and the other part thereof is sent to the first supply line L1 and then branched into two flows. One flow of the boil-off gases branched into the two flows is sent to the fuel consumption place 180 and the other thereof is sent to the boost compressor 124 along the return line L3.

For convenience of explanation, the boil-off gas compressed by the compressor 120 and the boil-off gas compressed by the extra compressor 122 are separately described. However, each of the boil-off gas compressed by the compressor 120 and the boil-off gas compressed by the extra compressor 122 does not flow separately but is joined to be supplied to the refrigerant heat exchanger 140, the fuel consumption place 180, or the boost compressor 124. That is, the boil-off gas compressed by the compressor 120 and the boil-off gas compressed by the extra compressor 122 are mixed, which in turn flows in the recirculation line L5 along which the boil-off gas is sent to the refrigerant heat exchanger 140, the first supply line L1 along which the boil-off gas is sent to the fuel consumption place 180, and the return line L3 along which the boil-off gas is sent to the boost compressor 124.

The boil-off gas sent to the refrigerant heat exchanger 140 along the recirculation line L5 is primarily heat-exchanged in the refrigerant heat exchanger 140 to be cooled, and secondarily expanded by the refrigerant decompressing device 160 to be cooled and supplied back to the refrigerant heat exchanger 140. The boil-off gas which passes through the refrigerant decompressing device 160 and is then supplied to the refrigerant heat exchanger 140 is used as the refrigerant which cools both of the boil-off gas passing through the boil-off gas heat exchanger 110 and then supplied to the refrigerant heat exchanger 140 along the return line L3 and the confluent flow of the boil-off gas compressed by the compressor 120 and the boil-off gas compressed by the extra compressor 122 which are supplied to the refrigerant heat exchanger 140 along the recirculation line L5.

That is, the boil-off gas used as the refrigerant in the refrigerant heat exchanger 140 is supplied to the refrigerant heat exchanger 140 along the recirculation line L5, and then primarily cooled by the refrigerant heat exchanger 140 and secondarily cooled by the refrigerant decompressing device 160. In addition, the boil-off gas sent from the compressor 120 or the extra compressor 122 to the refrigerant heat exchanger 140 along the recirculation line L5 is primarily cooled by means of the boil-off gas, which passes through the refrigerant decompressing device 160, as the refrigerant.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 110, thereby repeating the above-mentioned series of processes.

The boil-off gas sent to the boost compressor 124 along the return line L3 is compressed by the boost compressor 124, cooled by the boost cooler 134, and then sent to the boil-off gas heat exchanger 110. The boil-off gas sent to the boil-off gas heat exchanger 110 is primarily cooled by the boil-off gas heat exchanger 110, secondarily cooled by the refrigerant heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

When the compressor 120 or the cooler 130 fails while the refrigerant cycle of the ship of the present embodiment is operated as the open loop, the first valve 191, the second valve 192, and the ninth valve 201 are closed to allow the boil-off gas which is discharged from the storage tank T and then passes through the boil-off gas heat exchanger 110 to be supplied to the fuel consumption place 180 via the third valve 193, the extra compressor 122, the extra cooler 132, the fourth valve 194, and the sixth valve 196. When it is necessary to use the boil-off gas compressed by the extra compressor 122 as the refrigerant of the refrigerant heat exchanger 140, the ninth valve 201 may be open to operate the system.

When the refrigerant cycle of the ship of the present embodiment is operated as the open loop, the liquefied gas stored in the storage tank T is liquefied natural gas, the fuel consumption place 180 is the X-DF engine, and the refrigerant cycle includes the gas-liquid separator 170, temperatures and pressures of fluid at each point will be described as an example.

Boil-off gas at point A where the boil-off gas discharged from the storage tank T and the boil-off gas separated by the gas-liquid separator 170 are joined and supplied to the boil-off gas heat exchanger 110 may be approximately −123° C. and 1.060 bara, and boil-off gas at point B after the boil-off gas of approximately −123° C. and 1.060 bara exchanges heat with the boil-off gas of 43° C. and 301.1 bara in the boil-off gas heat exchanger 110 may be approximately 40° C. and 0.96 bara.

In addition, it may be assumed that the boil-off gas of approximately 40° C. and 0.96 bara passes through the refrigerant decompressing device 160 and then joined with the boil-off gas of approximately 37° C. and 0.96 bara passing through the refrigerant heat exchanger 140 and then the boil-off gas at point C may be approximately 38° C. and 0.96 bara.

The boil-off gas of approximately 38° C. and 0.96 bara is branched into two, and one flow is compressed by the compressor 120 and then cooled by the cooler 130, the other flow is compressed by the extra compressor 122 and is then cooled by the extra compressor 132. The boil-off gas at the point D and the boil-off gas at the point I which are the confluent flow of the flow passing through the compressor 120 and the cooler 130 and the flow passing through the extra compressor 122 and the extra cooler 132 may be approximately 43° C. and 17 bara.

The boil-off gas at the point E after the boil-off gas of approximately 43° C. and 17 bara is compressed by the boost compressor 124 and cooled by the boost cooler 134 may be approximately 43° C. and 301.1 bara, and the boil-off gas at the point F after the boil-off gas of approximately 43° C. and 301.1 bara exchanges heat with the boil-off gas of approximately −123° C. and 1.060 bara may be approximately <82° C. and 301 bara.

In addition, the boil-off gas at the point G after which the boil-off gas of approximately −82° C. and 301 bara is cooled by the refrigerant heat exchanger may be approximately −153° C. and 300.5 bara, and the boil-off gas at the point H after the boil-off gas of approximately −153° C. and 300.5 bara is expanded by the first decompressing device 150 may be −155.6° C. and 2.1 bara.

On the other hand, the boil-off gas at point I after the boil-off gas of approximately 43° C. and 17 bara is primarily cooled by the refrigerant heat exchanger 140 may be approximately −82° C. and 16.5 bara, the boil-off gas at point J after the boil-off gas of approximately −82° C. and 16.5 bara is secondarily cooled by the refrigerant decompressing device 160 may be approximately −155° C. and 1.56 bara, and the boil-off gas at point K after the boil-off gas of approximately −155° C. and 1.56 bara is used in the refrigerant heat exchanger 140 may be approximately 37° C. and 0.96 bara.

The ship of the present embodiment may be independently operated while operating the refrigerant cycle as the open loop so that the boil-off gas compressed by the extra compressor 122 is used only as the refrigerant of the refrigerant heat exchanger 140, the boil-off gas compressed by the compressor 120 is sent to the fuel consumption place 180 or undergoes the re-liquefaction process along the return line L3 and is not used as the refrigerant of the refrigerant heat exchanger 140. Hereinafter, the refrigerant cycle of the open loop in which the extra compressor 122 and the compressor 120 are operated independently is referred to as an 'independent open loop'.

To operate the refrigerant cycle of the ship of the present embodiment as the independent open loop, the first valve 191, the second valve 192, the third valve 193, the fourth valve 194, and the ninth valve 201 are open, and the sixth valve 196 and the tenth valve 202 are closed. When the refrigerant cycle is operated as the independent open loop, the system can be operated more easily than when the open loop is operated.

The flow of the boil-off gas in the case where the refrigerant cycle of the ship of the present embodiment is operated as the independent open loop will be described as follows.

The boil-off gas discharged from the storage tank T is branched into two flows after passing through the boil-off gas heat exchanger 110 and a part thereof is sent to the first supply line L1 and the remaining part thereof is supplied to the second supply line L2. The boil-off gas sent to the first supply line L1 passes through the first valve 191, the compressor 120, the cooler 130, and the second valve 192 and then a part thereof is sent to the fuel consumption place 180 and the other part thereof is sent to the boost compressor 124 along the return line L3. The boil-off gas sent to the second supply line L2 passes through the third valve 193, the extra compressor 122, the extra cooler 132, and the fourth valve 194 and is then sent to the refrigerant heat exchanger 140 along the recirculation line L5.

The boil-off gas which is compressed by the extra compressor 122 and then sent to the refrigerant heat exchanger 140 along the recirculation line L5 is used as the refrigerant which cools the boil-off gas which is primarily heat-exchanged in the refrigerant heat exchanger 140 to be cooled, secondarily expanded by the refrigerant decompressing device 160 to be cooled, and then supplied back to the refrigerant heat exchanger 140 to pass through the boil-off gas heat exchanger 110 and then be supplied to the refrigerant heat exchanger 140 via the return line L3 and the boil-off gas which is compressed by the extra compressor 122 and then supplied to the refrigerant heat exchanger 140 along the recirculation line L5.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 110, thereby repeating the above-mentioned series of processes.

The boil-off gas which is compressed by the compressor 120 and then sent to the boost compressor 124 along the return line L3 is compressed by the boost compressor 124, cooled by the boost cooler 134, and then sent to the boil-off gas heat exchanger 110. The boil-off gas sent to the boil-off gas heat exchanger 110 is primarily cooled by the boil-off gas heat exchanger 110, secondarily cooled by the refrigerant heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is sent to the storage tank T.

When the compressor 120 or the cooler 130 fails while the refrigerant cycle of the ship of the present embodiment is operated as the independent closed loop, the first valve 191, the second valve 192, and the ninth valve 201 are closed and the sixth valve 196 is open to allow the boil-off gas which is discharged from the storage tank T and then passes through the boil-off gas heat exchanger 110 to be supplied to the fuel consumption place 180 via the third valve 193, the extra compressor 122, the extra cooler 132, the fourth valve 194, and the sixth valve 196. When it is necessary to use the boil-off gas compressed by the extra compressor 122 as the refrigerant of the refrigerant heat exchanger 140, the ninth valve 201 may be open to operate the system.

It will be apparent to those skilled in the art that the present invention is limited to the foregoing embodiments but can be variously modified and changed without departing from the spirit and scope of the invention.

The invention claimed is:

1. A ship comprising:
   a storage tank configured to store liquefied gas;
   a boil-off gas supply line configured to discharge boil-off gas from the storage tank;
   a first compressor configured to compress boil-off gas;
   a first valve configured to selectively connect between the boil-off gas supply line and the first compressor;
   a second compressor configured to compress boil-off gas;
   a second valve configured to selectively connect between the boil off-gas supply line and the second compressor;
   a first line configured to receive and process a first flow of compressed boil-off gas, wherein the first flow comprises compressed boil-off gas from at least one of the first compressor and the second compressor;
   a second line configured to receive and process a second flow of compressed boil-off gas for returning to the storage tank, wherein the second flow comprises compressed boil-off gas from at least one of the first compressor and the second compressor;
   a first heat exchanger configured to cool the second flow with the boil-off gas flowing through the boil-off gas supply line from the storage tank;
   a first expander installed on the first line and configured to expand and cool the first flow flowing through the first line;
   a second heat exchanger configured to cool the second flow flowing through the second line downstream the first heat exchanger with the first flow flowing through the first line downstream the first expander;
   a second expander installed on the second line downstream the second heat exchanger and configured to expand the second flow to liquefy at least part of the second flow;
   a first connection line connecting the first line downstream the second heat exchanger to the boil-off gas supply line;
   a third valve installed on the first connection line and configured to selectively connect between the first line downstream the second heat exchanger and the boil-off gas supply line;
   a second connection line connecting the first line downstream the second heat exchanger to the first valve;
   a fourth valve installed on the second connection line and configured to selectively connect between the first line downstream the second heat exchanger and the first valve;
   a third line connecting between a first point downstream the first compressor and a second point downstream the second compressor; and
   a fifth valve installed on the third line and configured to selectively connect between the first point and the second point,
   wherein, when the first valve is open, boil-off gas flowing through the boil-off gas supply line is supplied to the first compressor,
   wherein, when the second valve is open, boil-off gas flowing through the boil-off gas supply line is supplied to the second compressor,
   wherein, when the third valve is open, the first flow is added to the boil-off gas flowing through the boil-off gas supply line, wherein, when the fourth valve is open, the first flow returns to the first compressor;

wherein, when the fifth valve is closed, compressed boil-off gas from the first compressor is supplied to the first line, and compressed boil-off gas from the second compressor is not supplied to the first line, wherein, when the fifth valve is open, the compressed boil-off gas from the first compressor and the compressed boil-off gas from the second compressor are combined and then supplied to the first line and the second line, wherein, when the first valve is closed, the third valve is closed, the fourth valve is open, and the fifth valve is closed, the first flow forms a closed refrigeration cycle that comprises the first compressor, the first expander and the second heat exchanger and does not comprise the second compressor.

2. The ship of claim 1, further comprising:
an engine configured to consume compressed boil-off gas; and
a third line configured to receive a third flow comprising compressed boil-off gas from at least one of the first compressor and the second compressor and further configured to supply the third flow to the engine.

3. The ship of claim 2, wherein the first valve, the second valve, the third valve, the fourth valve, and, the fifth valve are configured to control a flow rate of the first flow based on a flow rate of the boil-off gas discharged from the storage tank and allow rate of the third flow to the engine.

4. The ship of claim 2, wherein when the first valve is closed, the third valve is closed, the fourth valve is open, and the fifth valve is closed, the first flow flows through the closed refrigeration cycle at a predetermined flow rate regardless of a flow rate of the third flow to the engine.

5. The ship of claim 1, further comprising:
a third compressor and configured to compress boil-off gas; and
a sixth valve configured to selectively connect between the boil-off gas supply line and the third compressor;
wherein, when the sixth valve is open, boil-off gas flowing through the boil-off gas supply line is supplied to the third compressor,
wherein the first line is connected to the third compressor, wherein the first flow flowing the first line comprises compressed boil-off gas from at least one of the first compressor, the second compressor and the third compressor.

6. The ship of claim 5, further comprising:
a fourth line connecting between the first point downstream the first compressor and a third point downstream the third compressor; and
a seventh valve installed on the fourth line and configured to selectively connect between the first point and the third point,
wherein, when the seventh valve and the fifth valve are open, the compressed boil-off gas from the first compressor, the compressed boil-off gas from the first compressor and compressed boil-off gas from the third compressor are combined and then supplied to the first line and the second line,
wherein, when the seventh valve is open and the fifth valve is closed, the compressed boil-off gas from the first compressor and the compressed boil-off gas from the third compressor are combined and then supplied to the first line, and the compressed boil-off gas from the second compressor is not supplied to the first line.

* * * * *